(12) United States Patent
Mizukami et al.

(10) Patent No.: US 8,149,490 B2
(45) Date of Patent: Apr. 3, 2012

(54) OPTICAL SWITCH, OPTICAL SWITCH CONTROL METHOD AND COMMUNICATION SYSTEM

(75) Inventors: Masato Mizukami, Kanagawa (JP); Johji Yamaguchi, Kanagawa (JP); Naru Nemoto, Kanagawa (JP); Kunihiko Sasakura, Kanagawa (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 559 days.

(21) Appl. No.: 12/309,904

(22) PCT Filed: Aug. 20, 2007

(86) PCT No.: PCT/JP2007/066109
§ 371 (c)(1),
(2), (4) Date: Jan. 30, 2009

(87) PCT Pub. No.: WO2008/020646
PCT Pub. Date: Feb. 21, 2008

(65) Prior Publication Data
US 2009/0323149 A1    Dec. 31, 2009

(30) Foreign Application Priority Data

Aug. 18, 2006  (JP) ................................. 2006-223065
Oct. 11, 2006  (JP) ................................. 2006-277980
Oct. 11, 2006  (JP) ................................. 2006-277988

(51) Int. Cl.
*G02B 26/08* (2006.01)
*G02F 1/29* (2006.01)

(52) U.S. Cl. .................. 359/225.1; 359/224.1; 359/320; 359/900

(58) Field of Classification Search .............. 398/45, 398/55, 56; 359/221.2, 223.1, 224.1, 225.1, 359/226.2, 320, 900
See application file for complete search history.

(56) References Cited

U.S. PATENT DOCUMENTS
7,398,019 B2 *   7/2008   Tochio et al. .................. 398/56

FOREIGN PATENT DOCUMENTS
| JP | 2003-530591 A | 10/2003 |
| JP | 2004-271977 A | 9/2004 |
| JP | 2004-279935 | 10/2004 |
| JP | 2005-275094 A | 10/2005 |

OTHER PUBLICATIONS

Yamamoto, et al., "A three-dimentional MEMS optical switching module having 100 input and 100 output ports", Photomics Technology Letters, IEEE, vol. 15, Issue: 10.

* cited by examiner

*Primary Examiner* — Jack Dinh
(74) *Attorney, Agent, or Firm* — Blakely, Sokoloff, Taylor & Zafman

(57) ABSTRACT

When a light intensity upon a perturbation is detected, an error calculation/correction unit (85) in a control unit (8) corrects and updates the above-described initial manipulated variables based on perturbation manipulated variables and manipulated variables, i.e., operation manipulated variables to obtain the maximum light intensity from the light intensity value at each perturbation manipulated variable, thereby adjusting the tilt angle of a mirror. More specifically, assuming that the time series data of an acquired output light intensity can be approximated to a cosine function, the error calculation/correction unit (85) calculates a phase difference θ between the cosine function and a sine or cosine function used to set x- and y-axis perturbation patterns for a circular trajectory perturbation. Manipulated variables at coordinates defined by the phase difference θ and polar coordinates of a radius voltage to perturb the mirror are calculated. Voltage values at coordinates defined by a function for setting the driving voltages of the mirror (230) are calculated and set as the driving voltages for one output port.

82 Claims, 26 Drawing Sheets

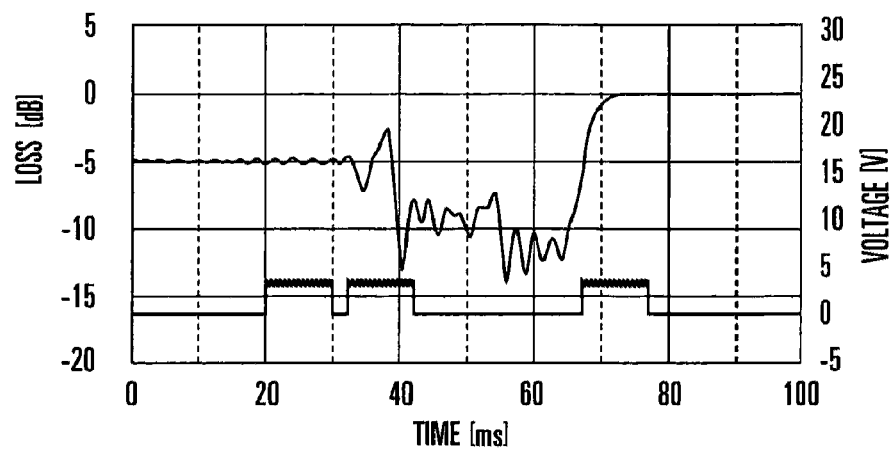
F I G. 12
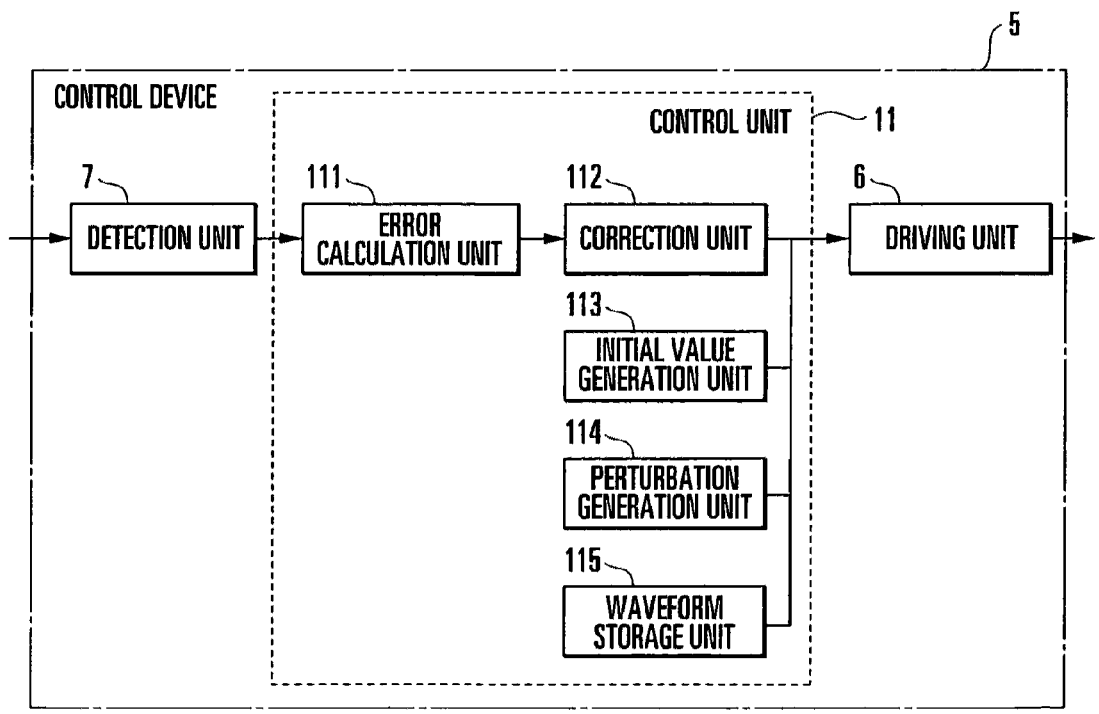
F I G. 13

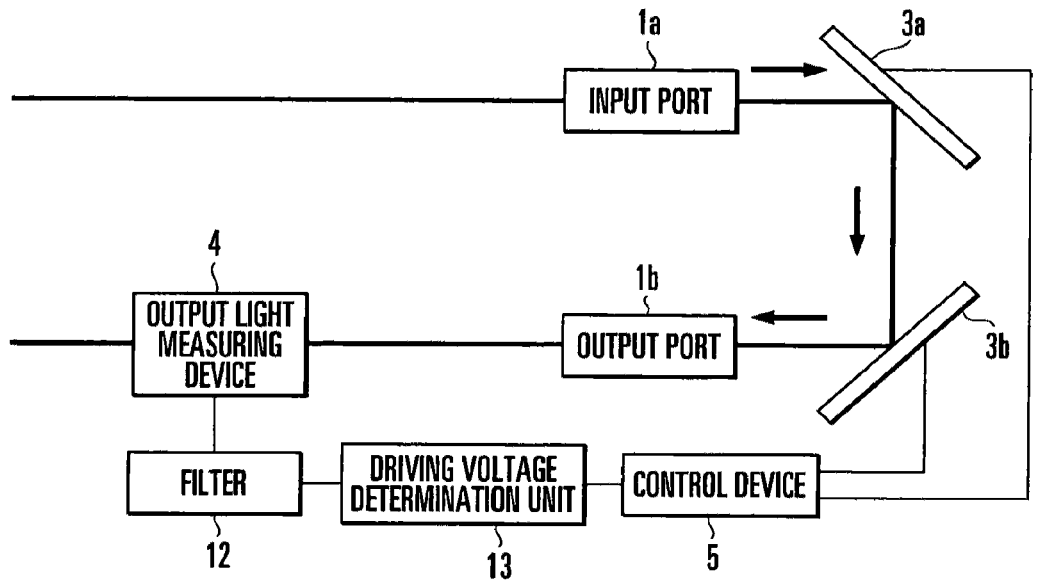
F I G. 24
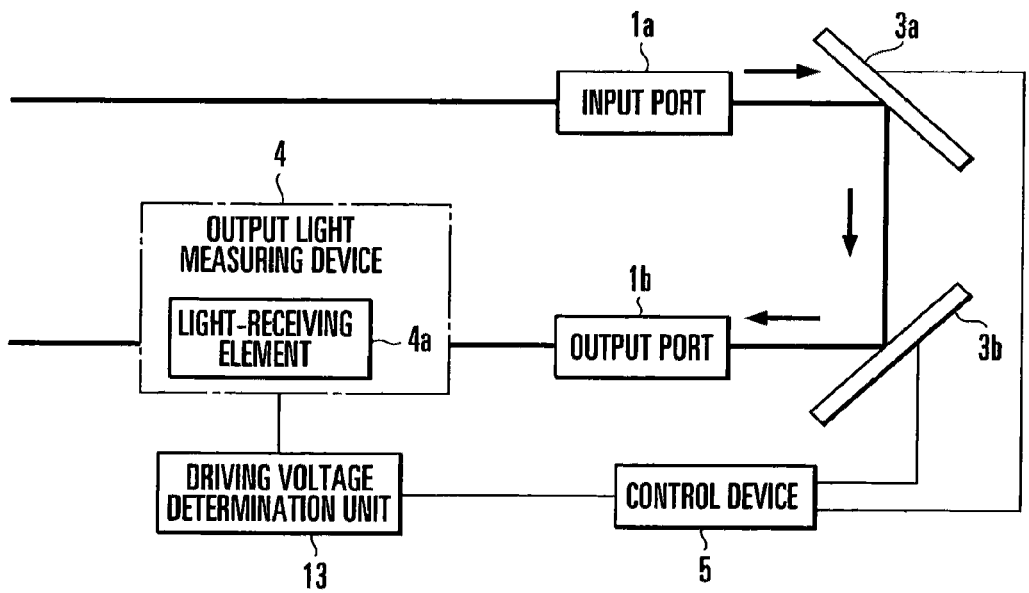
F I G. 25

US 8,149,490 B2

OPTICAL SWITCH, OPTICAL SWITCH CONTROL METHOD AND COMMUNICATION SYSTEM

The present patent application is a Utility claiming the benefit of Application No. PCT/JP2007/066109, filed Aug. 20, 2007.

TECHNICAL FIELD

The present invention relates to an optical switch.

BACKGROUND ART

A technique of implementing an optical switch using a micromirror has been proposed (T. Yamamoto, et al., "A three-dimensional MEMS optical switching module having 100 input and 100 output ports", Photonics Technology Letters, IEEE, Volume 15, Issue: 10). FIG. 37 shows a conventional optical switch using a micromirror.

The optical switch shown in FIG. 37 includes input ports 1a, output ports 1b, input-side micromirror array 2a, and output-side micromirror array 2b. Each of the input ports 1a and output ports 1b includes a plurality of optical fibers arrayed two-dimensionally. Each of the micromirror arrays 2a and 2b includes a plurality of micromirror devices 3a and 3b arrayed two-dimensionally. The arrows in FIG. 37 indicate a light beam traveling direction.

An optical signal which has outgone from a given input port 1a is reflected by the mirror of a micromirror device 3a of the input-side micromirror array 2a corresponding to the input port 1a so that the traveling direction changes. As will be described later, the mirror of the micromirror device 3a is designed to pivot about two axes so as to direct light reflected by the micromirror device 3a to an arbitrary micromirror device 3b of the output-side micromirror array 2b. The mirror of the micromirror device 3b is also designed to pivot about two axes so as to direct light reflected by the micromirror device 3b to an arbitrary output port 1b by appropriately controlling the tilt angle of the mirror. It is therefore possible to switch the optical path and connect arbitrary two of the input ports 1a and output ports 1b arrayed two-dimensionally by appropriately controlling the tilt angles of mirrors in the input-side micromirror array 2a and output-side micromirror array 2b.

The most characteristic constituent elements of the optical switch are the micromirror devices 3a and 3b each having a mirror. In a micromirror device, conventionally, a mirror substrate 200 having a mirror and an electrode substrate 300 having electrodes are arranged in parallel, as shown in FIGS. 38 and 39 (see the above-described reference).

The mirror substrate 200 includes a plate-shaped frame portion 210, a gimbal 220 arranged in the opening of the frame portion 210, and a mirror 230 arranged in the opening of the gimbal 220. The frame portion 210, torsion springs 211a, 211b, 221a, and 221b, the gimbal 220, and the mirror 230 are integrally formed from, e.g., single-crystal silicon. For example, a Ti/Pt/Au layer having a three layer structure is formed on the surface of the mirror 230. The pair of torsion springs 211a and 211b connect the frame portion 210 to the gimbal 220. The gimbal 220 can pivot about a gimbal pivot axis X in FIG. 38 which passes through the pair of torsion springs 211a and 211b. Similarly, the pair of torsion springs 221a and 221b connect the frame portion 230 to the gimbal 220. The mirror 230 can pivot about a mirror pivot axis Y in FIG. 38 which passes through the pair of torsion springs 221a and 221b. The gimbal pivot axis X and the mirror pivot axis Y are perpendicular to each other. As a result, the mirror 230 pivots about the two axes which are perpendicular to each other.

The electrode substrate 300 includes a plate-shaped base portion 310, and a terrace-shaped projecting portion 320. The base portion 310 and the projecting portion 320 are made of, e.g., single-crystal silicon. The projecting portion 320 includes a second terrace 322 having a truncated pyramidal shape and formed on the upper surface of the base portion 310, a first terrace 321 having a truncated pyramidal shape and formed on the upper surface of the second terrace 322, and a pivot 330 having a columnar shape and formed on the upper surface of the first terrace 321. Four electrodes 340a to 340d are formed on the four corners of the projecting portion 320 and the upper surface of the base portion 310 led out of the four corners. A pair of projecting portions 360a and 360b are formed on the upper surface of the base portion 310 to be juxtaposed while sandwiching the projecting portion 320. Interconnections 370 are formed on the upper surface of the base portion 310. The electrodes 340a to 340d are connected to the interconnections 370 via leads 341a to 341d. An insulating layer 311 made of, e.g., silicon oxide is formed on the surface of the base portion 310. The electrodes 340a to 340d, leads 341a to 341d, and interconnections 370 are formed on the insulating layer 311.

The lower surface of the frame portion 210 and the upper surfaces of the projecting portions 360a and 360b are bonded to each other to make the mirror 230 face the electrodes 340a to 340d so that the mirror substrate 200 and the electrode substrate 300 form a micromirror device shown in FIG. 39. In the micromirror device, the mirror 230 is grounded. A positive driving voltage is applied to the electrodes 340a to 340d such that an asymmetrical potential difference is generated between them, thereby attracting the mirror 230 by an electrostatic attraction and making it pivot in an arbitrary direction.

DISCLOSURE OF INVENTION

Problem to be Solved by the Invention

In the above-described optical switch, a change in the environment including the ambient temperature and humidity or an external vibration generates a positional error between the input/output ports and the mirrors or changes the tilt angle. This may gradually increase the shift from the optimum mirror tilt angle and result in drift so that the power loss of output light varies over time. If an optical switch used in a general optical network system causes a loss variation, the whole optical network system suffers profound influence. Hence, it is necessary to suppress the loss of optical connection intensity (output light intensity) within a predetermined tolerance.

However, if the drift amount per unit time is large, and no measure to suppress the drift is taken, the optical connection intensity may exceed the loss tolerance. To prevent this, an optical switch employs stabilizing control to obtain a stable optical connection intensity by monitoring the output light intensity. More specifically, the stabilizing control is done in accordance with the following procedure. First, a control device (not shown) for controlling the tilt angles of the mirrors 230 supplies periodically changing driving voltages to the micromirror devices 3a and 3b, thereby giving a perturbation (vibration) to the mirrors 230. While doing so, an output light measuring device (not shown) provided on the output terminal side of the output ports 1b measures the output light intensity. Next, the perturbation pattern of the driving voltage and the value of the output light intensity are held in the storage device of the control device. While comparing the maximum values of the perturbation pattern, a driving voltage that obtains a maximum optical connection intensity is calculated as an optimum driving voltage. The optimum driving voltage is obtained using, e.g., a hill-climbing method, in which the maximum value is searched for by perturbing the mirror within a voltage range $\pm\Delta V$ set based on the initial output voltage and comparing the output intensities. Finally, the obtained optimum driving voltage is sequentially applied to the mirror repeatedly at a predetermined time interval. The optical connection intensity is stabilized by this technique.

In the optimum value search of so-called maximum value comparing type, if, for example, external noise affects the perturbation for the maximum light intensity search, the maximum light intensity may erroneously be recognized, and a wrong optimum driving voltage may be obtained. This problem is inevitable in the maximum value comparing type search.

It is an object of the present invention to calculate an optimum driving voltage even when, e.g., disturbance noise exists.

The above-described optimum value search of maximum value comparing type requires to perform a search a plurality of number of times to obtain an optimum value. Since the perturbation time in one search is about 10 ms, a time of several hundred ms is necessary in total. For this reason, this method is not applicable to a device which needs a switching speed of several ten ms. The application range of the optical switch as a switching device in a communication network apparatus is limited.

It is another object of the present invention to quickly obtain the optimum value of optical connection intensity.

In the above-described optimum value search, generally, the micromirror device 3a is perturbed, and an error is detected and corrected based on the power variation at that time, and then, the micromirror device 3b is perturbed, and an error is detected and corrected based on the power variation at that time. Since error detection and correction are done in each of the micromirror devices 3a and 3b, the time required for detection and correction of the optimum value becomes long. Additionally, since the error of each mirror 230 affects error detection of the other mirrors 230, the optimum value detection accuracy is low.

It is still another object of the present invention to shorten the time required for detection and correction of an optimum value. It is still another object of the present invention to improve the optimum value detection accuracy.

Means of Solution to the Problem

In order to solve the above-described problems, according to an aspect of the present invention, there is provided an optical switch characterized by comprising at least one input port which inputs input light, at least one output port which outputs output light, at least one mirror device which includes a mirror pivotally supported with respect to an x-axis and a y-axis perpendicular to the x-axis, and electrodes facing the mirror, the mirror device applying driving voltages corresponding to manipulated variables to the electrodes to tilt the mirror, thereby deflecting the input light input to the input port and making the input light selectively enter an arbitrary one of the at least one output port, a setting unit which sets, on a plane having coordinate axes represented by a manipulated variable $V_x$ and a manipulated variable $V_y$ to tilt the mirror about the x-axis and the y-axis, respectively, a perturbation pattern to change the manipulated variable $V_x$ and the manipulated variable $V_y$ so as to draw a circular trajectory based on a trigonometric function, a perturbation unit which perturbs the mirror by applying voltages to the electrodes based on the perturbation pattern, a detection unit which detects an intensity of output light which is input light input to one input port and output from one output port upon the perturbation of the mirror, and an error calculation/correction unit which calculates manipulated variables to obtain a tilt angle of the mirror corresponding to connection of the input port and the output port using a radius of the circular trajectory and a phase difference angle calculated based on an output light intensity waveform upon the perturbation of the mirror and perturbation waveforms used to draw the circular trajectory.

According to another aspect of the present invention, there is provided an optical switch characterized by comprising at least one input port which inputs input light, at least one output port which outputs output light, a first mirror device which includes a mirror pivotally supported with respect to an x-axis and a y-axis perpendicular to the x-axis, and electrodes facing the mirror, the first mirror device applying driving voltages corresponding to manipulated variables to the electrodes to tilt the mirror, thereby deflecting the input light, a second mirror device which includes a mirror pivotally supported with respect to an x-axis and a y-axis perpendicular to the x-axis, and electrodes facing the mirror, the second mirror device applying driving voltages corresponding to manipulated variables to the electrodes to tilt the mirror, thereby deflecting the light reflected by the first mirror device and outputting the light to the output port, a perturbation unit which perturbs the mirrors of the first mirror device and the second mirror device by applying voltages which periodically change around initial values of the driving voltages, an initial value generation unit which generates the initial values for the first mirror device and the second mirror device, a detection unit which detects an intensity of output light which is input light input to one input port and output from one output port upon the perturbation of the mirror, an error calculation unit which calculates an error of the manipulated variables based on the light intensity detected by the detection unit, and a correction unit which corrects the error based on the initial values using a predetermined time response waveform and updates the initial values, wherein the perturbation of the mirror of the first mirror device, the perturbation of the mirror of the second mirror device, and the detection of the light intensity are performed in synchronism.

According to still another aspect of the present invention, there is provided an optical switch characterized by comprising at least one input port which inputs input light, at least one output port which outputs output light, at least one mirror device which includes a mirror pivotally supported with respect to an x-axis and a y-axis perpendicular to the x-axis, and electrodes facing the mirror, the mirror device applying driving voltages corresponding to manipulated variables to the electrodes to tilt the mirror, thereby deflecting the input light input to the input port and making the input light selectively enter an arbitrary one of the at least one output port, a perturbation unit which perturbs the mirror by applying, to the electrodes, driving voltages corresponding to manipulated variables which change within a predetermined range, a detection unit which detects an intensity of output light which is input light input to one input port and output from one output port upon the perturbation of the mirror, a setting unit which sets a perturbation pattern which changes the manipulated variables within the predetermined range, an error calculation/correction unit which determines a coefficient of each degree of a surface mathematical model assumed for a light intensity distribution in three-dimensional space by identifying a light intensity distribution function surface, and calculates optimum manipulated variables for the input port and the output port based on a maximum value of the surface, the three-dimensional space having coordinate axes represented by a manipulated variable $V_x$ and a manipulated variable $V_y$ to tilt the mirror about the x-axis and the y-axis, respectively, and the output light intensity detected by the detection unit, and a switching unit which applies driving voltages corresponding to the manipulated variables to the electrodes.

According to still another aspect of the present invention, there is provided an optical switch control method characterized by comprising the setting step of setting, for an optical switch including at least one input port which inputs input light, at least one output port which outputs output light, and at least one mirror device which includes a mirror pivotally supported with respect to an x-axis and a y-axis perpendicular to the x-axis, and electrodes facing the mirror, the mirror device applying driving voltages corresponding to manipulated variables to the electrodes to tilt the mirror, thereby deflecting the input light input to the input port and making the input light selectively enter an arbitrary one of the at least one output port, on a plane having coordinate axes represented by a manipulated variable $V_x$ and a manipulated variable $V_y$ to tilt the mirror about the x-axis and the y-axis, respectively, a perturbation pattern to change the manipulated variable $V_x$ and the manipulated variable $V_y$ so as to draw a circular trajectory based on a trigonometric function, the perturbation step of perturbing the mirror by applying voltages to the electrodes based on the perturbation pattern, the detection step of detecting an intensity of output light which is input light input to one input port and output from one output port upon the perturbation of the mirror, and the error calculation/correction step of calculating manipulated variables to obtain a tilt angle of the mirror corresponding to connection of the input port and the output port using a radius of the circular trajectory and a phase difference angle calculated based on an output light intensity waveform upon the perturbation of the mirror and perturbation waveforms used to draw the circular trajectory.

According to still another aspect of the present invention, there is provided an optical switch control method of controlling an optical switch including at least one input port which inputs input light, at least one output port which outputs output light, a first mirror device which includes a mirror pivotally supported with respect to an x-axis and a y-axis perpendicular to the x-axis, and electrodes facing the mirror, the first mirror device applying driving voltages corresponding to manipulated variables to the electrodes to tilt the mirror, thereby deflecting the input light, and a second mirror device which includes a mirror pivotally supported with respect to an x-axis and a y-axis perpendicular to the x-axis, and electrodes facing the mirror, the second mirror device applying driving voltages corresponding to manipulated variables to the electrodes to tilt the mirror, thereby deflecting the light reflected by the first mirror device and outputting the light to the output port, characterized by comprising the first step of generating initial values of the driving voltages for the first mirror device and the second mirror device, the second step of perturbing the mirrors of the first mirror device and the second mirror device by applying voltages which periodically change around the initial values, the third step of calculating an error of the driving voltages based on an intensity of output light which is input light input to one input port and output from one output port upon the perturbation of the mirror, and the fourth step of correcting the error based on the initial values using a predetermined time response waveform and updates the initial values, wherein the second to fourth steps are repeated.

According to still another aspect of the present invention, there is provided an optical switch control method characterized by comprising the perturbation step of, for an optical switch including at least one input port which inputs input light, at least one output port which outputs output light, and at least one mirror device which includes a mirror pivotally supported with respect to an x-axis and a y-axis perpendicular to the x-axis, and electrodes facing the mirror, the mirror device applying driving voltages corresponding to manipulated variables to the electrodes to tilt the mirror, thereby deflecting the input light input to the input port and making the input light selectively enter an arbitrary one of the at least one output port, perturbing the mirror by applying, to the electrodes, driving voltages corresponding to manipulated variables which change within a predetermined range, the detection step of detecting an intensity of output light which is input light input to one input port and output from one output port upon the perturbation of the mirror, the setting step of setting a perturbation pattern which changes the manipulated variables within the predetermined range, the perturbation step of perturbing the mirror based on the perturbation pattern set in the setting step, the error calculation/correction step of determining a coefficient of each degree of a surface mathematical model assumed for a light intensity distribution in three-dimensional space by identifying a light intensity distribution function surface, and calculates optimum manipulated variables for the input port and the output port based on a maximum value of the surface, the three-dimensional space having coordinate axes represented by a manipulated variable $V_x$ and a manipulated variable $V_y$ to tilt the mirror about the x-axis and the y-axis, respectively, and the output light intensity detected by the detection unit, and the switching unit of applying driving voltages corresponding to the manipulated variables to the electrodes.

According to still another aspect of the present invention, there is provided a communication system characterized by comprising a plurality of optical switches connected in series, each optical switch including at least one input port which inputs input light, at least one output port which outputs output light, at least one mirror device which includes a mirror pivotally supported with respect to an x-axis and a y-axis perpendicular to the x-axis, and electrodes facing the mirror, the mirror device applying driving voltages corresponding to manipulated variables to the electrodes to tilt the mirror, thereby deflecting the input light input to the input port and making the input light selectively enter an arbitrary one of the at least one output port, a setting unit which sets, on a plane having coordinate axes represented by a manipulated variable $V_x$ and a manipulated variable $V_y$ to tilt the mirror about the x-axis and the y-axis, respectively, a perturbation pattern to change the manipulated variable $V_x$ and the manipulated variable $V_y$ so as to draw a circular trajectory based on a trigonometric function, a perturbation unit which perturbs the mirror by applying voltages to the electrodes based on the perturbation pattern, a detection unit which detects an intensity of output light which is input light input to one input port and output from one output port upon the perturbation of the mirror, and an error calculation/correction unit which calculates manipulated variables to obtain a tilt angle of the mirror corresponding to connection of the input port and the output port using a radius of the circular trajectory and a phase difference angle calculated based on an output light intensity waveform upon the perturbation of the mirror and perturbation waveforms used to draw the circular trajectory, and a management device which sends a control signal to control the perturbation of the mirror in each of the optical switches without synchronization of the perturbation of the mirror between the optical switches.

According to still another aspect of the present invention, there is provided a communication system characterized by comprising a plurality of optical switches connected in series, each optical switch including at least one input port which inputs input light, at least one output port which outputs output light, at least one mirror device which includes a mirror pivotally supported with respect to an x-axis and a y-axis perpendicular to the x-axis, and electrodes facing the mirror, the mirror device applying driving voltages corresponding to manipulated variables to the electrodes to tilt the mirror, thereby deflecting the input light input to the input port and making the input light selectively enter an arbitrary one of the at least one output port, a perturbation unit which perturbs the mirror by applying, to the electrodes, driving voltages corresponding to manipulated variables which change within a predetermined range, a detection unit which detects an intensity of output light which is input light input to one input port and output from one output port upon the perturbation of the mirror, a setting unit which sets a perturbation pattern which changes the manipulated variables within the predetermined range, an error calculation/correction unit which determines a coefficient of each degree of a surface mathematical model assumed for a light intensity distribution in three-dimensional space by identifying a light intensity distribution function surface, and calculates optimum manipulated variables for the input port and the output port based on a maximum value of the surface, the three-dimensional space having coordinate axes represented by a manipulated variable $V_x$ and a manipulated variable $V_y$ to tilt the mirror about the x-axis and the y-axis, respectively, and the output light intensity detected by the detection unit, and a switching unit which applies driving voltages corresponding to the manipulated variables to the electrodes, and a management device which sends a control signal to control the perturbation of the mirror in each of the optical switches without synchronization of the perturbation of the mirror between the optical switches.

Effects of the Invention

According to the present invention, voltage values on a plane specified by the radius of the circular trajectory and the phase difference angle between a trigonometric function which approximates the time series change in the light intensity upon the perturbation of the mirror and the trigonometric function used to set the perturbation pattern are set as optimum operating voltages. Even when a value deviates from a value that should be obtained due to the influence of disturbance noise at a certain timing, averaging using other acquired light intensities is implemented, and this enables to calculate a driving voltage for maximizing the light intensity. It is therefore possible to improve robustness against disturbance noise.

According to the present invention, perturbation voltages of a helical trajectory or a combined helical trajectory are output based on perturbation voltage patterns. The intensities of output light from the output port corresponding to the perturbation voltages are detected. Based on the combination of the perturbation voltage patterns and output light intensities, the coefficients of the degrees of an appropriate surface mathematical model in three-dimensional space assumed for the light intensity distribution are determined by identifying the surface using the relationship between the voltage outputs in the perturbation voltage patterns and the output light intensities detected in correspondence with the voltage outputs. The maximum value of the surface is obtained by numerical computation, thereby obtaining a control voltage for obtaining the maximum light intensity. It is consequently possible to end a search by one perturbation and implement high-speed switching.

According to the present invention, the perturbation of the mirror of the first mirror device, the perturbation of the mirror of the second mirror device, and light intensity detection are performed in synchronism. The error is corrected based on the initial values using a predetermined time response waveform, and the initial values are updated. This shortens the data collection time and increases the accuracy.

BRIEF DESCRIPTION OF DRAWINGS

FIG. 4A is a graph showing an example of a perturbation manipulated variable to be supplied to a micromirror device 3a;

FIG. 9A is a graph showing an example of a perturbation manipulated variable to be supplied to a micromirror device 3a;

FIG. 10A is a graph showing an example of a perturbation manipulated variable to be supplied to the micromirror device 3a;

FIG. 12 is a timing chart showing an experimental result according to the embodiment;

FIG. 13 is a block diagram showing the arrangement of a control device according to the third embodiment;

FIG. 15A is a view showing a reflected light beam trajectory upon perturbing a mirror 230a;

FIG. 24 is a block diagram schematically showing the arrangement of an optical switch according to the fourth embodiment of the present invention;

FIG. 25 is a block diagram schematically showing the arrangement of an optical switch according to the fifth embodiment of the present invention;

FIG. 26A is a graph showing the driving points of a micromirror device 3a;

BEST MODE FOR CARRYING OUT THE INVENTION

Figure 1:
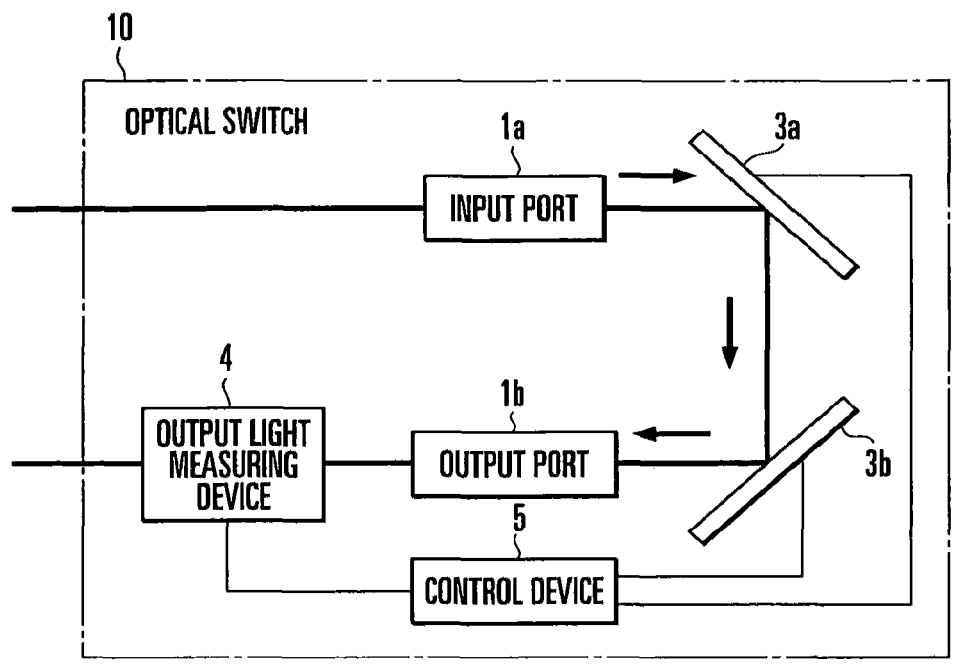
FIG. 1 is a block diagram showing the arrangement of an optical switch according to the first embodiment of the present invention.
Figure 2:
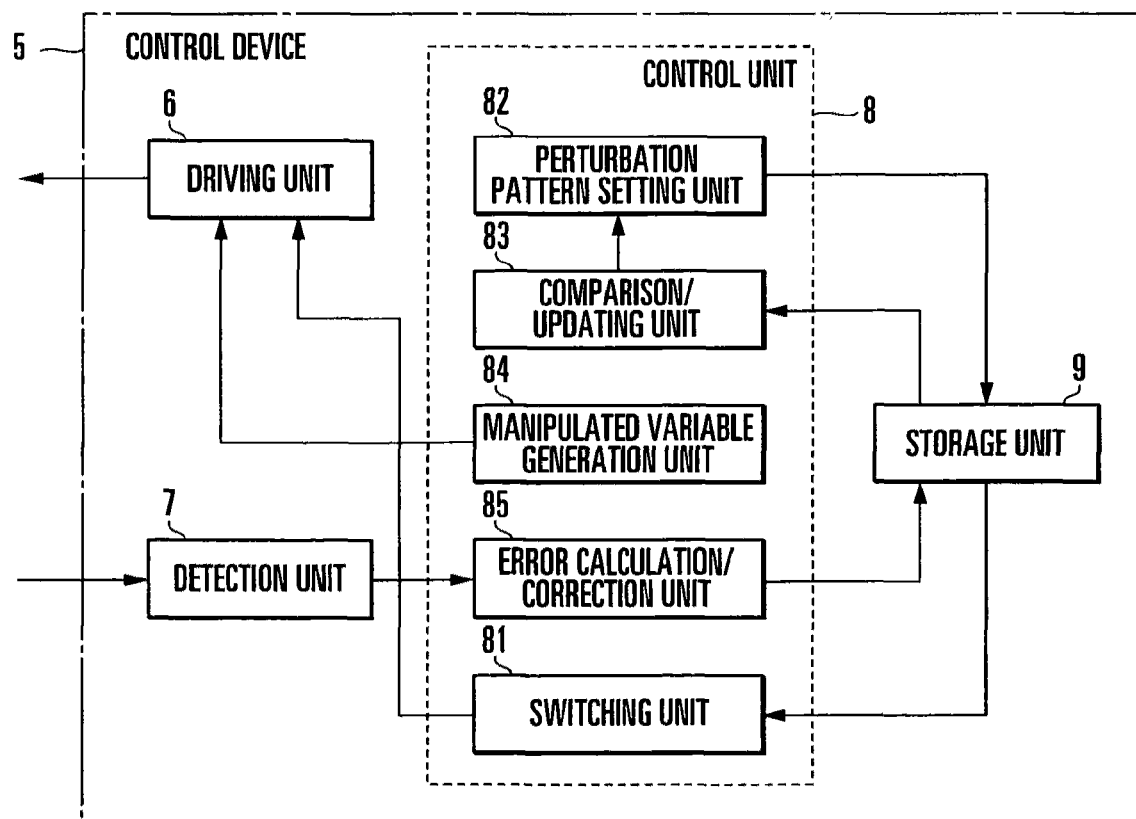
FIG. 2 is a block diagram showing the arrangement of a control device.

An embodiment of the present invention will now be described with reference to the accompanying drawings.

First Embodiment

An optical switch according to the first embodiment of the present invention will be described. The same names and reference numerals as in "Background Art" described with reference to FIGS. 37, 38, and 39 denote the same constituent elements in this embodiment, and a description will be omitted as needed.

Figure 38:
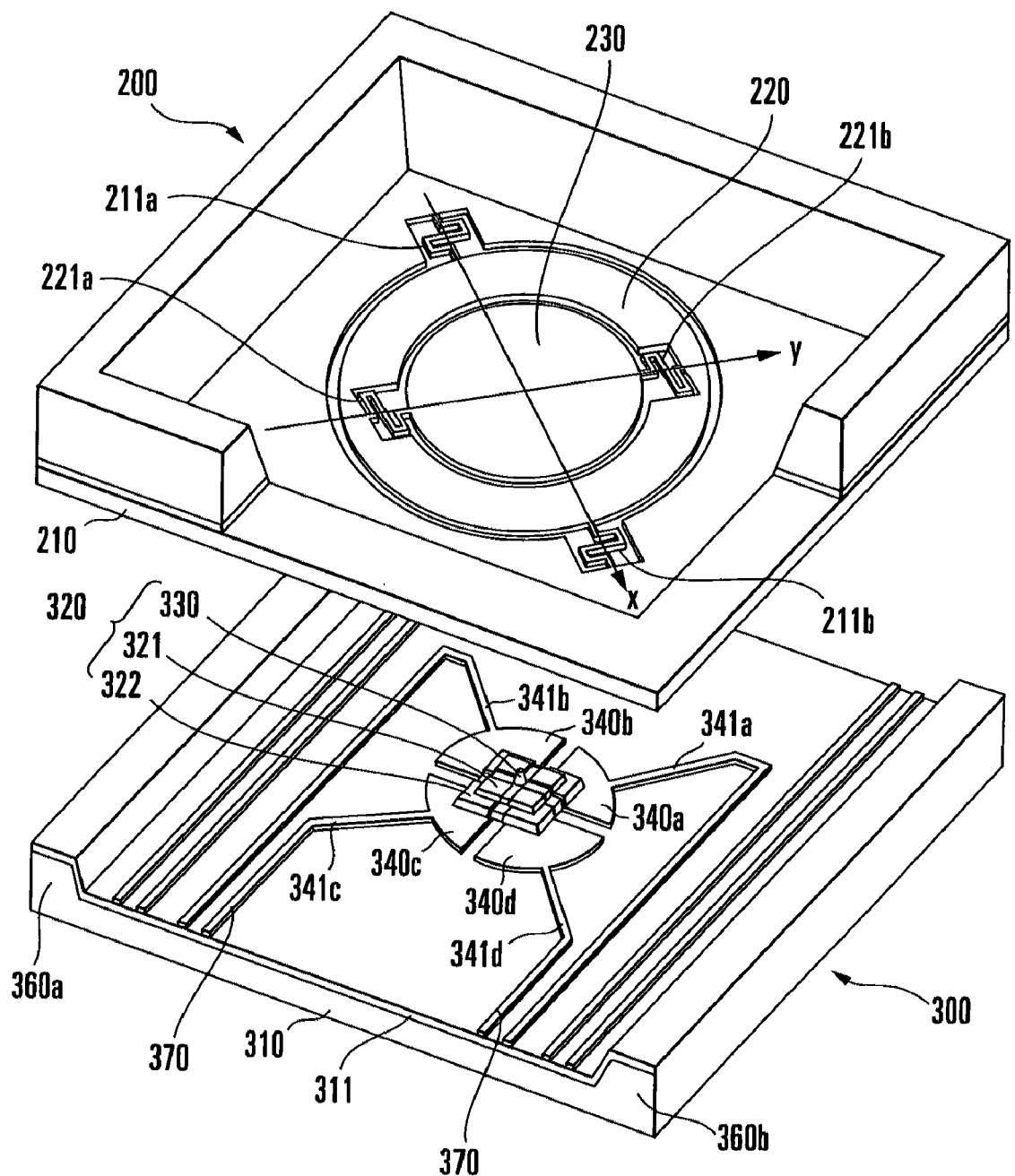
FIG. 38 is a perspective view schematically showing the arrangement of a mirror device.

As well shown in FIG. 38, four electrodes 340a to 340d face a mirror 230. The mirror 230 can be tilted in arbitrary directions about x- and y-axes by applying voltages to the electrodes 340a to 340d. Let $\theta_x$ be the tilt angle of the mirror 230 about the x-axis, $\theta_y$ be the tilt angle about the y-axis, and $V_x$ and $V_y$ be the manipulated variables corresponding to the tilt angles $\theta_x$ and $\theta_y$ in a one-to-one correspondence. Voltages V1 to V4 applied to the electrodes 340a to 340d, respectively, are given by $$V_1 = V_0 + V_x \quad (101)$$

$$V_2 = V_0 + V_y \quad (102)$$

$$V_3 = V_0 - V_x \quad (103)$$

$$V_4 = V_0 - V_y \quad (104)$$

where $V_0$ is a bias voltage which improves the linearity from the manipulated variable to the mirror tilt angle.

<Arrangement of Optical Switch>

As shown in FIG. 1, an optical switch 10 according to this embodiment includes an input port 1a, output port 1b, input-side micromirror device 3a, output-side micromirror device 3b, output light measuring device 4, and control device 5.

The output light measuring device 4 detects the intensity of output light which has outgone from the output port 1b and converts it into an electrical signal. The output light measuring device 4 can have an arrangement for extracting part of output light and measuring the output light intensity using a light-receiving element such as a photodiode.

The control device 5 includes a driving unit 6, detection unit 7, control unit 8, and storage unit 9.

The driving unit 6 applies driving voltages to the electrodes of the micromirror devices 3a and 3b to tilt the mirror 230 to a predetermined angle based on a manipulated variable generated by the control unit 8.

The detection unit 7 detects the output light measurement result of the output light measuring device 4 when the driving unit 6 has driven the micromirror devices 3a and 3b. The detected measurement result is output to the control unit 8.

The control unit 8 is a functional unit for controlling the operation of the entire optical switch and includes at least a switching unit 81, perturbation pattern setting unit 82, comparison/updating unit 83, manipulated variable generation unit 84, and error calculation/correction unit 85.

When connecting the optical paths of the arbitrary input port 1a and the arbitrary output port 1b, the switching unit 81 reads out, from the storage unit 9, manipulated variables corresponding to the initial tilt angles of the mirrors 230 of the micromirror devices 3a and 3b corresponding to the ports, and applies driving voltages to the electrodes via the driving unit 6.

Figure 39:
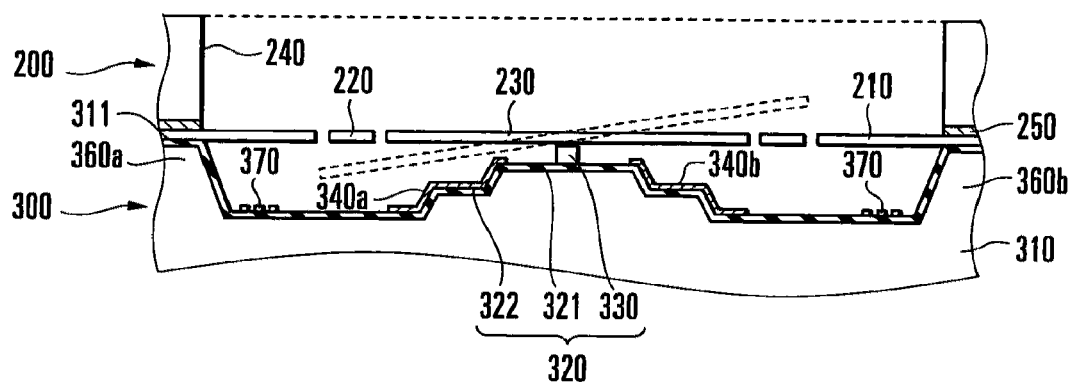
FIG. 39 is a sectional view schematically showing the arrangement of the mirror device.

The perturbation pattern setting unit 82 is a functional unit which sets a radius voltage Vs for determining the radius of a circle corresponding to the circular trajectory of the mirror 230 to be perturbed from the initial tilt angle and the number pt of division points (to be referred to as the "number of perturbation points" hereinafter) for the circular trajectory of a perturbation, and generates a manipulated variable based on the circular trajectory. The manipulated variable for each of the micromirror devices 3a and 3b, which is periodically changed to perturb the mirror 230 in accordance with the circular trajectory, will be referred to as a perturbation manipulated variable. Perturbation means applying driving voltages generated based on perturbation manipulated variables to the electrodes of the micromirror devices 3a and 3b so as to rotationally perturb each mirror 230 from the initial tilt angle. For example, when a micromirror device has the four electrodes 340a to 340d, as shown in FIGS. 38 and 39, driving voltages generated based on perturbation manipulated variables are applied to them, thereby perturbing the mirror 230. In this case, the voltages to be applied to the electrodes are determined in accordance with, e.g., the positional relationship between the electrodes and the mirror 230 and the perturbation direction of the mirror 230. Assume that the electrodes 340a and 340c drive the mirror 230 about the x-axis at the tilt angle $\theta_x$, and the direction in which the mirror 230 moves closer to the electrode 340a is defined as the positive direction. Assume that the electrodes 340b and 340d drive the mirror 230 about the y-axis at the tilt angle $\theta_y$, and the direction in which the mirror 230 moves closer to the electrode 340d is defined as the positive direction. For example, when the manipulated variable in the x-axis direction is Vx=10 [V], and the perturbation manipulated variable in the y-axis direction is Vy=−20 [V], a voltage of 10 [V] is applied to the electrode 340a, and a voltage of 20 [V] is applied to the electrode 340d. For example, to increase the linearity from the manipulated variable to the tilt angle using the bias voltage, the manipulated variable is converted into the driving voltage in accordance with equations (101) to (104). When the bias voltage $V_0$=30 [V], $V_0+V_x$=40 [V] is applied to the electrode 340a, $V_0+V_y$=10 [V] is applied to the electrode 340b, $V_0-V_x$=20 [V] is applied to the electrode 340c, and $V_0-V_y$=50 [V] is applied to the electrode 340d. The driving unit 6 converts the manipulated variables to the driving voltages. A voltage to be applied to rotate the mirror 230 in the x-axis direction will be referred to as an x-axis direction manipulated variable, and a voltage to be applied to rotate the mirror 230 in the y-axis direction will be referred to as a y-axis direction manipulated variable. The radius voltage Vs and the number pt of driving points set by the perturbation pattern setting unit 82 are stored in the storage unit 9.

The comparison/updating unit 83 compares a loss variation range estimate ΔPp in the circular trajectory perturbation calculated by the error calculation/correction unit 85 with a loss variation tolerance ΔP stored in the storage unit 9 in advance, thereby calculating the radius voltage Vs to be used in the next circular trajectory perturbation. Based on the calculation result, the comparison/updating unit 83 updates the radius voltage Vs set by the perturbation pattern setting unit 82. The updated radius voltage Vs is output to the perturbation pattern setting unit 82.

In accordance with the initial manipulated variables representing the initial tilt angles for optical path connection, which are set by the switching unit 81 for the mirrors 230 of the arbitrary micromirror devices 3a and 3b corresponding to the arbitrary input port 1a and the arbitrary output port 1b when connecting their optical paths, and the perturbation manipulated variables for the perturbation based on the circular trajectory radius voltage Vs and the number pt of driving points set by the perturbation pattern setting unit 82, the manipulated variable generation unit 84 sets manipulated variables to be used to perturb the mirrors 230 so that the driving unit 6 applies the driving voltages to the micromirror devices 3a and 3b.

Based on the output light intensity detection result from the detection unit 7 upon perturbations of the mirrors 230 by the manipulated variable generation unit 84, the error calculation/correction unit 85 calculates manipulated variables (to be referred to as "operation manipulated variables" hereinafter) to implement the optimum tilt angles of the mirrors 230 of the micromirror devices 3a and 3b corresponding to the input port 1a and output port 1b whose optical paths are connected. The error calculation/correction unit 85 also calculates the loss variation range estimate ΔPp upon circular trajectory perturbations of the mirrors 230. The calculated operation manipulated variables and loss variation range estimate ΔPp are stored in the storage unit 9. The loss variation range estimate ΔPp may be input to the comparison/updating unit 83.

The storage unit 9 stores the radius voltage Vs and the number pt of driving points set by the perturbation pattern setting unit 82, the preset loss variation tolerance ΔP, the perturbation voltage patterns set by the manipulated variable generation unit 84, the operation manipulated variables, and a program for implementing the operation of the optical switch 10.

The control device 5 is formed from a computer including an arithmetic device such as a CPU, a storage device such as a memory or an HDD (Hard Disk Drive), an input device such as a keyboard, mouse, pointing device, buttons, or touch panel to detect external information input, an I/F device which transmits/receives various kinds of information via a communication line such as the Internet, a LAN (Local Are Network), or a WAN (Wide Area Network), and a display device such as a CRT (Cathode Ray Tube), LCD (Liquid Crystal Display), FED (Field Emission Display), or organic EL (Electro Luminescence), and a program installed in the computer. That is, hardware resources and software resources cooperate so that the program controls the hardware resources, and the above-described driving unit 6, detection unit 7, control unit 8, and storage unit 9 are implemented. The program may be recorded on a recording medium such as a flexible disk, CD-ROM, DVD-ROM, or memory card and provided.

<Operation of Control Device>

Figure 3:
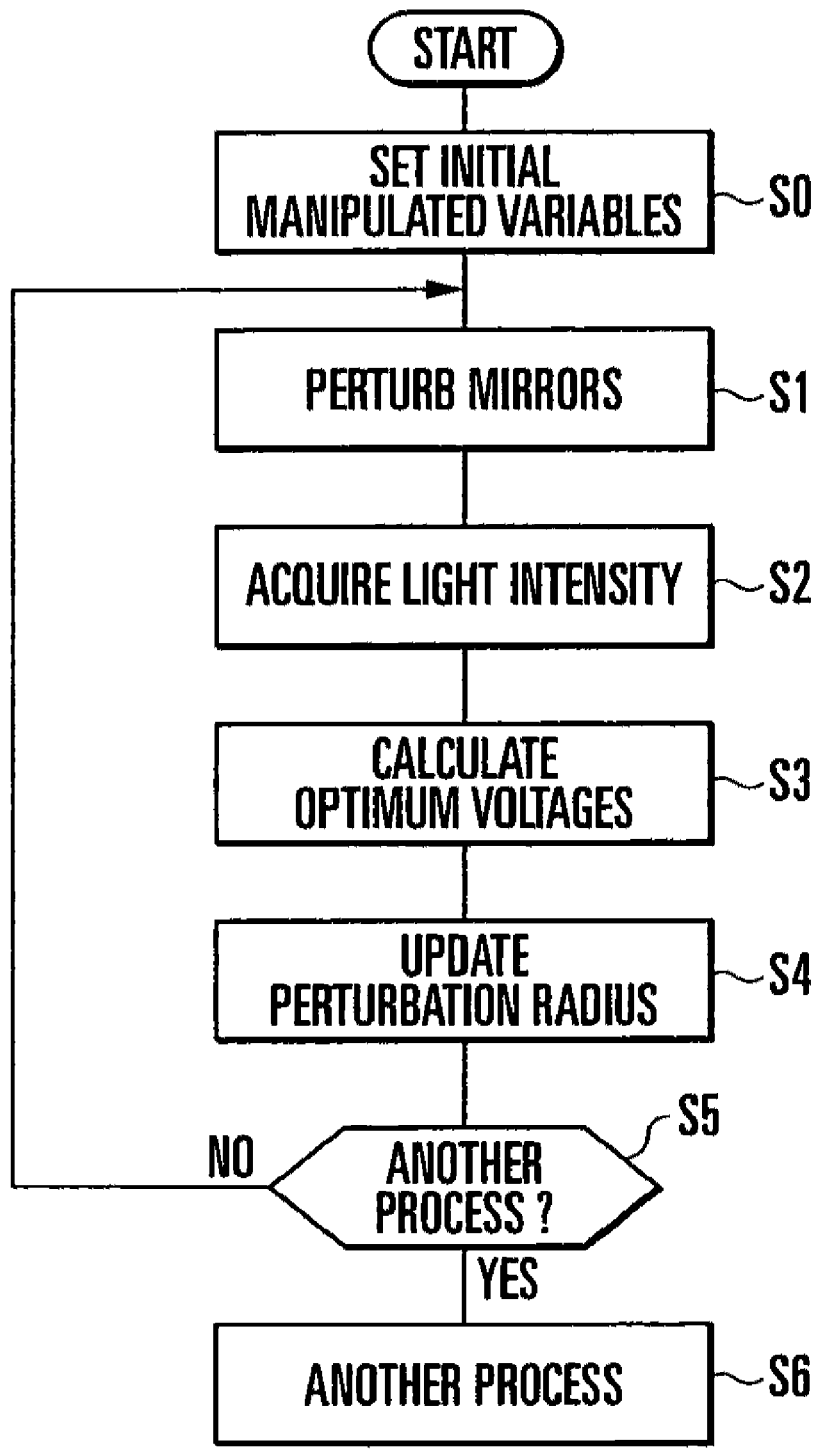
FIG. 3 is a flowchart illustrating the operation of the optical switch according to the first embodiment.

The operation of the control device of the optical switch according to this embodiment will be described next with reference to FIG. 3.

First, the switching unit 81 of the control unit 8 reads out, from the storage unit 9, manipulated variables corresponding to the initial tilt angles of the mirrors 230 of the micromirror devices 3a and 3b corresponding to the input port 1a and output port 1b whose optical paths are to be connected, and sets initial manipulated variables. The manipulated variable generation unit 84 applies driving voltages to the corresponding electrodes of the micromirror devices 3a and 3b in accordance with the control units (step S0).

Next, the manipulated variable generation unit 84 of the control unit 8 applies, via the driving unit 6, driving voltages to the corresponding electrodes of the micromirror devices 3a and 3b based on the perturbation manipulated variables set by the perturbation pattern setting unit 82, thereby perturbing the mirrors 230 from the initial tilt angles (step S1). A perturbation pattern setting operation for the perturbation will be described later in detail.

When the mirrors 230 are perturbed, the detection unit 7 detects the intensity of output light from the output port 1b measured by the output light measuring device 4 (step S2). The detected light intensity is input to the error calculation/correction unit 85.

When the light intensity at the time of perturbation is detected, the error calculation/correction unit 85 of the control unit 8 corrects and updates the above-described initial manipulated variables to manipulated variables for obtaining the maximum light intensity, i.e., operation manipulated variables based on the perturbation manipulated variables and light intensity value corresponding to each perturbation manipulated variable, thereby adjusting the tilt angles of the mirrors 230 (step S3). The optimum value search operation of the error calculation/correction unit 85 will be described later in detail. At this time, the error calculation/correction unit 85 calculates the loss variation range estimate $\Delta Pp$ upon circular trajectory perturbations of the mirrors 230.

When the operation manipulated variables are calculated, the comparison/updating unit 83 compares the loss variation range estimate $\Delta Pp$ calculated by the error calculation/correction unit 85 with the loss variation tolerance $\Delta P$ stored in the storage unit 9 and updates the radius of the circle for the circular trajectory perturbation of the mirror 230 (step S4). The circular trajectory perturbation radius updating operation will be described later in detail.

If a process except the above-described steps S0 to S4 is requested (YES in step S5), the control device 5 performs another process (step S6). If no process except the above-described steps S0 to S4 is requested (NO in step S5), the control device 5 returns to the process in step S1 and repeatedly performs the above-described process of stably operating the optical switch 10 (step S6).

<Perturbation Pattern Setting Operation>

The perturbation pattern setting operation of the perturbation pattern setting unit 82 of the control unit 8 will be described next in detail. The perturbation pattern setting operation is an operation of setting the perturbation manipulated variables to be supplied to the micromirror devices 3a and 3b to perturb the mirrors 230. This operation will be described using an example in which a perturbation manipulated variable for circular trajectory (to be referred to as a circular trajectory perturbation manipulated variable hereinafter) to be supplied to the arbitrary micromirror device 3a is set.

When setting the circular trajectory perturbation manipulated variable of the arbitrary micromirror device 3a, the perturbation pattern setting unit 82 sets an initial value $V_{x0}$ of the x-axis direction manipulated variable, an initial value $V_{y0}$ of the y-axis direction manipulated variable, the radius voltage Vs, and the number Pt of driving points of the micromirror device 3a, and calculates driving voltages at each driving point i in accordance with equations (1) and (2) below based on these values. Note that the initial values $V_{x0}$ and $V_{y0}$, radius voltage Vs, and number Pt of driving points are stored in the storage unit 9 in advance. The x- and y-axes are set to be almost parallel to the mirror 230 and perpendicular to each other.

$$V_x[i] = V_{x0} + V_s * \sin(i * 2\pi/Pt) \quad (1)$$

$$V_y[i] = V_{y0} + V_s * \cos(i * 2\pi/Pt) + V_s \quad (2)$$

where i is the identification number of a driving point.

Figure 4A:
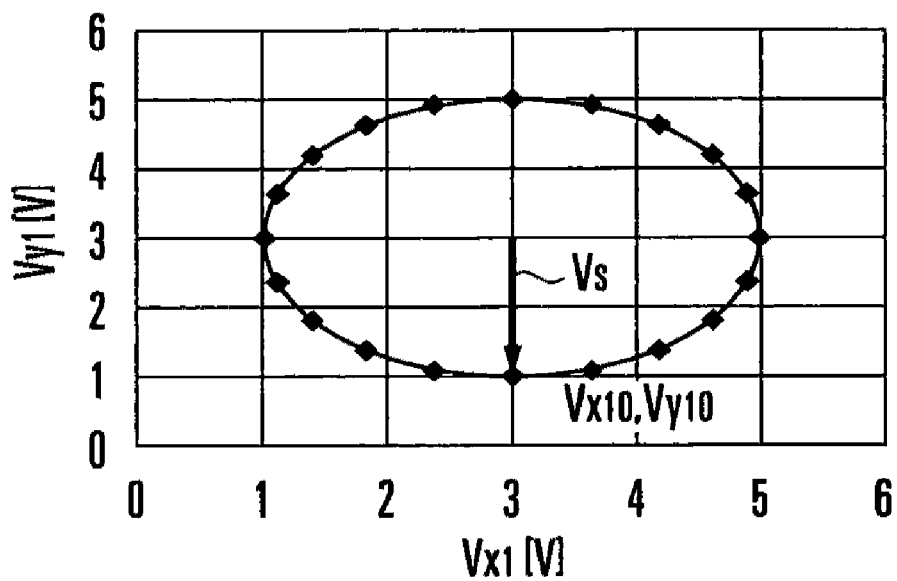
Figure 4B:
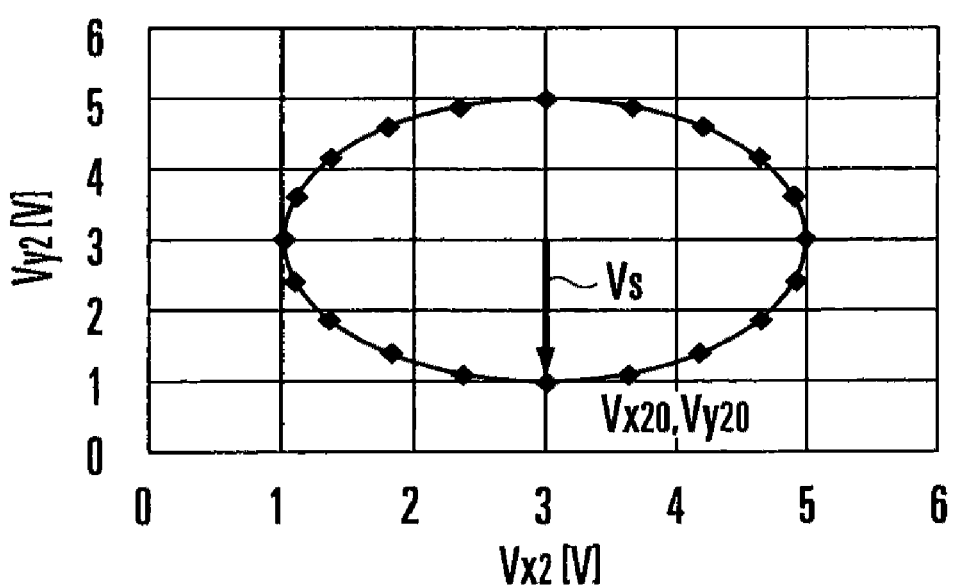
FIG. 4B is a graph showing an example of a perturbation manipulated variable to be supplied to a micromirror device 3b.

FIGS. 4A and 4B shows examples of perturbation manipulated variables calculated by equations (1) and (2) assuming that the number of driving points is 20. For the micromirror device 3a, a perturbation manipulated variable including manipulated variables arranged in a circular trajectory as shown in FIG. 4A is set. Similarly, for the micromirror device 3b, a perturbation manipulated variable including manipulated variables arranged in a circular trajectory as shown in FIG. 4B is set. The series of manipulated variables included in a perturbation manipulated variable will be referred to as a perturbation pattern. Each point of the perturbation manipulated variables shown in FIGS. 4A and 4B indicates a manipulated variable in the x and y direction.

The thus set perturbation patterns are used by the manipulated variable generation unit 84 in the following way.

Assume that an external optical signal is input to the input port 1a, and its optical path is being connected to the output port 1b. In this state, the manipulated variable generation unit 84 perturbs the mirrors 230 of the micromirror devices 3a and 3b corresponding to the ports based on preset perturbation voltage patterns to search for optimum operation manipulated variables which minimize the connection loss of the propagating optical signal. The manipulated variable generation unit 84 also sets initial values $Vx_{02}$ and $Vy_{02}$ of the manipulated variables of the micromirror device 3b, and causes the driving unit 6 to convert the manipulated variables at the 20 points set by the perturbation manipulated variable of the micromirror device 3a into driving voltages and sequentially output them, thereby perturbing the mirror 230. The light intensity of the optical signal measured by the output light measuring device 4 via the detection unit 7 at this time is stored in the storage unit 9.

After the mirror 230 is perturbed based on the perturbation pattern set for the micromirror device 3a, the manipulated variables of the micromirror device 3a are returned to initial values $Vx_{01}$ and $Vy_{01}$. Then, the micromirror device 3b is perturbed, like the micromirror device 3a. The light intensity of the optical signal measured by the output light measuring device 4 via the detection unit 7 at this time is stored in the storage unit 9. When the perturbation of the micromirror device 3b has ended, the manipulated variables of the micromirror device 3b are returned to the initial values $Vx_{02}$ and $Vy_{02}$.

<Optimum Value Search Operation>

Figure 5:
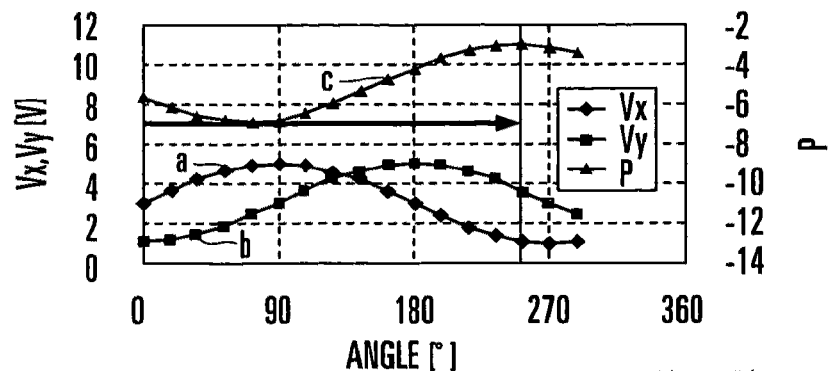
FIG. 5 is a graph showing the relationship between a perturbation voltage pattern and a light intensity.
Figure 6:
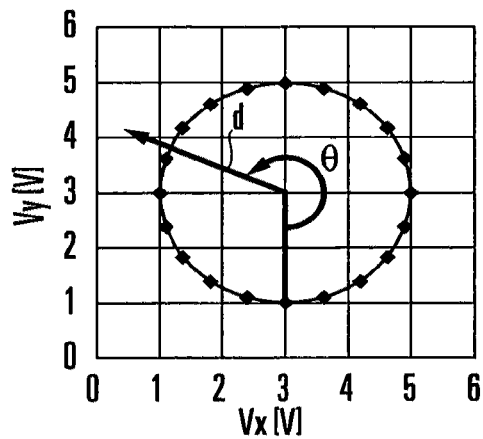
FIG. 6 is a graph showing Vx and Vy in FIG. 5.

The optimum value search operation of the error calculation/correction unit 85 will be described next. The perturbation manipulated variables along the x- and y-axes which are almost parallel to the mirror 230 and perpendicular to each other are calculated using a sine function complying with equation (1) concerning the x-axis direction and a cosine function complying with equation (2) concerning the y-axis direction. At this time, the perturbation patterns along the x- and y-axes are represented by manipulated variables Vx (a) and Vy (b) shown in FIG. 5. When driving voltages corresponding to the manipulated variables are applied in the x- and y-axis directions, the perturbation manipulated variable forms a circular trajectory on a $V_x$-$V_y$ plane, as shown in FIG. 6. The mirror is perturbed in the circular trajectory, and the output light intensity detected upon making the mirror 230 pivot by applying driving voltages corresponding to the manipulated variables in the perturbation pattern is stored in the storage unit 9.

Assume that the time series data of an acquired output light intensity P indicated by c in FIG. 5 can be approximated to a cosine function represented by equation (3) below. A phase difference θ between the cosine function and the sine or cosine function used to set the x- and y-axis perturbation patterns for the circular trajectory perturbation is calculated. This calculation is done by, e.g., the least squares method, FFT of the light intensity P, or the product-sum operation and averaging of the light intensity P and the perturbation manipulated variables.

$$P = P0 + \Delta Pp \cdot \cos(i \cdot 2\pi/Pt - \theta) \quad (3)$$

where $\Delta Pp$ is the variation range of the light intensity upon circular trajectory perturbation.

The phase difference calculated by equation (3) is defined as the direction angle $\theta$ for obtaining the maximum light intensity P. That is, it means that a driving voltage that ensures the maximum light intensity P exists in a direction d indicated by the arrow in FIG. 6. Hence, the manipulated variable at coordinates defined by polar coordinates represented by the direction angle $\theta$ and the radius voltage Vs is calculated. Voltage values at the coordinates defined by the function for setting the driving voltages of the mirror 230 are calculated and set as the driving voltages for one output port.

Equations (4) and (5) represent manipulated variables on the circular trajectory at the maximum direction angle for the micromirror device 3a.

$$Vxp = Vxo + Vs \cdot \sin(\theta) \quad (4)$$

$$Vyp = Vyo + Vs \cdot \cos(\theta) + Vs \quad (5)$$

where $V_{xp}$ and $V_{yp}$ are the values of the x- and y-axis direction manipulated variables for obtaining the maximum output light intensity on the circular trajectory.

<Updating Operation of Circular Trajectory Perturbation Radius>

The circular trajectory perturbation radius voltage updating operation will be described next. The comparison/updating unit 83 compares the loss variation range estimate $\Delta Pp$ in the circular trajectory perturbation calculated by the error calculation/correction unit 85 with the loss variation tolerance $\Delta P$ stored in the storage unit 9, and sets the radius voltage Vs to be used in the next circular trajectory perturbation.

More specifically, based on the loss variation range estimate $\Delta Pp$ calculated from the value of the output light intensity upon circular trajectory perturbation and the loss variation tolerance $\Delta P$ stored in the storage unit 9 in advance, the comparison/updating unit 83 calculates a next radius voltage Vs' by equation (6) below. The comparison/updating unit 83 updates the radius voltage to be used for the circular trajectory perturbation by decreasing the radius of circular trajectory to be used in the next perturbation if the output light intensity variation range $\Delta Pp$ is larger than the loss variation tolerance $\Delta P$, and increasing the radius of circular trajectory to be used in the next perturbation if the output light intensity variation range $\Delta Pp$ is smaller than the loss variation tolerance $\Delta P$.

$$Vs' = Vs + (\Delta P - \Delta Pp) \cdot k \quad (6)$$

where k is a parameter to determine the variation range of the radius voltage in one perturbation.

In this way, the comparison/updating unit 83 updates the radius voltage Vs set by the perturbation pattern setting unit 82. The updated radius voltage Vs is output to the perturbation pattern setting unit 82 and used to set the next circular trajectory perturbation.

Figure 7:
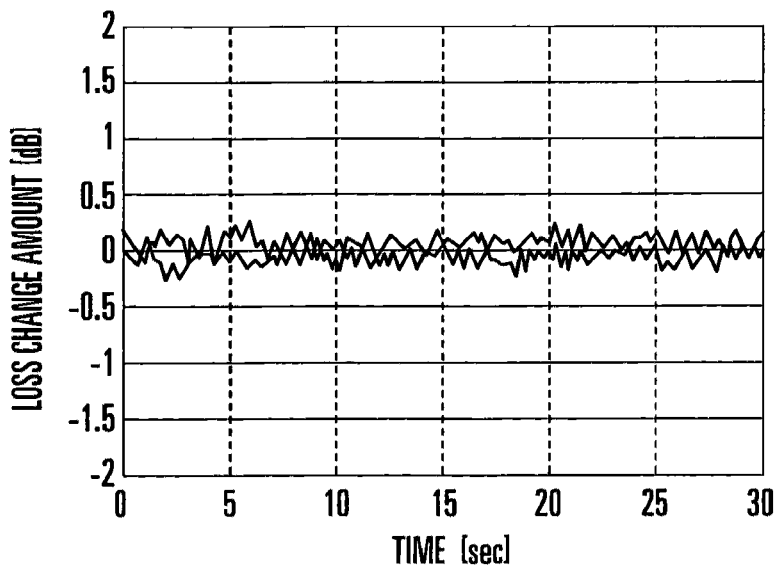
FIG. 7 is a timing chart showing an experimental result according to the embodiment.

FIG. 7 shows an experimental result obtained by executing optical connection according to the embodiment and performing stabilizing control of the optical connection intensity. As shown in FIG. 7, it was confirmed that it is possible to calculate a manipulated variable for obtaining the maximum light intensity and maintain the optical connection intensity within the set loss variation tolerance.

The loss variation tolerance $\Delta P$ may have a range from a loss variation tolerance minimum value $\Delta Ppmin$ to a loss variation tolerance maximum value $\Delta Ppmax$. In this case, if the loss variation range estimate $\Delta Pp$ is smaller than the loss variation tolerance minimum value $\Delta Ppmin$, the radius voltage is updated by increasing the radius of circular trajectory to be used in the next perturbation. On the other hand, if the loss variation range estimate $\Delta Pp$ is larger than the loss variation tolerance maximum value $\Delta Ppmax$, the radius voltage is updated by decreasing the radius of circular trajectory.

As described above, according to this embodiment, even when a value deviates from a value that should be obtained due to the influence of disturbance noise at a certain timing, averaging using other acquired light intensities is implemented, and this enables to calculate a driving voltage for maximizing the light intensity. It is therefore possible to improve robustness against disturbance noise.

Figure 28:
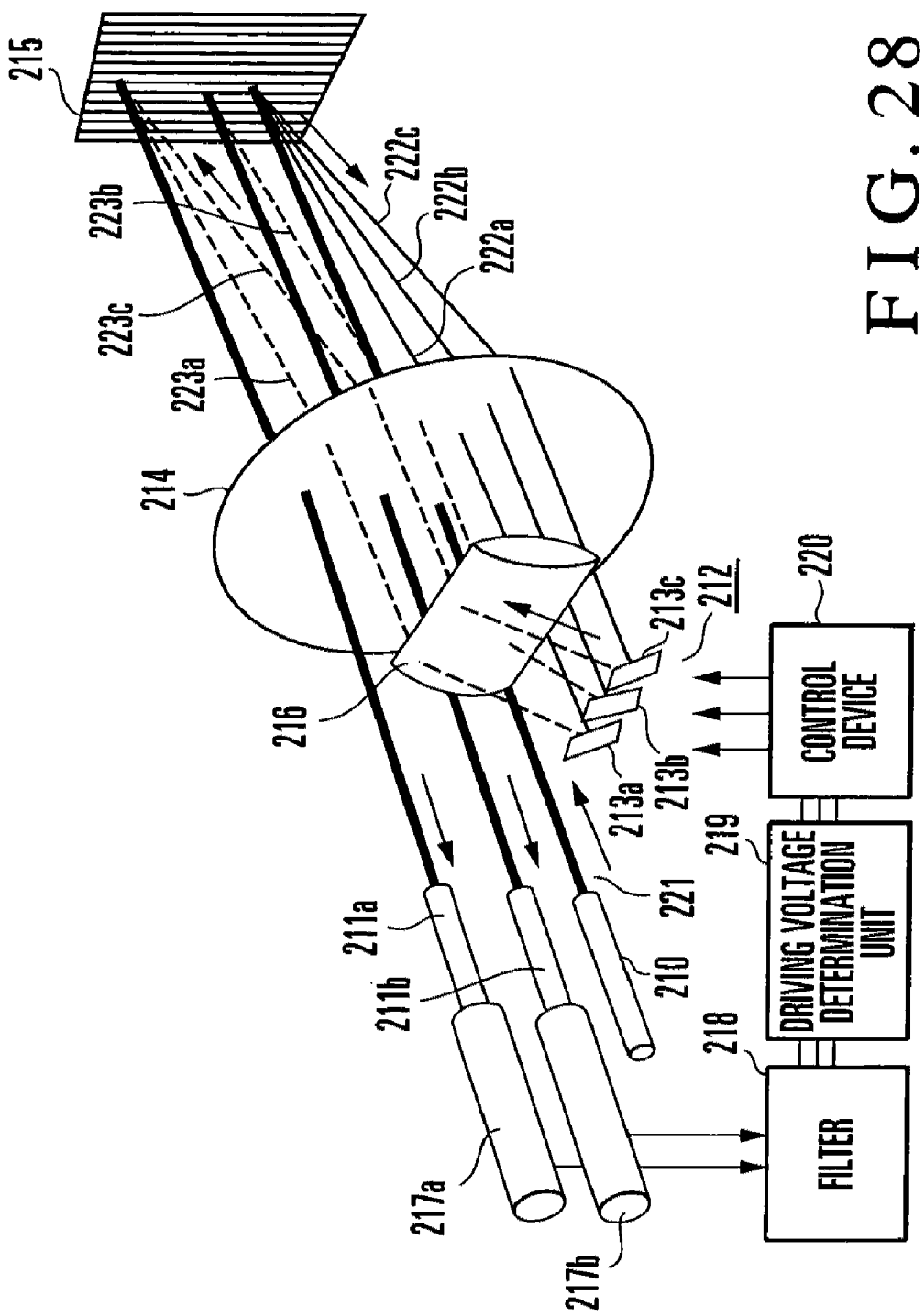
FIG. 28 is a view schematically showing the arrangement of a wavelength selective switch according to the sixth embodiment of the present invention.
Figure 29:
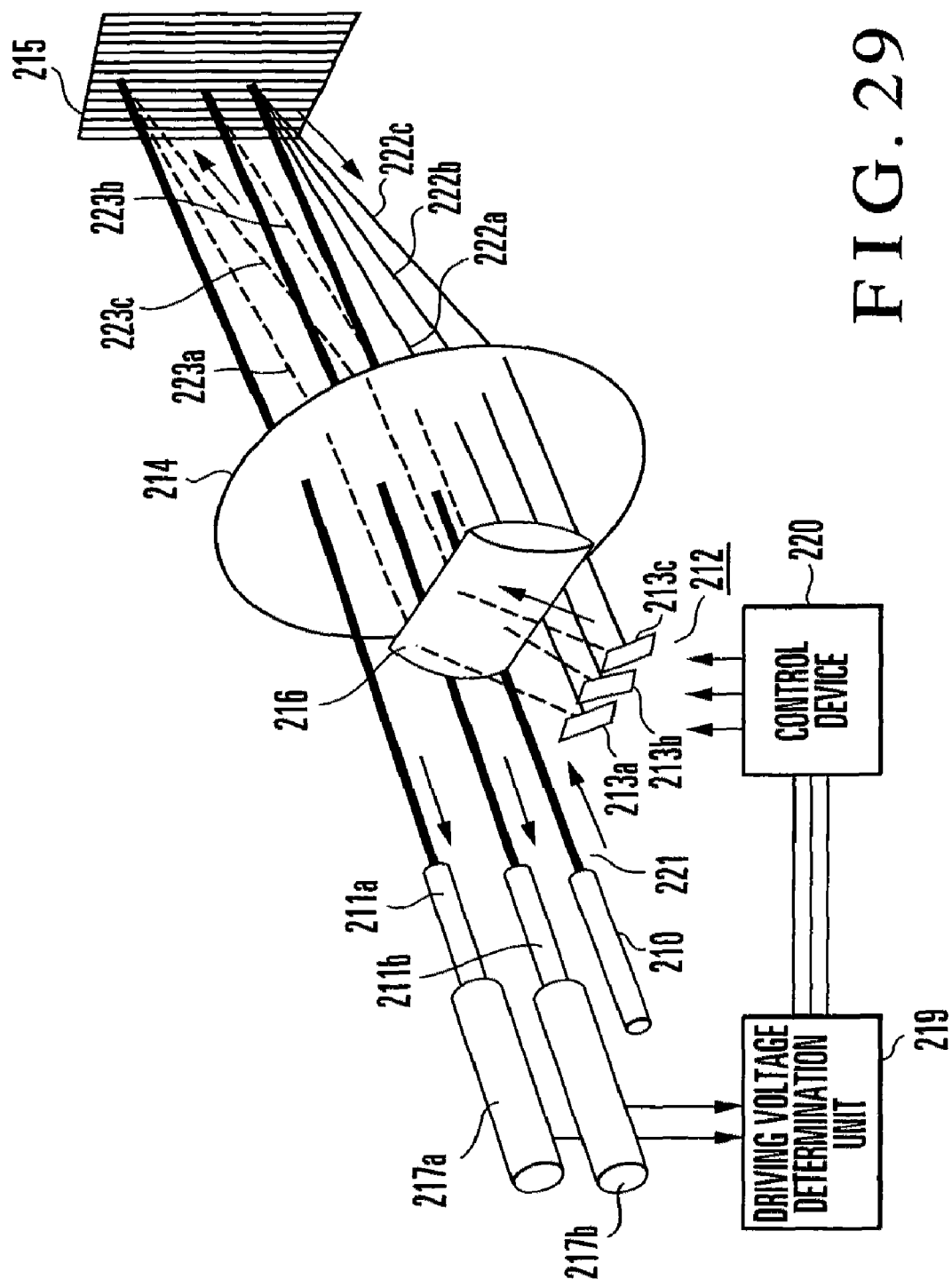
FIG. 29 is a view schematically showing the arrangement of a wavelength selective switch according to the seventh embodiment of the present invention.

In this embodiment, an example has been described in which two micromirror devices exist. However, the arrangement is also applicable to a wavelength selective switch which arbitrarily switches the wavelength of input light and outputs the light from an output port, as shown in FIGS. 28 and 29 to be described later. In this case, each micromirror device included in the wavelength selective switch is perturbed by the same method as described above, and the output light intensity at that time is detected, thereby calculating a driving voltage for maximizing the output light intensity.

Second Embodiment

The second embodiment of the present invention will be described next. The same names and reference numerals as in the first embodiment and "Background Art" described with reference to FIGS. 37, 38, and 39 denote the same constituent elements in the second embodiment, and a description will be omitted as needed.

As shown in FIG. 1, an optical switch according to this embodiment includes an input port 1a, output port 1b, input-side micromirror device 3a, output-side micromirror device 3b, output light measuring device 4, and control device 5.

Figure 8:
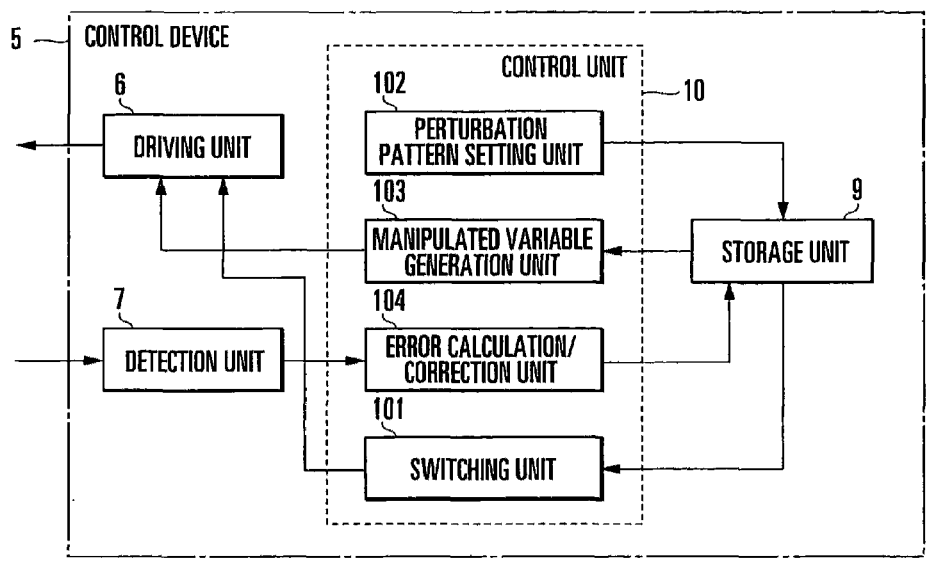
FIG. 8 is a block diagram showing the arrangement of a control device according to the second embodiment.

The control device 5 includes a driving unit 6, detection unit 7, storage unit 9, and control unit 10, as shown in FIG. 8.

The control unit 10 is a functional unit for controlling the operation of the entire optical switch and includes at least a switching unit 101, perturbation pattern setting unit 102, manipulated variable generation unit 103, and error calculation/correction unit 104.

When connecting the optical paths of the arbitrary input port 1a and the arbitrary output port 1b, the switching unit 101 reads out, from the storage unit 9, manipulated variables corresponding to the initial tilt angles of mirrors 230 of the micromirror devices 3a and 3b corresponding to the ports, and applies driving voltages to the electrodes via the driving unit 6.

The perturbation pattern setting unit 102 is a functional unit which sets a radius voltage Vs for determining the radius of a circle corresponding to the circular trajectory of the mirror 230 to be perturbed from the initial tilt angle and the number pt of division points (to be referred to as the "number of perturbation points" hereinafter) for the circular trajectory of perturbation, and generates a manipulated variable based on the circular trajectory. The manipulated variable for each of the micromirror devices 3a and 3b, which is periodically changed to perturb the mirror 230 in accordance with the circular trajectory, will be referred to as a perturbation manipulated variable. Perturbation means applying driving voltages generated based on perturbation manipulated variables to the electrodes of the micromirror devices 3a and 3b so as to rotationally perturb each mirror 230 from the initial tilt angle. For example, when a micromirror device has four electrodes 340a to 340d, as shown in FIGS. 38 and 39, driving voltages generated based on perturbation manipulated variables are applied to them, thereby perturbing the mirror 230. In this case, the voltages to be applied to the electrodes are determined in accordance with, e.g., the positional relationship between the electrodes and the mirror 230 and the perturbation direction of the mirror 230. Assume that the electrodes 340a and 340c drive the mirror 230 about the x-axis at a tilt angle $\theta_x$, and the direction in which the mirror 230 moves closer to the electrode 340a is defined as the positive direction. Assume that the electrodes 340b and 340d drive the mirror 230 about the y-axis at a tilt angle $\theta_y$, and the direction in which the mirror 230 moves closer to the electrode 340d is defined as the positive direction. For example, when the manipulated variable in the x-axis direction is Vx=10 [V], and the perturbation manipulated variable in the y-axis direction is Vy=−20 [V], a voltage of 10 [V] is applied to the electrode 340a, and a voltage of 20 [V] is applied to the electrode 340d. For example, to increase the linearity from the manipulated variable to the tilt angle using the bias voltage, the manipulated variable is converted into the driving voltage in accordance with equations (101) to (104). When a bias voltage $V_0$=30 [V], $V_0+V_x$=40 [V] is applied to the electrode 340a, $V_0+V_y$=10 [V] is applied to the electrode 340b, $V_0−V_x$=20 [V] is applied to the electrode 340c, and $V_0−V_y$=50 [V] is applied to the electrode 340d. The driving unit 6 converts the manipulated variables to the driving voltages. A voltage to be applied to rotate the mirror 230 in the x-axis direction will be referred to as an x-axis direction manipulated variable, and a voltage to be applied to rotate the mirror 230 in the y-axis direction will be referred to as a y-axis direction manipulated variable. The radius voltage Vs and the number pt of driving points set by the perturbation pattern setting unit 102 are stored in the storage unit 9.

In accordance with the initial manipulated variables generated by the switching unit 101 which sets, for optical path connection, the initial tilt angles of the mirrors 230 of the arbitrary micromirror devices 3a and 3b corresponding to the arbitrary input port 1a and the arbitrary output port 1b when connecting their optical paths, and the perturbation manipulated variables for the perturbation based on the perturbation pattern setting unit 102, the manipulated variable generation unit 103 generates the manipulated variables of the mirrors 230 so that the driving unit 6 applies the driving voltages to the micromirror devices 3a and 3b.

Based on the output light intensity detection result from the detection unit 7 upon perturbations of the mirrors 230 by the manipulated variable generation unit 103, the error calculation/correction unit 104 calculates manipulated variables (to be referred to as "operation manipulated variables" hereinafter) to implement the optimum tilt angles of the mirrors 230 of the micromirror devices 3a and 3b corresponding to the input port 1a and output port 1b whose optical paths are connected, thereby correcting and updating the initial manipulated variables. The operation manipulated variables are stored in the storage unit 9.

The control device 5 is formed from a computer including an arithmetic device such as a CPU, a storage device such as a memory or an HDD (Hard Disk Drive), an input device such as a keyboard, mouse, pointing device, buttons, or touch panel to detect external information input, an I/F device which transmits/receives various kinds of information via a communication line such as the Internet, a LAN (Local Are Network), or a WAN (Wide Area Network), and a display device such as a CRT (Cathode Ray Tube), LCD (Liquid Crystal Display), FED (Field Emission Display), or organic EL (Electro Luminescence), and a program installed in the computer. That is, hardware resources and software resources cooperate so that the program controls the hardware resources, and the above-described driving unit 6, detection unit 7, storage unit 9, and control unit 10 are implemented. The program may be recorded on a recording medium such as a flexible disk, CD-ROM, DVD-ROM, or memory card and provided.

<Perturbation Pattern Setting Operation>

The perturbation pattern setting operation of the perturbation pattern setting unit 102 will be described next.

The perturbation pattern setting unit 102 generates a perturbation manipulated variable pattern to perturb a mirror based on an x-axis direction manipulated variable Vxo, y-axis direction manipulated variable Vyo, perturbation range ΔV, and the number Pt of perturbation points, which have initial values input by the user in advance for the start of perturbation.

Figure 9A:
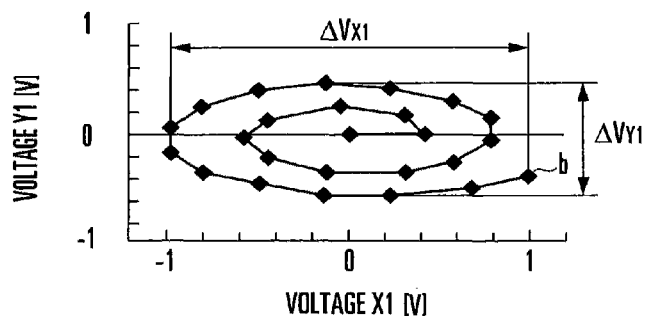
Figure 9B:
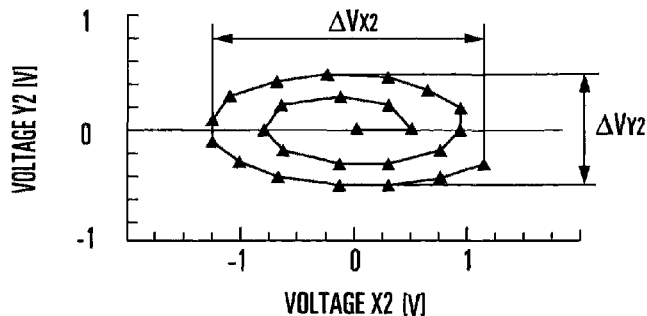
FIG. 9B is a graph showing an example of a perturbation manipulated variable to be supplied to a micromirror device 3b.

A first example will be described in which setting the perturbation range ΔV to ΔVx1 in the x-axis direction and ΔVy1 in the y-axis direction of the micromirror device 3a, and ΔVx2 in the x-axis direction and ΔVy2 in the y-axis direction of the micromirror device 3b, perturbation manipulated variables are set at 25 points on a helical pattern. Note that the x- and y-axes are set to be almost parallel to the mirror 230 and perpendicular to each other. For the micromirror device 3a, the pattern in the range defined by $\Delta Vx_1$ and $\Delta Vy_1$ is divided at 25 points at a predetermined interval, thereby setting the perturbation manipulated variables, as shown in FIG. 9A. For the micromirror device 3b as well, the pattern in the range defined by $\Delta Vx_2$ and $\Delta Vy_2$ is divided at 25 points at a predetermined interval, thereby setting the perturbation manipulated variables, as shown in FIG. 9B. Each point of the perturbation manipulated variables shown in FIGS. 9A and 9B indicates a manipulated variable in the x and y direction.

Figure 10A:
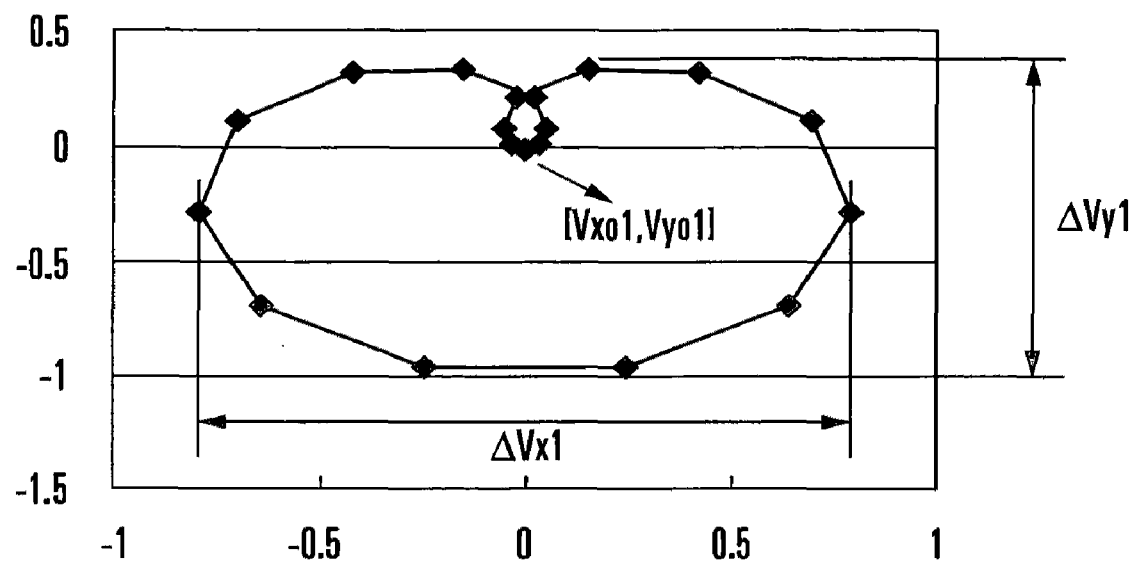
Figure 10B:
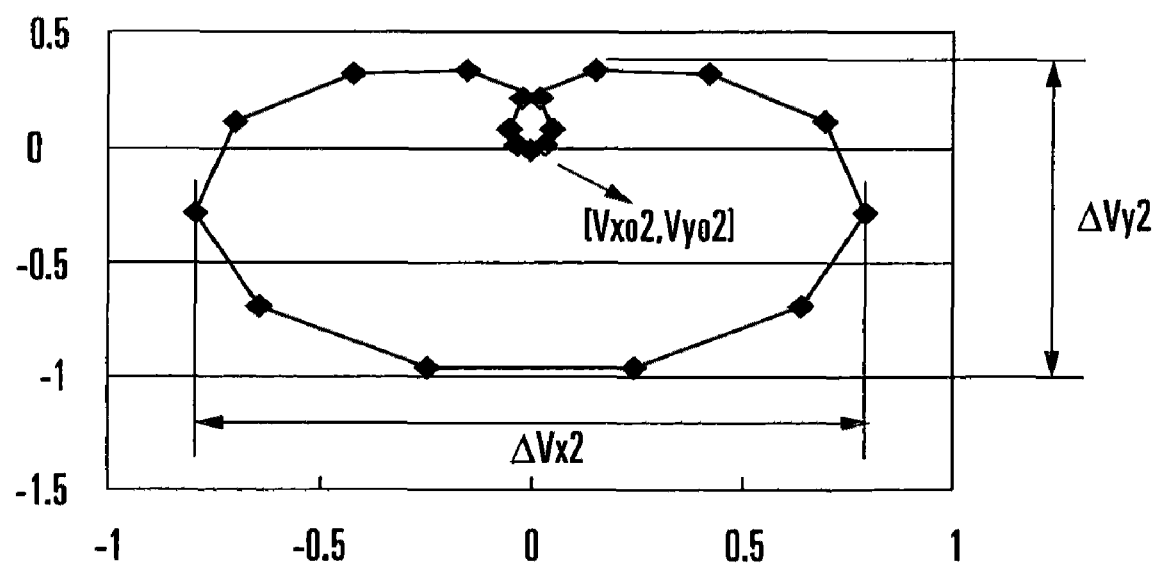
FIG. 10B is a graph showing an example of a perturbation manipulated variable to be supplied to the micromirror device 3b.

A second example of perturbation pattern setting will be described in which perturbation manipulated variables are set at 20 points on a combined helical pattern. In this case, the perturbation pattern setting unit 102 sets the initial value of a first helical pattern having a trajectory from the outside to the center and the final value of a second helical pattern having a trajectory from the center to the outside to the same manipulated variable, and the final value of the first helical pattern and the initial value of the second helical pattern to the same manipulated variable so that the manipulated variable sequentially changes from the first helical pattern to the second helical pattern. More specifically, for the micromirror device 3a, the perturbation manipulated variables are set in a perturbation pattern as shown in FIG. 10A. For the micromirror device 3b as well, the perturbation manipulated variables are set in a perturbation pattern as shown in FIG. 10B.

Assume that an external optical signal is input to the input port 1a, and its optical path is being connected to the output port 1b. In this state, the manipulated variable generation unit 103 perturbs the mirrors 230 of the micromirror devices 3a and 3b corresponding to the ports based on preset perturbation voltage patterns to search for optimum operation manipulated variables which minimize the connection loss of the propagating optical signal. The manipulated variable generation unit 103 also sets initial values $Vx_{0.2}$ and $Vy_{0.2}$ of the perturbation voltages of the micromirror device 3b, and causes the driving unit 6 to convert the manipulated variables at the 25 points set by the perturbation manipulated variable of the micromirror device 3a into driving voltages and sequentially output them, thereby perturbing the mirror 230. The light intensity of the optical signal measured by the output light measuring device 4 via the detection unit 7 at this time is stored in the storage unit 9.

After the mirror is sequentially moved based on the 25 points set as the perturbation manipulated variables of the micromirror device 3a, the manipulated variables of the micromirror device 3a are returned to initial values $Vx_{01}$ and $Vy_{01}$. Then, the micromirror device 3b is perturbed, like the micromirror device 3a. The light intensity of the optical signal measured by the output light measuring device 4 via the detection unit 7 at this time is stored in the storage unit 9. When the perturbation of the micromirror device 3b has ended, the manipulated variables of the micromirror device 3b are returned to the initial values $Vx_{02}$ and $Vy_{02}$.

<Calculation Operation of Optimum Driving Voltage>

Figure 11:
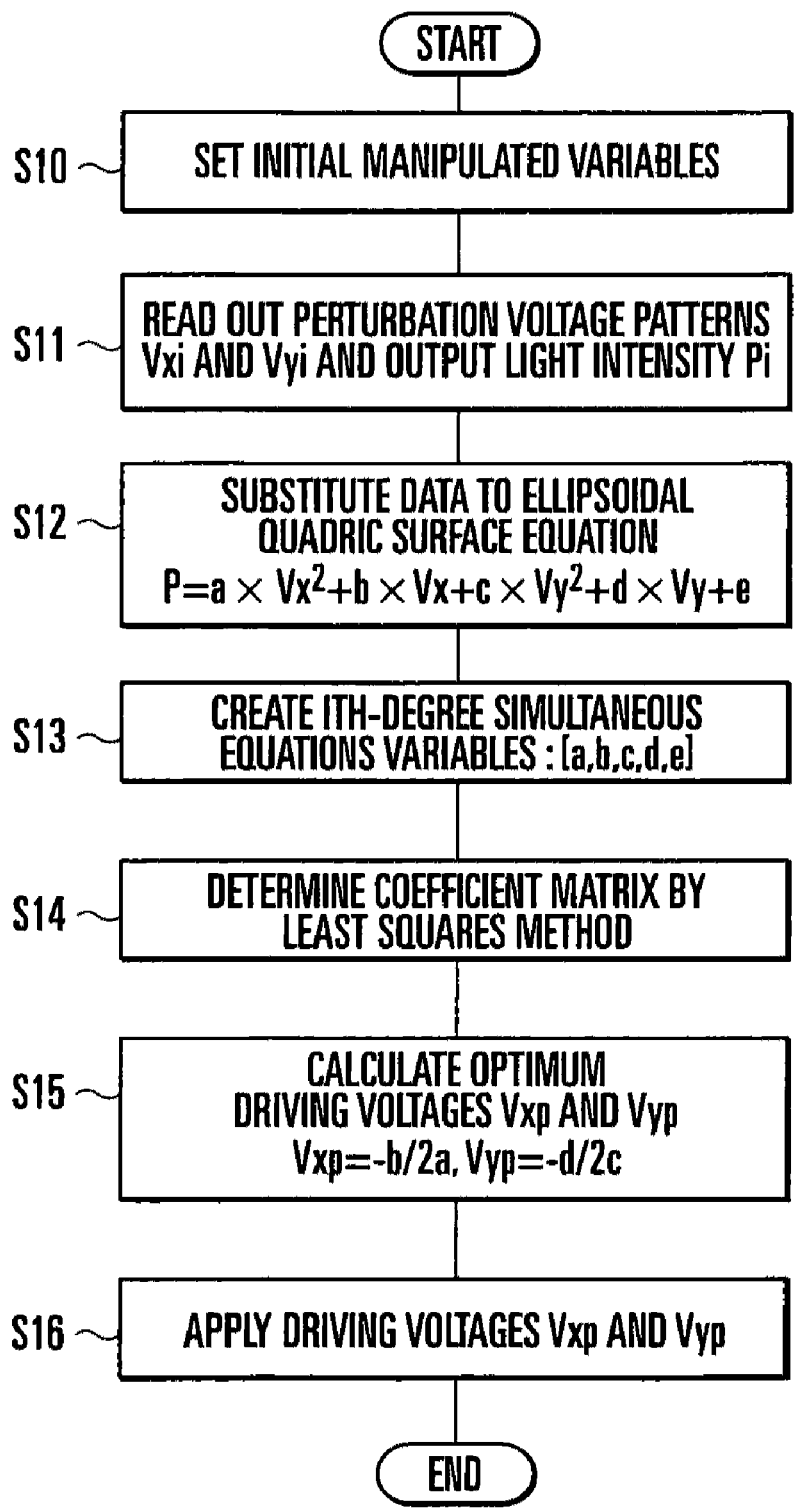
FIG. 11 is a flowchart illustrating the operation of an error calculation/correction unit 104.

The optimum driving voltage calculation operation of the error calculation/correction unit 104 will be described next with reference to FIG. 11. An example will be described in which an ellipsoidal quadric surface model to be described below is assumed to be a light intensity distribution function.

First, the switching unit 101 of the control unit 10 reads out, from the storage unit 9, manipulated variables corresponding to the initial tilt angles of the mirrors 230 of the micromirror devices 3a and 3b corresponding to the input port 1a and output port 1b whose optical paths are to be connected, and sets initial manipulated variables. The manipulated variable generation unit 103 applies driving voltages to the corresponding electrodes of the micromirror devices 3a and 3b in accordance with the control units (step S10).

The perturbation pattern setting unit 102 causes the driving unit 6 to sequentially apply the driving voltages in accordance with the set perturbation manipulated variables. The output light intensity measured via the detection unit 7 at this time is stored in the storage unit 9. Next, the error calculation/correction unit 104 reads out, from the storage unit 9, perturbation voltage patterns $V_x[i]$ and $V_y[i]$ set by the perturbation pattern setting unit 102 and an output light intensity P[i] (step S11). In this case, i represents the number of driving points.

The error calculation/correction unit 104 substitutes data to an ellipsoidal quadric surface equation given by $$P[i]=a \times Vx[i]^2 + b \times Vx[i] + c \times Vy[i]^2 + d \times Vy[i] + e$$

$$[i=0, \ldots,] \quad (7)$$

where coefficients a, b, c, d, and e are parameters representing the shape of the ellipsoidal quadric surface (step S12).

After substituting the data, the error calculation/correction unit 104 reads out, from the storage unit 9, the perturbation voltage patterns of the micromirror device 3a and the corresponding output light intensity information as sequence data Vx[0] to Vx[n], Vy[0] to Vy[n], and P[0] to P[n], and substitutes them to the ellipsoidal quadric surface equation to create simultaneous linear equations (step S13).

The simultaneous linear equations are solved by numerical computation using, e.g., the least squares method, thereby calculating a coefficient matrix [a,b,c,d,e] (step S14). When the coefficient matrix is calculated, the error calculation/correction unit 104 calculates optimum manipulated variables (step S15). For the ellipsoidal quadric surface set as the model, an optimum manipulated variable $Vx_{p1}$ is calculated as $-b/2a$, and $Vy_{p1}$ is calculated as $-d/2c$. For the micromirror device 3b as well, $Vx_{p2}$ and $Vy_{p2}$ can be calculated by the same method. The initial manipulated variables are updated by the thus calculated optimum manipulated variables $Vx_{p1}$, $Vy_{p1}$, $Vx_{p2}$, and $Vy_{p2}$. When converted driving voltages are applied to the micromirror devices 3a and 3b, output light having the maximum light intensity can be obtained.

FIG. 12 shows an experimental result obtained by executing optical connection according to the embodiment. In FIG. 12, e represents the output light intensity, and f represents the driving voltage updating section of the micromirror device 3a. As is apparent from FIG. 12, it was confirmed that it is possible to calculate a driving voltage for obtaining the maximum light intensity and implement a high-speed switching operation.

As described above, according to this embodiment, perturbation manipulated variables of a helical trajectory or a combined helical trajectory are output based on the perturbation voltage patterns set by the perturbation pattern setting unit 102, and the intensities of output light from the output port corresponding to the perturbation manipulated variables are detected. The error calculation/correction unit 104 determines, based on the combination of the perturbation voltage patterns and output light intensities, the coefficients of the degrees of an appropriate surface mathematical model in three-dimensional space assumed for the light intensity distribution by identifying the surface using the relationship between the voltage outputs in the perturbation voltage patterns and the output light intensities detected in correspondence with the voltage outputs, and obtains the maximum value of the surface by numerical computation, thereby obtaining a control voltage for obtaining the maximum light intensity. It is consequently possible to end the search by one perturbation and implement high-speed switching.

Use of the helical trajectory combined perturbation voltage pattern of this embodiment allows to reduce the driving speed near the end point of the helical trajectory. This makes it possible to reduce residual vibration after the perturbation and decrease the time lag until control voltage applying to move to the optimum value. It is therefore possible to implement a quicker switching operation.

In this embodiment, a helical trajectory or a combined helical trajectory is set as a perturbation voltage pattern. However, various kinds of geometrical trajectories can be adopted without departing from the spirit of the embodiment. The function model of the light intensity distribution has been described as an ellipsoidal quadric surface. However, various kinds of surface models can be adopted without departing from the spirit of the embodiment.

In this embodiment, an example has been described in which two micromirror devices exist. However, the arrangement is also applicable to a wavelength selective switch which arbitrarily switches the wavelength of input light and outputs the light from an output port, as shown in FIGS. 28 and 29 to be described later. In this case, each micromirror device included in the wavelength selective switch is perturbed by the same method as described above, and the output light intensity at that time is detected, thereby calculating a driving voltage for maximizing the output light intensity.

Third Embodiment

The third embodiment of the present invention will be described next. The same names and reference numerals as in the first and second embodiments and "Background Art" described with reference to FIGS. 37, 38, and 39 denote the same constituent elements in the third embodiment, and a description will be omitted as needed.

As shown in FIG. 38, a mirror 230 is supported by a gimbal 220 via torsion springs 221a and 221b about the y-axis. The gimbal 220 is supported by a frame portion 210 around the gimbal 220 via torsion springs 211a and 211b about the x-axis so that a gimbal structure is formed. The mirror can tilt in arbitrary directions about the x- and y-axes. Let $\theta_x$ and $\theta_y$ be the tilt angles of the mirror 230. Four electrodes 340a to 340d face the mirror 230. The mirror 230 can be tilted by an electrostatic force generated by voltages applied to the electrodes. Voltages V1 to V4 applied to the electrodes are given by, e.g., $$V1 = Vo + Vx \quad (8)$$

$$V2 = Vo + Vy \quad (9)$$

$$V3 = Vo - Vx \quad (10)$$

$$V4 = Vo - Vy \quad (11)$$

where Vo is a bias voltage which improves the linearity from the electrode application voltage to the mirror tilt angle, and Vx and Vy are manipulated variables corresponding to the tilt angles θx and θy of the mirror in a one-to-one correspondence. It is possible to tilt the mirror 230 in arbitrary directions by operating Vx and Vy.

Figure 37:
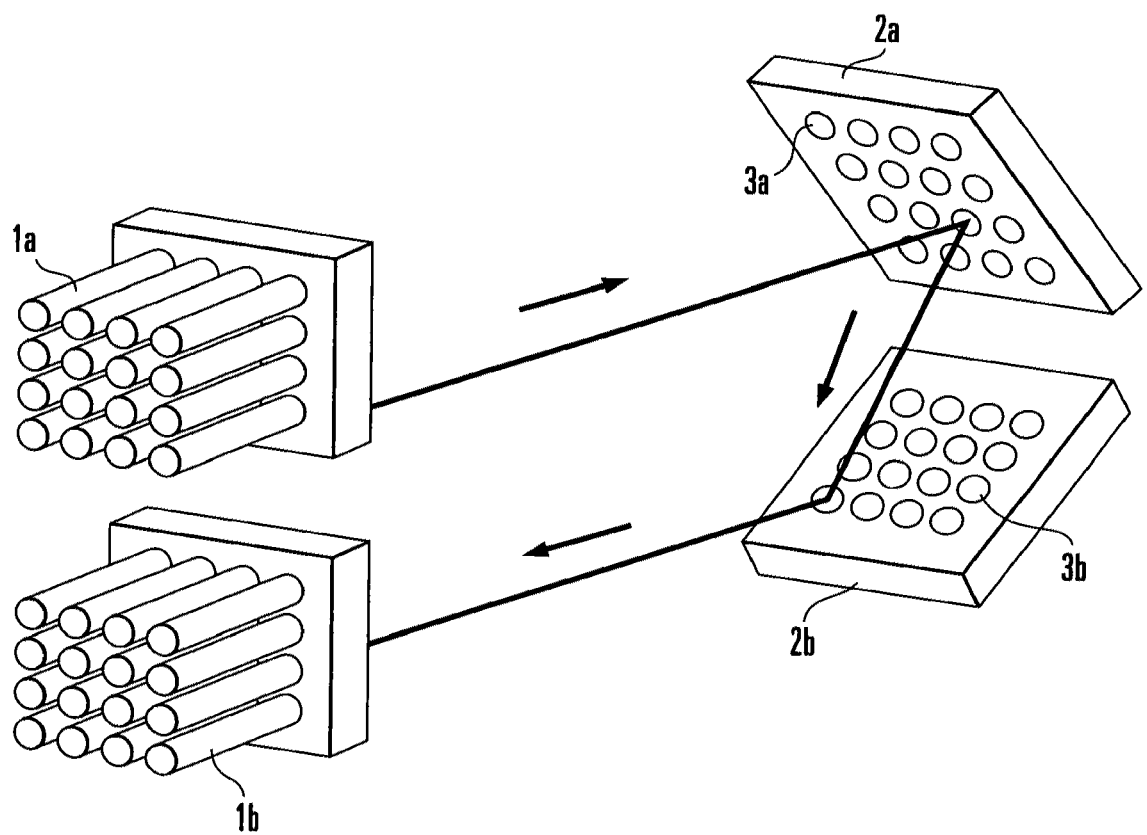
FIG. 37 is a perspective view schematically showing the arrangement of an optical switch.

FIG. 37 shows the arrangement of an optical switch using two micromirror arrays each having the above-described micromirror devices arrayed two-dimensionally. Referring to FIG. 37, an optical signal which has outgone from a given input port 1a is reflected by the mirror of a micromirror device 3a of an input-side micromirror array 2a corresponding to the input port 1a so that the traveling direction changes. As will be described later, the mirror of the micromirror device 3a is designed to pivot about two axes so as to direct light reflected by the micromirror device 3a to an arbitrary micromirror device 3b of an output-side micromirror array 2b. The mirror of the micromirror device 3b is also designed to pivot about two axes so as to direct light reflected by the micromirror device 3b to an arbitrary output port 1b by appropriately controlling the tilt angle of the mirror. It is therefore possible to switch the optical path and connect arbitrary two of the input ports 1a and output ports 1b arrayed two-dimensionally by appropriately controlling the tilt angles of mirrors in the input-side micromirror array 2a and output-side micromirror array 2b. An output light measuring device monitors the light intensity of the optical signal which has outgone from the output port 1b. Examples of the output light measuring device are a photodiode (PD), or a Tap-PD which guides part of optical power in a fiber to a PD and monitors it.

To adjust the mirror tilt angle to obtain optimum output light power in such an optical switch, a method of perturbing the micromirror devices 3a and 3b and searching for an optimum value based on the power variation of the light intensity at that time is used. In this method, generally, the micromirror device 3a is perturbed, and an error is detected and corrected based on the power variation at that time, and then, the micromirror device 3b is perturbed, and an error is detected and corrected based on the power variation at that time. Since error detection and correction are done in each of the micromirror devices 3a and 3b, the time required for detection and correction of the optimum value becomes long. Additionally, since the error of each mirror 230 affects error detection of the other mirrors 230, the optimum value detection accuracy is low.

An object of this embodiment is to shorten the time required for detection and correction of an optimum value. Another object is to improve the optimum value detection accuracy.

<Arrangement of Optical Switch>

As shown in FIG. 1, an optical switch according to this embodiment includes the input port 1a, the output port 1b, the input-side micromirror device 3a, the output-side micromirror device 3b, an output light measuring device 4, and a control device 5. In the optical switch, to adjust the tilt angles of the mirrors 230 of the micromirror devices 3a and 3b to obtain an optimum output light intensity, the control device 5 perturbs each mirror 230. The output light measuring device 4 monitors the output light intensity at that time. The control device 5 calculates and corrects the tilt angle error based on the measurement result of the output light measuring device 4. The tilt angle of each mirror corresponds to a manipulated variable output from the control device 5 in a one-to-one correspondence. The mirrors 230 are driven by converting the manipulated variables into voltages to be applied to the electrodes of the mirrors and applying them.

The control device 5 includes a driving unit 6, detection unit 7, and control unit 11, as shown in FIG. 13.

The control unit 11 is a functional unit for controlling the operation of the entire optical switch and includes at least an error calculation unit 111, correction unit 112, initial value generation unit 113, perturbation generation unit 114, and waveform storage unit 115.

The error calculation unit 111 calculates the error of each manipulated variable based on the output light intensity monitored by the output light measuring device 4 in synchronism with the perturbation of the mirror 230.

The correction unit 112 corrects and updates initial manipulated variables based on the manipulated variable errors calculated by the error calculation unit 111.

The initial value generation unit 113 sets manipulated variables corresponding to the initial tilt angles of the mirrors 230.

The perturbation generation unit 114 sets manipulated variables to give a periodical perturbation around the manipulated variables generated by the initial value generation unit 113.

The waveform storage unit 115 stores waveforms to perturb the mirrors 230, which are set by the perturbation generation unit 114.

The control device 5 is formed from a computer including an arithmetic device such as a CPU, a storage device such as a memory or an HDD (Hard Disk Drive), an input device such as a keyboard, mouse, pointing device, buttons, or touch panel to detect external information input, an I/F device which transmits/receives various kinds of information via a communication line such as the Internet, a LAN (Local Are Network), or a WAN (Wide Area Network), and a display device such as a CRT (Cathode Ray Tube), LCD (Liquid Crystal Display), FED (Field Emission Display), or organic EL (Electro Luminescence), and a program installed in the computer. That is, hardware resources and software resources cooperate so that the program controls the hardware resources, and the above-described driving unit 6, detection unit 7, and control unit 11 are implemented. The program may be recorded on a recording medium such as a flexible disk, CD-ROM, DVD-ROM, or memory card and provided.

<Mirror Tilt Angle Adjusting Operation>

An operation of adjusting the tilt angle of the mirror 230 in the optical switch according to this embodiment will be described next with reference to FIG. 14.

First, the initial value generation unit 113 sets manipulated variables corresponding to the initial tilt angle of each mirror 230 (step S21). When the initial value generation unit 113 sets the manipulated variables, the perturbation generation unit 114 sets manipulated variables to give a periodical perturbation around the manipulated variables. The driving unit 6 applies driving voltages based on the manipulated variables set by the perturbation generation unit 114 to the micromirror devices 3a and 3b to perturb their mirrors 230 simultaneously. In an example to be explained below, the optical path of a mirror 230a of the micromirror device 3a and that of a mirror 230b of the micromirror device 3b are connected, for the descriptive convenience.

When the mirrors 230a and 230b are perturbed, the error calculation unit 111 detects the light intensity of output light monitored by the output light measuring device 4 in synchronism with the perturbations of the mirrors 230a and 230b (step S22).

Upon detecting the output light intensity, the error calculation unit 111 calculates manipulated variable errors based on the value of the light intensity (step S23). The perturbations of the mirrors 230a and 230b are in synchronism so that they perform the perturbation operation simultaneously. The output light measuring device 4 also monitors the output light intensity in synchronism with the perturbations of the mirrors 230a and 230b. For example, a light intensity P(t) of output light obtained by giving a perturbation Sin ωt to the mirrors 230a and 230b has no time shift, and a power variation during the same time as the perturbation is monitored. The operation of the error calculation unit 111 will be described later in detail.

When the manipulated variable errors are calculated, the correction unit 112 corrects and updates the initial manipulated variables based on the errors (step S24). The operation of the correction unit 112 will be described later in detail.

When the initial manipulated variables are updated, and the process is to be continued (NO in step S25), the control device 5 returns to the process in step S22. On the other hand, to end the process (YES in step S25), the control device 5 ends the process.

<Operation of Error Calculation Unit>

The processing operation of the error calculation unit 111 will be described next in detail.

Figure 15A:
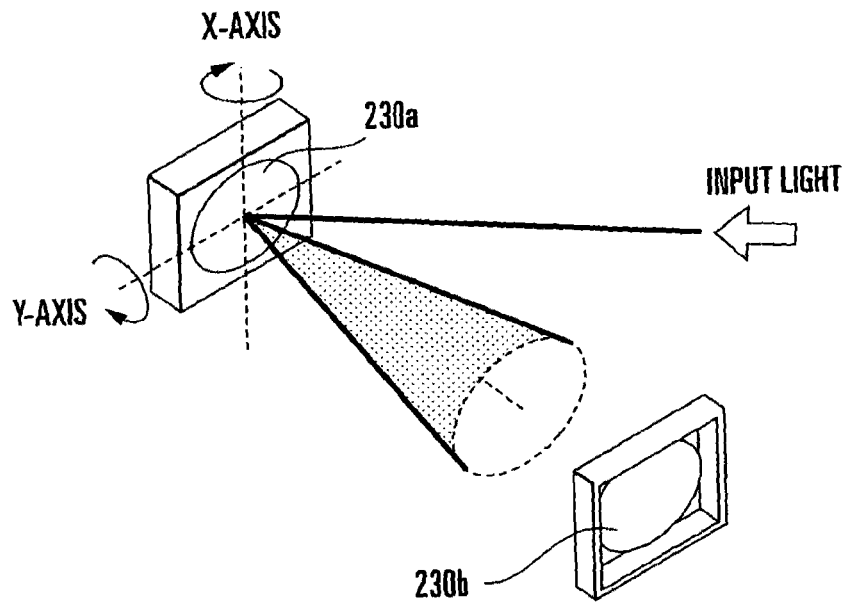
Figure 15B:
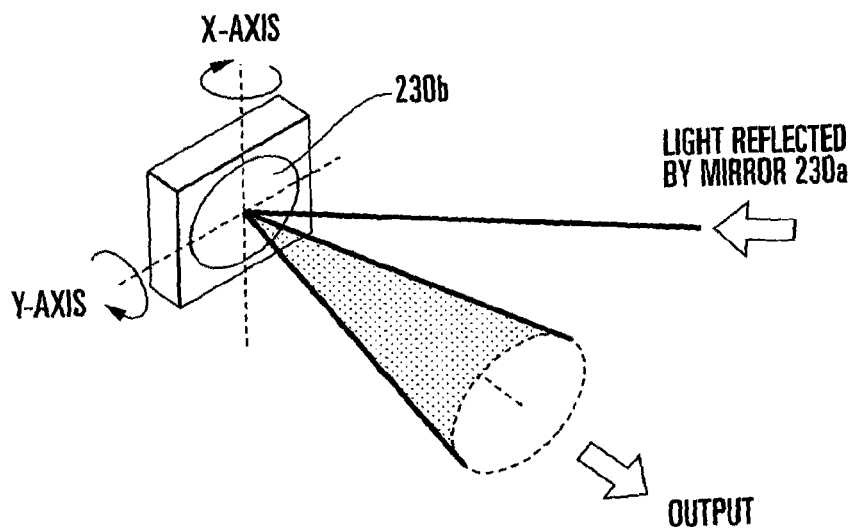
FIG. 15B is a view showing a reflected light beam trajectory upon perturbing a mirror 230b.

The output light intensity measured by the output light measuring device 4 includes the influence of the perturbations of the mirrors 230a and 230b. For this reason, it is necessary to obtain the manipulated variable errors of each of the mirrors 230a and 230b based on the detected light intensity. To do this, both the mirrors 230a and 230b are perturbed such that the trajectory of the light beam reflected by the mirror forms a conical shape having a vertex on the mirror surface. FIGS. 15A and 15B show reflected light beam trajectories upon perturbations of the mirrors.

One mirror will be exemplified. As described above, the mirror can tilt about two axes almost perpendicular to each other on the mirror surface. Tilt angles θx and θy about the axes are controlled by two manipulated variables Vx and Vy. The light beam reflected by the mirror 230 draws a conical trajectory when Vx and Vy are given by $$Vx = Vx0 + Vr \cdot \cos(2\pi ft) \quad (12)$$

$$Vy = Vy0 + Vr \cdot \sin(2\pi ft) \quad (13)$$

where Vx0 and Vy0 are the initial values of the manipulated variables around which a perturbations is given, and Vr is a parameter to determine the radius of the conical perturbation.

To obtain the manipulated variable errors of the mirrors 230a and 230b, different frequencies are set for the perturbations of the two mirrors 230a and 230b, as expressed by $$Vx1 = Vx10 + Vr1 \cdot \cos(2\pi f1 t) \quad (14)$$

$$Vy1 = Vy10 + Vr1 \cdot \sin(2\pi f1 t) \quad (15)$$

$$Vx2 = Vx20 + Vr2 \cdot \cos(2\pi f2 t) \quad (16)$$

$$Vy2 = Vy20 + Vr2 \cdot \sin(2\pi f2 t) \quad (17)$$

where Vx1 and Vy1 are the manipulated variables of the mirror 230a, Vx2 and Vy2 are the manipulated variables of the mirror 230b, Vx10 and Vy10 are the initial manipulated variables of the mirror 230a, Vx20 and Vy20 are the initial manipulated variables of the mirror 230b, Vr1 and Vr2 are parameters to determine the conical radius of the perturbation of each mirror, f1 is the perturbation frequency of the mirror 230a, and f2 is the perturbation frequency of the mirror 230b.

When the two perturbation frequencies f1 and f2 are different, the manipulated variable errors of the two mirrors can separately be calculated by, e.g., analyzing the frequency of the optical power response.

Figure 16:
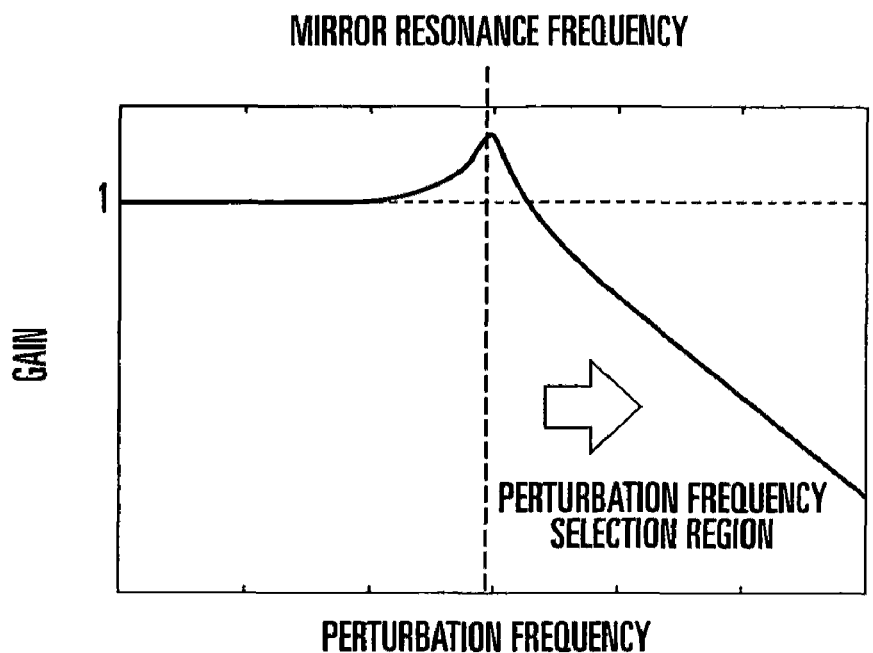
FIG. 16 is a graph showing the gain characteristic of a tilt angle with respect to the controlled variable of the mirror.

The tilt operation of the mirror 230 about each axis can be modeled by a mass system supported by torsion springs. The mirror 230 therefore has a dynamic characteristic with a resonance frequency as shown in FIG. 16, which is expressed as a so-called spring-mass system. The above-described perturbation frequency is not limited by the resonance frequency of the mirror 230 and can also be set to be equal to or higher than the resonance frequency. The higher the perturbation frequency is, the shorter the time required for manipulated variable error detection is.

Figure 17A:
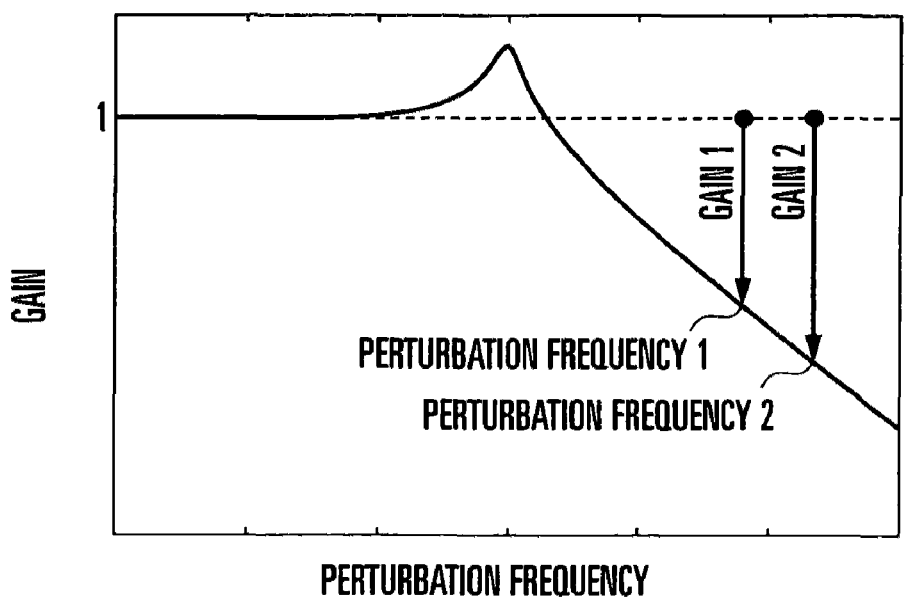
FIG. 17A is a graph showing the gain characteristic of a tilt angle with respect to the controlled variable of the mirror about an x-axis.

As the conical radius of the reflected beam trajectory upon perturbation, a suitable value is determined based on optical characteristics including the input/output fiber collimator. More specifically, if the radius is too large, the optical power variation is too large, and nonlinearity needs to be taken into consideration. If the radius is too small, the variation is too small, and the S/N ratio in the optical power response degrades. Hence, the conical radius upon perturbation is preferably constant independently of the dynamic characteristic or perturbation frequency of the mirror 230. The conical radius upon perturbation corresponds to the vertical angle of the cone in a one-to-one correspondence. For this reason, when the conical radius is constant, the tilt angle of the mirror 230 perturbed is also constant. To obtain a constant tilt angle of the perturbed mirror 230, voltage setting must be done in consideration of the dynamic characteristic of the mirror 230. FIG. 17A shows the gain characteristic of the tilt angle with respect to the manipulated variable of the mirror about the x-axis. When the perturbation frequency exceeds the resonance frequency, the gain characteristic is lower than 1. To set the perturbation frequency more than the resonance frequency, perturbation voltages need to be higher than in perturbation at a frequency equal to or lower than the resonance frequency in consideration of the gain attenuation. The higher the perturbation frequency is, the larger the gain attenuation is. It is therefore necessary to set high perturbation voltages.

Figure 17B:
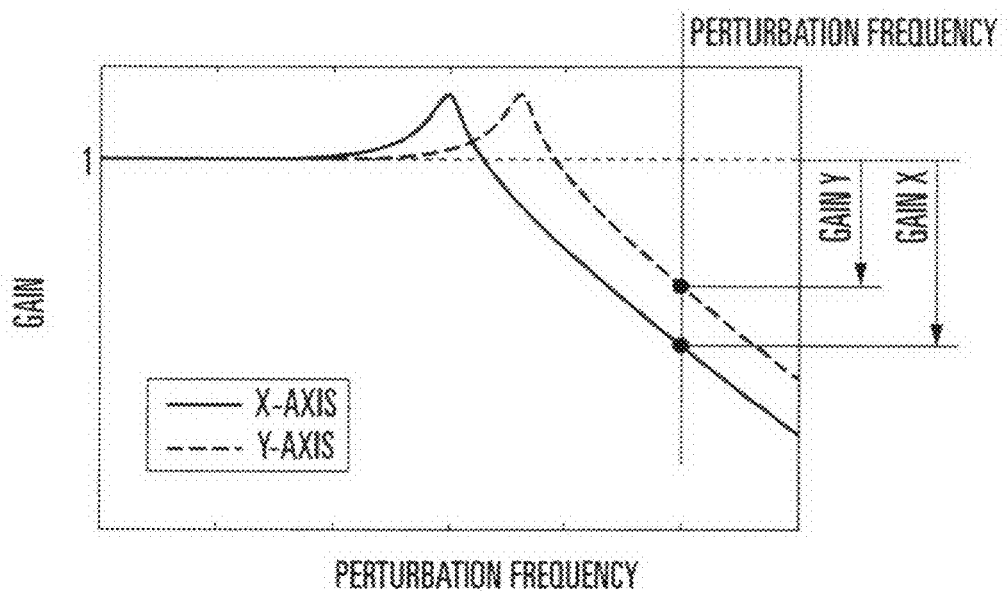
FIG. 17B is a graph showing the overlaid dynamic characteristics of the mirror about x- and y-axes.

The dynamic characteristic may change between tilt about the x-axis and that about the y-axis of the mirror 230, or between the mirrors 230a and 230b. In this case, since the dynamic characteristic changes between the axes, voltage setting must be done in consideration of the gain characteristic for each axis. For example, FIG. 17B shows the overlaid dynamic characteristics of the mirror 230a about the x- and y-axes. The resonance frequency about the x-axis is lower than that about the y-axis. For this reason, at a frequency higher than the resonance frequency, the gain attenuation is larger about the x-axis than about the y-axis. The mirror 230a is perturbed about the x- and the y-axes at the same frequency. However, when the dynamic characteristic changes, as described above, the voltage for the perturbation about the x-axis must be higher than that for the perturbation about the y-axis. More specifically, to perturb the mirror at a frequency higher than the resonance frequency, it is necessary to set a higher perturbation voltage as the frequency separates from the resonance frequency or a lower perturbation voltage as the frequency becomes closer to the resonance frequency.

The perturbation voltage will be described. As described above, the manipulated variables in perturbation are represented by equations (14) to (17). Vr1 and Vr2 are manipulated variables associate with the radius of perturbation. The mirror 230a will be exemplified. When the above-described equations to calculate the voltages of four electrode are employed, the voltages to be applied to the four electrodes of the mirror 230a are given by $$V1 = Vo + Vx1 = Vo + Vx10 + Vr1 \cdot \cos(2\pi f1 t) \quad (18)$$

$$V2 = Vo + Vy1 = Vo + Vy10 + Vr1 \cdot \sin(2\pi f1 t) \quad (19)$$

$$V3 = Vo - Vx1 = Vo - Vx10 - Vr1 \cdot \cos(2\pi f1 t) \quad (20)$$

$$V4 = Vo - Vy1 = Vo - Vy10 - Vr1 \cdot \sin(2\pi f1 t) \quad (21)$$

The radius voltage changes between the x-axis and the y-axis when the dynamic characteristic or perturbation frequency of the mirror 230 is taken into consideration. Hence, when parameters Vr1x, Vr1y, Vr2x, and Vr2y associated with the perturbation radius considering the dynamic characteristic are introduced, equations (18) to (21) are rewritten to $$Vx1 = Vx10 + Vr1x \cdot \cos(2\pi f1 t) \quad (22)$$

$$Vy1 = Vy10 + Vr1y \cdot \sin(2\pi f1 t) \quad (23)$$

$$Vx2 = Vx20 + Vr2x \cdot \cos(2\pi f2 t) \quad (24)$$

$$Vy2 = Vy20 + Vr2y \cdot \sin(2\pi f2 t) \quad (25)$$

where Vr1x, Vr1y, yr2x, and Vr2y are values obtained by multiplying Vr by the reciprocal of the gain attenuation determined by the dynamic characteristic and perturbation frequency of the mirror. For example, if the gain at the perturbation frequency is 1/10 due to the dynamic characteristic of the mirror, Vr is multiplied by 10.

A method of calculating each manipulated variable error will be described next. An example will be explained in which only the mirror 230a is perturbed such that the reflected beam draws a conical trajectory.

The relationship between the tilt angles θx and θy of the mirror 230a and the output light intensity exhibits a shape close to a Gaussian distribution whose peak corresponds to the optimum mirror tilt angle at which the output light intensity is maximum. As described above, voltages are applied to the mirror 230 in consideration of its dynamic characteristic and perturbation frequency such that a predetermined perturbation tilt angle is obtained. More specifically, a perturbation which draws a circular trajectory on a θx-θy plane is given. If a perturbation is given with errors in the tilt angles, the output light intensity exhibits a variation at the same frequency as the perturbation frequency. Upon perturbation in the optimum value direction, the variation of the light intensity is maximum. It is therefore possible to know the peak direction by obtaining the phase difference between the perturbation component and the optical output response.

Figure 18:
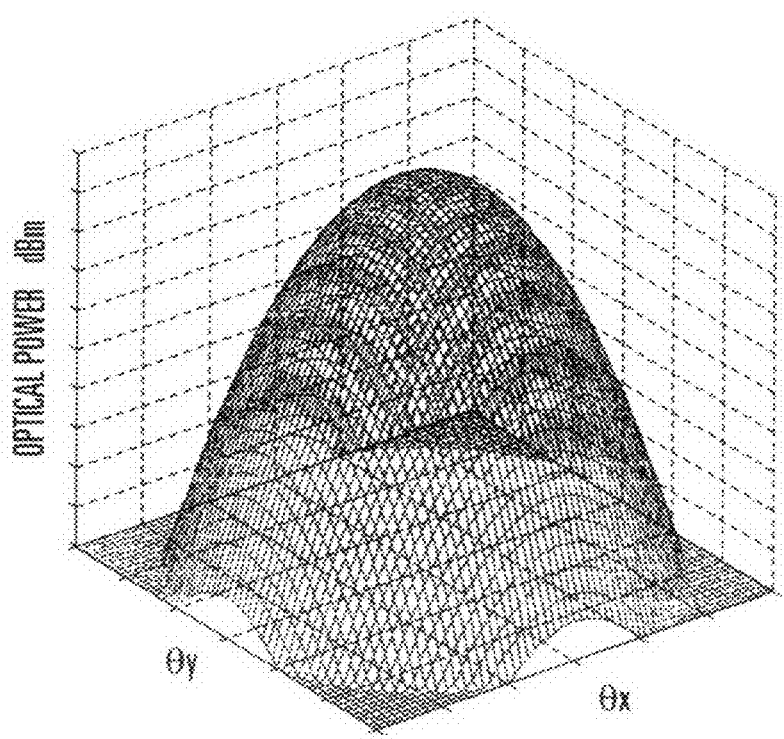
FIG. 18 is a graph showing the relationship between a tilt angle and a light intensity.
Figure 19:
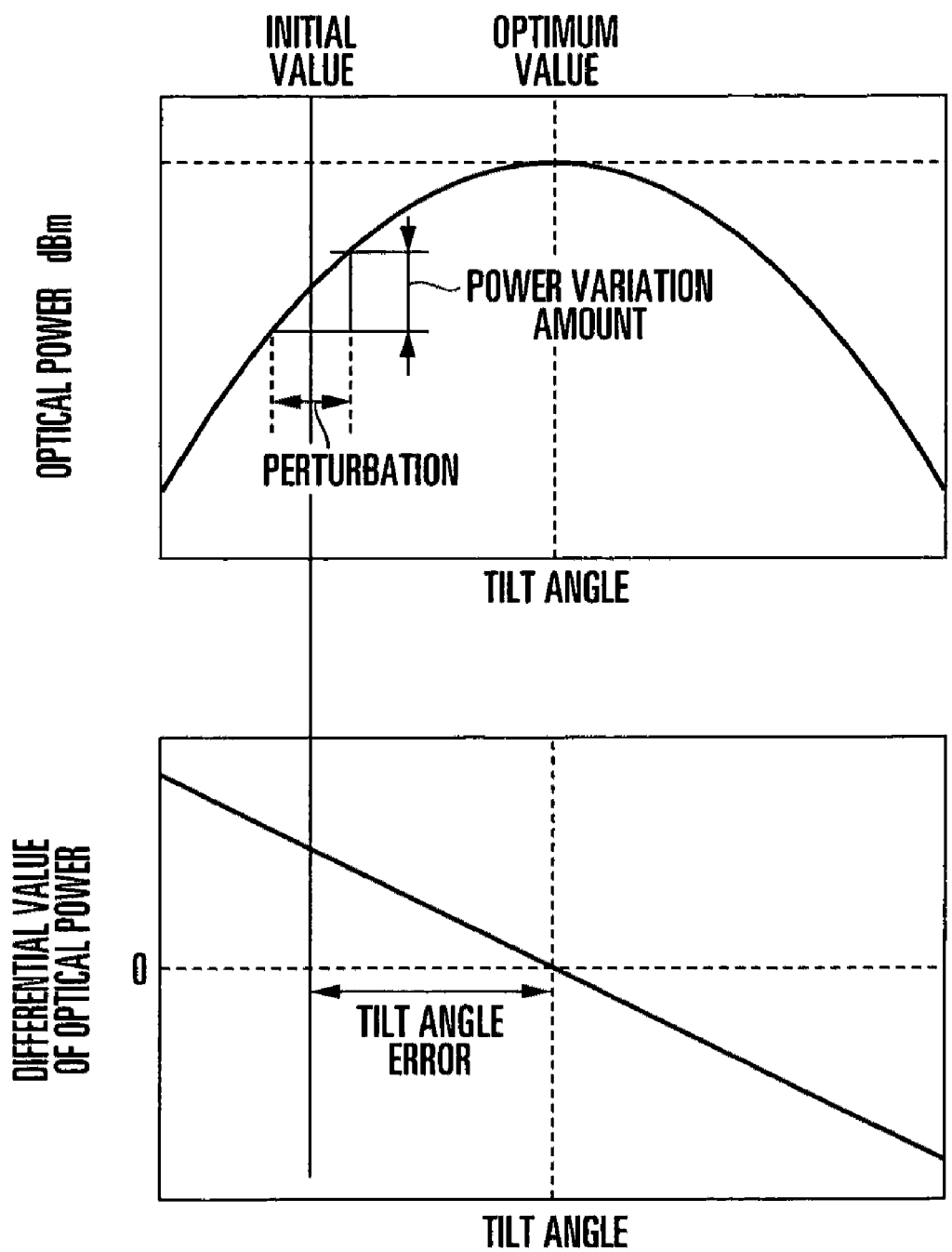
FIG. 19 is a graph for explaining the ratio of a light intensity variation amount to a perturbation amplitude.

Since the relationship between the output light intensity and the tilt angles can be approximated to a Gaussian distribution, the ratio of the light intensity variation in perturbation to the tilt angle amplitude of the perturbation corresponds to a value obtained by differentiating the Gaussian distribution by the tilt angle. When the output light intensity is expressed by dBm, the relationship between the tilt angle and the light intensity forms a paraboloid, as shown in FIG. 18. The ratio of the light intensity variation in the perturbation to the amplitude of perturbation at that time represents the differential value of the paraboloid in a plane including the optimum value and the initial tilt angle as the center of the perturbation, as shown in FIG. 19. The tilt angle error amount can be estimated by multiplying the ratio by a constant. This is because the differential value of a parabola with respect to the tilt angle draws a straight line, the differential value is zero at the optimum position, and the tilt angle error is proportional to the differential value. The mirrors is perturbed at a constant perturbation radius. Hence, the error amount can be estimated by multiplying the variation range of the light intensity by a constant. The above-described method enables to estimate the manipulated variable error amount based on the phase and amplitude of the light intensity at the perturbation frequency.

A method of perturbing two mirrors simultaneously and extracting one frequency component from an optical power response in which two frequencies are mixed will be described next. Assume that a light intensity p of output light is given by $$p = p1 \cdot \sin(2\pi f1 t + \phi 1) + p2 \cdot \sin(2\pi f2 t + \phi 2) \quad (26)$$

including two frequency components, where f1 is the perturbation frequency of the mirror 230a, and f2 is the perturbation frequency of the mirror 230b. The average of the sums of products of p and $\cos(2\pi f1 t)$ is given by $$\frac{1}{T}\int_0^T \{p_1\sin(2f_1 t + \#_1) + p_2\sin(2f_2 t + \#_2)\}\cos(2f_1 t)dt = \quad (27)$$

$$\frac{1}{T}\int_0^T \{p_1\sin(2f_1 t + \#_1)\cos(2f_1 t) + p_2\sin(2f_2 t + \#_2)\cos(2f_1 t)\}dt =$$

$$\frac{1}{2T}\int_0^T \{p_1\sin(4f_1 t + \#_1) + p_1\sin(\#_1) + p_2\sin(2(f_2 + f_1)t + \#_2) +$$

$$p_2\sin(2(f_2 f_1)t + \#_2)\}dt = \frac{1}{2}p_1\sin(\#_1) +$$

$$\frac{1}{2T}\int_0^T p_1\sin(4f_1 t + \#_1)dt + \frac{1}{2T}\int_0^T p_2\sin(2(f_2 + f_1)t + \#_2)dt +$$

$$\frac{1}{2T}\int_0^T p_2\sin(2(f_2 f_1)t + \#_2)dt$$

The first term of equation (27) includes a phase φ1 and amplitude p1 necessary for error calculation. Phase information and amplitude information are obtained using this term. The second, third, and fourth terms are unnecessary. When an appropriate integration time is selected to make these terms zero, the accuracy of the first term increases, and the error detection accuracy can be increased. When the period of the frequency f1 is T1=1/f1, and the period of the frequency f2 is T2=1/f2, the second, third, and fourth terms are periodical signals having periods ½f1=T1/2, 1/(f2+f1)=T1·T2/(T1+T2), and 1/(f2−f1)=T1·T2/(T1−T2), respectively. Hence, when the least common multiple of T1 and T2 is selected as the integration time, the second, third, and fourth terms can be made zero. Similarly, when the average value of the sums of products of p and cos(2πf1t) is obtained at a time interval corresponding to the least common multiple of T1 and T2, p1·cos(φ1))/2 can be obtained. The amplitude p1 and phase φ1 can be obtained based on p1·cos(φ1))/2 obtained by the above-described method. For the mirror 230b as well, an amplitude p2 and phase φ2 can be obtained by obtaining the sums of products of each of sin(2πf2t) and cos(2πf2t) at the time interval corresponding to the least common multiple of T1 and T2. This method enables more accurate error calculation in a shorter time than FFT or the like. It is also possible to shorten the data collection time and increase the accuracy by acquiring and calculation data at the time interval corresponding to the least common multiple of T1 and T2.

Note that the phase information and amplitude information at each perturbation frequency can also be obtained by analyzing the frequency of the optical power response using a general FFT calculation tool. In this case as well, it is possible to increase the accuracy and shorten the data collection time by setting the data interval to the least common multiple of T1 and T2.

The phase obtained by equation (27) corresponds to the phase delay from the driving signal of perturbation to the optical power response. Hence, it includes the delay generated by the mirror dynamic characteristic at the perturbation frequency, and the phase representing the optimum value direction generated due to the shift of the initial manipulated variable of the mirror from the optimum value. To accurately obtain the peak direction, the phase delay caused by the dynamic characteristic of the mirror needs to be subtracted from the phase information obtained by the above-described method. This process allows more accurate error detection.

The perturbation frequency f1 of the mirror 230a and the perturbation frequency f2 of the mirror 230b can arbitrarily be selected if they are not equal. At this time, when f1 is an integer multiple of f2, or f2 is an integer multiple of f1, errors may be generated when obtaining manipulated variable errors from the output light intensity. This is because the output light intensity can include not only the linear combination of a perturbation and a frequency component, as assumed in above description, but also a component corresponding to the nth power of the perturbation. It is therefore preferable to avoid the perturbation frequency combination.

<Operation of Correction Unit>

The correction value calculation/updating operation of the correction unit 112 will be described next.

To calculate a manipulated variable correction value, the variation range of output light intensity is multiplied by a constant. The optimum value of the constant changes depending on the tilt angle when the voltage vs. tilt angle characteristic of the mirror has nonlinearity. Even when the perturbation manipulated variable range does not change, the perturbation tilt angle becomes small if the initial mirror tilt angle is small. Hence, the influence of nonlinearity can be reduced by making the constant larger as the initial value becomes small. Similarly, when the voltage vs. tilt angle characteristic changes between the mirrors, the value of the constant is changed depending on the mirror, i.e., the constant is made large for a mirror whose tilt angle is small even upon applying the same voltage, thereby reducing the influence of the characteristic difference.

When the initial manipulated variable is corrected and updated using the calculated manipulated variable correction value by changing the manipulated variable stepwise, a vibration occurs near the resonance frequency of the mirror. If optical power response data for the next manipulated variable error calculation are collected during the vibration, the error calculation accuracy degrades. To correct the manipulated variable without causing the vibration of the mirror, the initial manipulated variable is corrected not stepwise but in accordance with a waveform without the component near the resonance frequency of the mirror. Use of such a waveform prevents any excitation of the mirror at the resonance frequency and suppresses the vibration in correcting the initial manipulated variable. When the high-frequency component in the waveform is made large, the mirror can be operated at a high speed.

Figure 20:
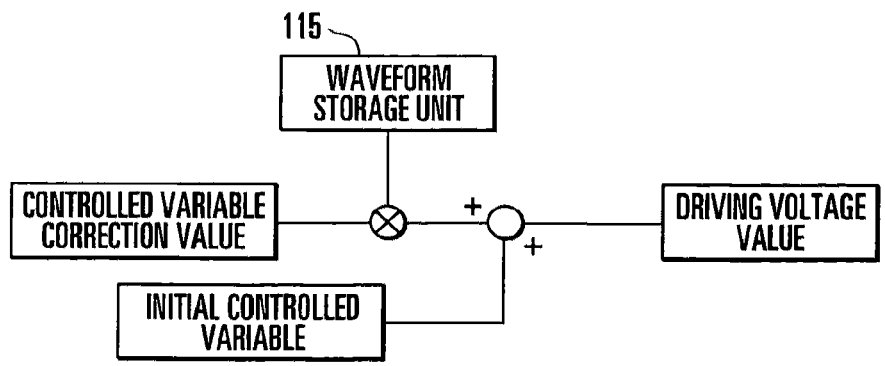
FIG. 20 is a view for explaining a controlled variable correction operation.
Figure 21:
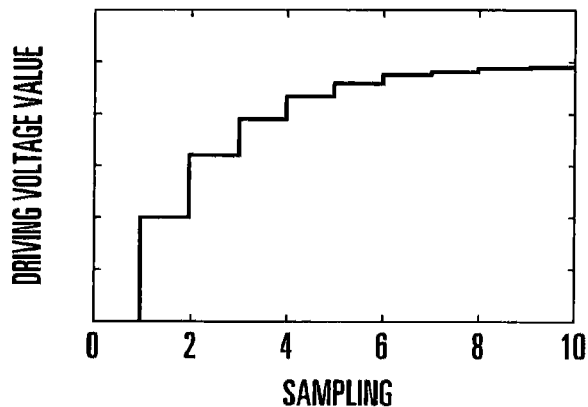
FIG. 21 is a graph showing an example of a driving voltage waveform obtained by sampling at an interval.

For manipulated variable correction using such a waveform, the control device 5 stores a coefficient sequence corresponding to the waveform. For example, the time response of the waveform is sampled at a predetermined interval, and the sample values are normalized by the difference between the prestart value and the final value of the waveform. These values are stored in the waveform storage unit 115. When the manipulated variable correction value is multiplied by the coefficient sequence stored in the waveform storage unit 115, and the product is added to the initial manipulated variable, as shown in FIG. 20, correction using an arbitrary response waveform can be performed. FIG. 21 shows an example of a driving voltage waveform obtained by sampling at an interval. This method ensures a high stability without any divergence of the calculation result because the calculation is easy and includes no feedback loop, unlike calculation using an IIR filter.

Figure 14:
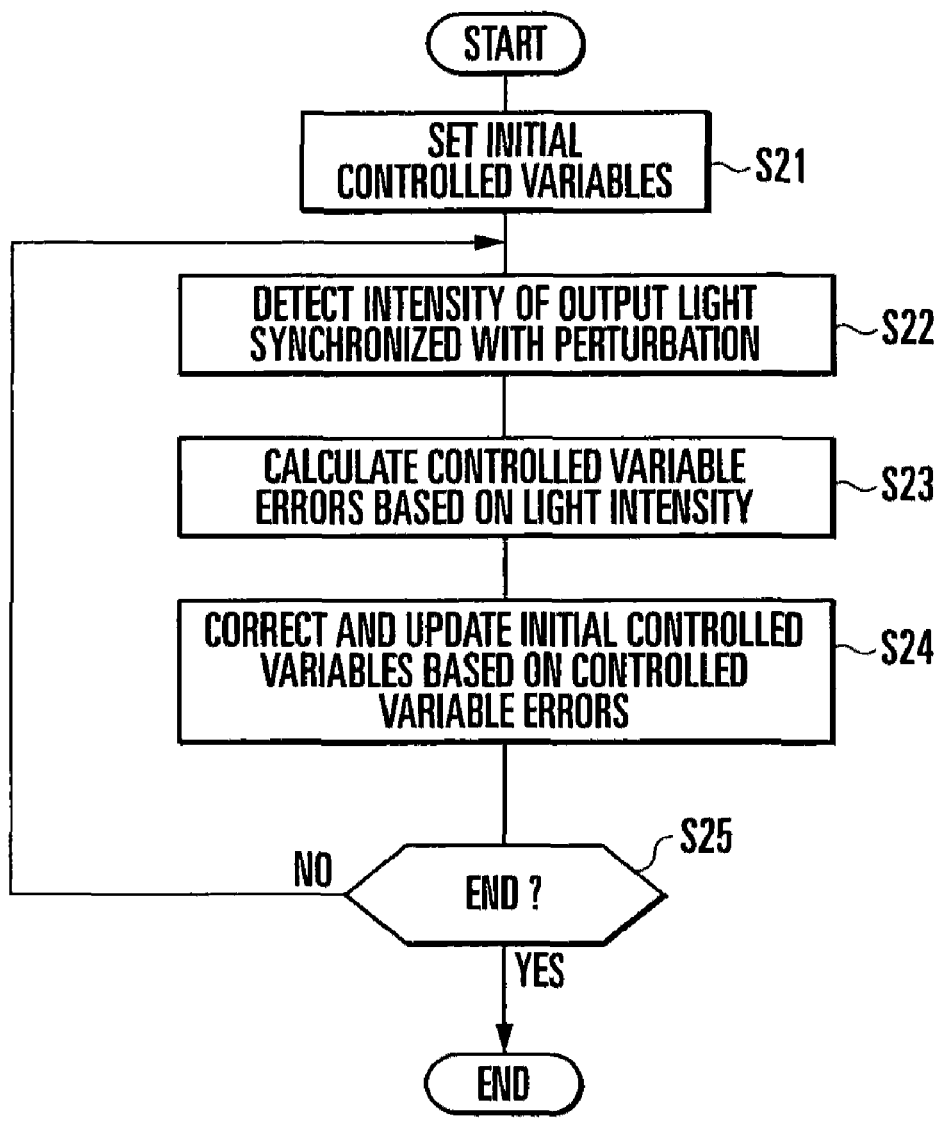
FIG. 14 is a flowchart illustrating a mirror tilt angle adjusting operation.
Figure 22:
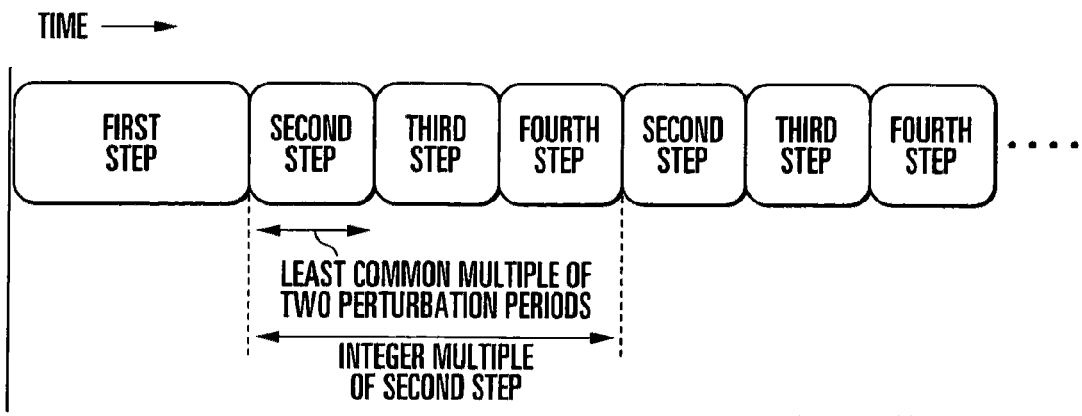
FIG. 22 is a view for explaining the relationship between a time necessary for controlled variable error calculation and initial controlled variable correction/updating and an output light intensity detection time.

In the flowchart shown in FIG. 14, when the mirror 230 starts or stops perturbation, the accuracy of manipulated variable error calculation may degrade because the mirror 230 moves while vibrating near the resonance frequency. To prevent this, even in the manipulated variable error calculation step and the initial manipulated variable correction/updating step, the perturbation of the mirror 230 is continuously repeated without stop. This prevents any excitation of vibration of the mirror near the resonance frequency and increases the accuracy. As described above, the output light intensity detection is preferably done at a time interval corresponding to the least common multiple of the perturbation period of the mirror 230a and that of the mirror 230b. If the perturbation in the first optical power response detection and the perturbation in the second optical power response detection after the first initial manipulated variable correction/updating have a phase shift, the phase shift causes an error in the phase information at the time of calculation. To prevent this, the total time of manipulated variable error calculation and initial manipulated variable correction/updating of one time is preferably an integer multiple of the optical power response detection time to make the phases match, as shown in FIG. 22.

When a perturbation starts in the second step after setting the initial manipulated variables, the mirror vibrates near the resonance frequency. To prevent this, the perturbation preferably starts from the initial manipulated variable setting point in the first step. When the initial manipulated variables are set in the first step, the vibration of the mirror near the resonance frequency is excited. The accuracy can be increased further by starting data acquisition after attenuation of the vibration.

The perturbation radius is set such that the output light intensity variation has a predetermined value when one point on the perturbation trajectory has the optimum value. For example, only the mirror 230a is perturbed, and the perturbation radius is determined such that the variation range of the output light power response at that time becomes 0.5 dB. For the mirror 230b as well, only the mirror 230b is perturbed, and the perturbation radius is set such that the power response variation range at that time becomes 0.5 dB.

If the manipulated variables have errors, and the driving voltages shift from the optimum values, the optical response variation range is larger than the above-described predetermined value, i.e., 0.5 dB in the above example if the perturbation radius is constant, as is apparent from the light intensity distribution described with reference to FIG. 18. Hence, when the variation range of the output light intensity becomes smaller than the predetermined value, it can be determined that the optimum value is obtained, and the process advances to a termination process.

Figure 23A:
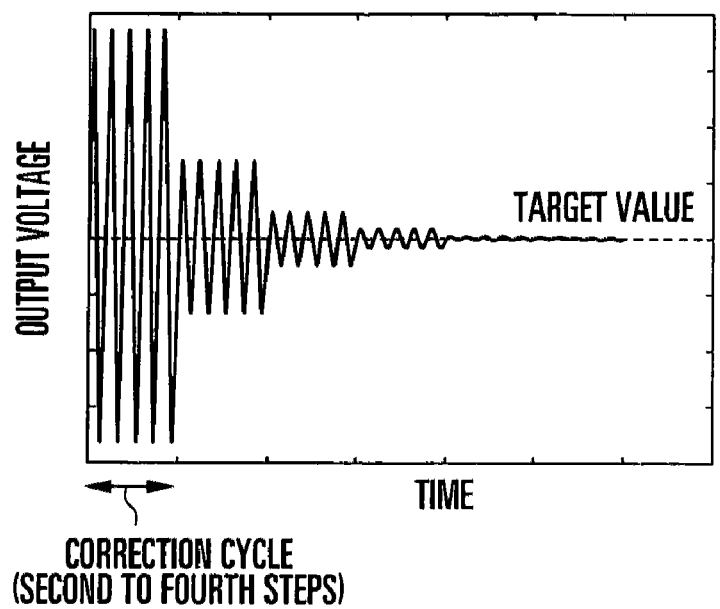
FIG. 23A is a timing chart showing an example of the relationship between a manipulated variable and time.
Figure 23B:
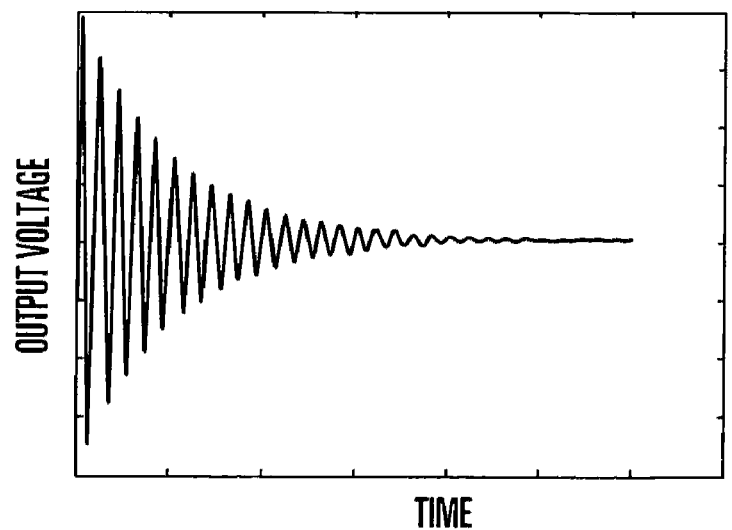
FIG. 23B is a timing chart showing an example of the relationship between a manipulated variable and time.

The mirror 230 vibrates also when the perturbation abruptly stops in the termination process. To avoid this, the perturbation amplitude is reduced over time and finally made zero. This process suppresses an end-time optical power variation. The perturbation amplitude can be reduced either stepwise in each correction cycle from the second step to the fourth step, as shown in FIG. 23A, or over time, as shown in FIG. 23B. In this embodiment, since both the mirrors 230a and 230b are perturbed simultaneously, and their errors are detected simultaneously, the influence of one mirror's error on the other mirror's error detection accuracy can be reduced, and the accuracy can be increased. For example, when error detection and correction are performed for the mirrors 230a and 230b in turn, the mirror 230b has an error at the time of error detection of the mirror 230a. If the optimum value for the mirror 230a is detected in this state, the output light power is maximized in correspondence with a value shifted from the true optimum value due to the influence of the error of the mirror 230b. For this reason, the error remains even after correction of the mirror 230a. The same error detection accuracy degradation occurs even at the time of error detection of the mirror 230b. In this embodiment, however, since the errors of the mirrors 230a and 230b are detected simultaneously, the accuracy can be improved.

Fourth Embodiment

The fourth embodiment of the present invention will be described next.

As shown in FIGS. 37 to 39, in the conventional optical switch, generally, the mirrors are perturbed to determine the optimum tilt angles to set the optical path between an input port 1a and an output port 1b. More specifically, a control device (not shown) for controlling the tilt angles of mirrors 230 supplies periodically changing driving voltages to micromirror devices 3a and 3b, thereby giving a perturbation (vibration) to the mirrors 230. While doing so, an output light measuring device (not shown) provided on the output terminal side of the output ports 1b measures the output light intensity. The relationship between the driving voltages and the output light intensity is obtained, thereby obtaining optimum driving voltages which ensure the optimum tilt angles of the mirrors 230 (e.g., driving voltages which maximize the output light intensity).

However, the output light measuring device provided on the output terminal side of the output port 1b in the conventional optical switch may measure not only the variation in the output light intensity due to the perturbation of the mirror 230 but also the variation in the input light intensity. Examples of the input light intensity variation are an intensity variation near the bit rate caused by light modulation and the intensity variation of a low-frequency component caused by the signal periodicity. If the control device obtains the relationship between the driving voltages and the output light intensity in this state, proper driving voltage generation is impossible, and the mirror 230 cannot be controlled to an optimum angle because of the influence of the variation in the input optical signal strength. For example, if the control device controls the tilt angle of a mirror by obtaining optimum driving voltages based on the relationship between the driving voltages and the output light intensity while the input optical signal strength is varying, the angle actually shifts from the optimum angle by an amount corresponding to the variation in the input optical signal strength. This results in the loss of the output light intensity and may degrade the communication quality.

It is therefore an object of this embodiment to provide an optical switch capable of properly controlling driving of a mirror device without any influence of the variation in the input optical signal strength.

According to this embodiment, it is possible to remove the signal frequency component of an optical signal by determining the tilt angle of a mirror based on a change in the intensity of a signal obtained by removing the signal frequency component of the optical signal from a change in the intensity of the optical signal measured by the output light measuring device. This allows to control driving of a mirror device without any influence of the variation in the optical signal strength. Since any decrease in the intensity of the optical signal to be output can be prevented, degradation in the communication quality can be prevented.

The optical switch according to the fourth embodiment of the present invention will be described below in detail with reference to the accompanying drawings. The same names and reference numerals as in the first to third embodiments and "Background Art" described with reference to FIGS. 37, 38, and 39 denote the same constituent elements in the fourth embodiment, and a description will be omitted as needed.

As shown in FIG. 24, the optical switch according to this embodiment includes the input port 1a, the output port 1b, the input-side micromirror device 3a, the output-side micromirror device 3b, an output light measuring device 4, a filter 12, and a control device 5.

The output light measuring device 4 detects the intensity of output light which has outgone from the output port 1b and converts it into an electrical signal. The output light measuring device 4 can have an arrangement for extracting part of output light and measuring the output light intensity using a light-receiving element such as a photodiode.

The filter 12 removes a predetermined frequency component from the electrical signal generated by the output light measuring device 4. An optical signal is modulated by a signal serving as a carrier wave and therefore contains an intensity variation in the frequency band of the signal. To eliminate this, the filter 12 removes a component near the frequency of the signal used to modulate the light from the electrical signal representing the output light intensity measured by the output light measuring device 4. The electrical signal obtained by removing the signal frequency component is sent to a driving voltage determination unit 13. As the filter 12, for example, a low-pass filter which cuts off components not more than the frequency of the carrier wave is used.

The driving voltage determination unit 13 determines driving voltages necessary for implementing the pivot angles of the mirrors 230 to connect the optical path of the output port 1b to that of the output port 1b based on the output light intensity measured by the output light measuring device 4 when the mirrors 230 are perturbed in accordance with an instruction output to the control device 5. The driving voltage determination unit 13 also outputs an instruction to the control device 5 to tilt the mirrors 230 to the determined pivot angles. The mirrors 230 need not always be perturbed. They need to be perturbed only when determining or correcting the driving voltages.

The control device 5 supplies the driving voltages to the micromirror devices 3a and 3b to perturb the mirrors 230 or tilt the mirrors 230 to predetermined tilt angles based on the instruction from the driving voltage determination unit 13.

In this optical switch, input light which has outgone from the input port 1a is reflected by the mirrors of the input-side micromirror device 3a and output-side micromirror device 3b and enters the output port 1b. At this time, the driving voltage determination unit 13 performs the following operation to obtain optimum driving voltages capable of obtaining the optimum pivot angles of the mirrors 230 at which the output light intensity is maximized. The optimum output light intensity means a light intensity at which the optical loss is minimum or a desired light intensity based on a requirement of the system. A driving voltage for implementing the pivot angle of the mirror 230 at which such a light intensity is obtained will be referred to as an optimum driving voltage.

The driving voltage determination unit 13 causes the control device 5 to supply periodically changing driving voltages to the micromirror devices 3a and 3b to give a perturbation (vibration) to the mirrors 230. The output light measuring device 4 detects the intensity of output light which has entered the output port 1b at this time and converts it into an electrical signal. The filter 12 removes the signal frequency component of the optical signal from the electrical signal representing the output light intensity measured by the output light measuring device 4. The driving voltage determination unit 13 determines driving voltages to control the mirrors of the micromirror devices 3a and 3b to proper angles at which the output light intensity has an optimum value based on the signal obtained by causing the filter 12 to remove the signal frequency component from the electrical signal of the output light measured by the output light measuring device 4. This process is performed for each of the micromirror devices 3a and 3b, and the control device 5 supplies the obtained driving voltages to the micromirror devices 3a and 3b.

Figure 26A:
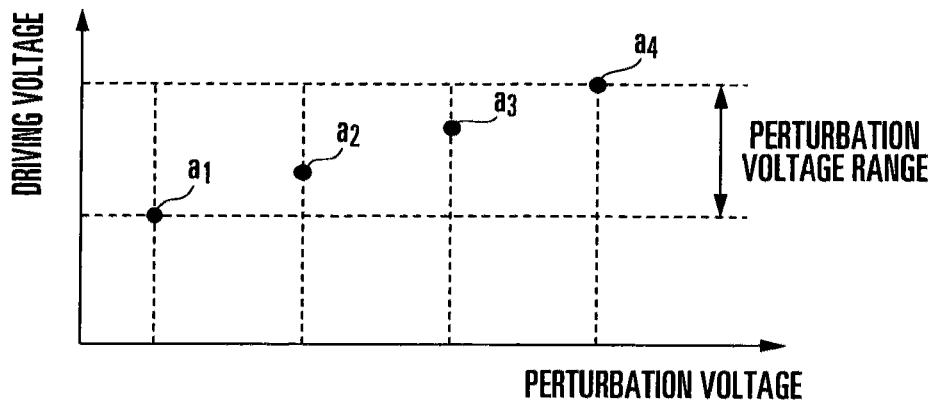
Figure 26B:
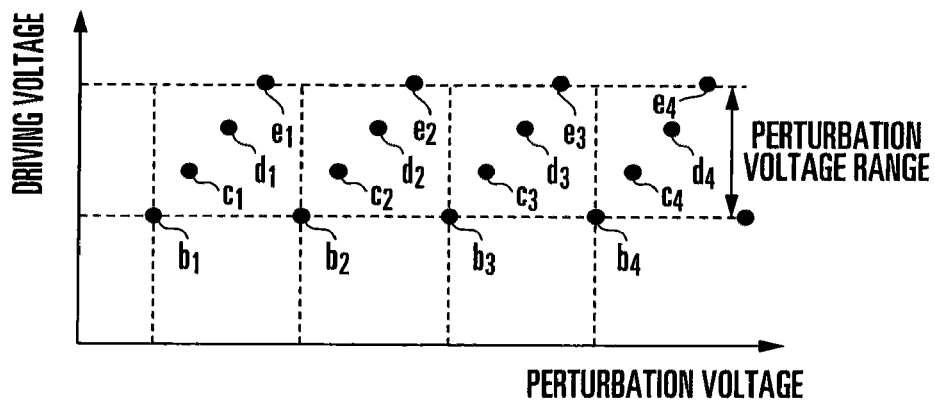
FIG. 26B is a graph showing the driving points of a micromirror device 3b.

An example of the method of detecting optimum driving voltages will be described below. As shown in FIGS. 26A and 26B, a perturbation voltage range designated in advance is divided by a series of driving points ($a_1$ to $a_4$ in FIG. 26A, and $b_1$ to $e_4$ in FIG. 26B) formed from several points (four points in FIGS. 26A and 26B). The voltages of the driving points are sequentially supplied to perturb the mirrors 230. For example, the micromirror device 3a shown in FIG. 26A is driven at the driving point $a_1$. In this state, the micromirror device 3b shown in FIG. 26B is driven at the series of driving points $b_1$ to $e_1$. Next, the micromirror device 3b is driven at the next series of driving points $b_2$ to $e_2$. In this way, the micromirror device 3b is driven at all the series of driving points $b_1$ to $e_4$. Then, the micromirror device 3a is driven at the next driving point $a_2$, and the micromirror device 3b is driven at all the series of driving points, as described above. In this way, the micromirror device 3b is driven at all the series of driving points $b_1$ to $e_4$ in correspondence with each of the driving points $a_1$ to $a_4$ of the micromirror device 3a. This enables to drive the micromirror devices 3a and 3b in all combinations of the driving points. A driving point combination of the micromirror devices 3a and 3b at which the output light power is optimum is searched for from the measurement result of the output light measuring device 4 at each driving point. The driving voltages at the driving points are detected as optimum driving voltages.

As described above, according to this embodiment, when causing the control device 5 to give a perturbation to the mirrors of the micromirror devices 3a and 3b and obtaining driving voltages capable of obtaining the pivot angles of the mirrors 230 at which the output light intensity is maximized based on the relationship between the driving voltages and the output light intensity, the filter 12 removes the intensity variation component of the input optical signal. This allows proper driving control of the mirror device. This makes it possible to prevent a decrease in the output light intensity and a degradation in the communication quality.

Note that the functions and effects of this embodiment and the first to third embodiments can be obtained even by combining the fourth embodiment with the above-described first to third embodiments.

Fifth Embodiment

The fifth embodiment of the present invention will be described next. In this embodiment, instead of providing the filter 12 as in the fourth embodiment, the gain characteristic of an output light measuring device 4 is appropriately selected, thereby removing the signal frequency component of input light, as shown in FIG. 25. The same names and reference numerals as in the fourth embodiment denote the same constituent elements in the fifth embodiment, and a description will be omitted as needed.

Figure 27:
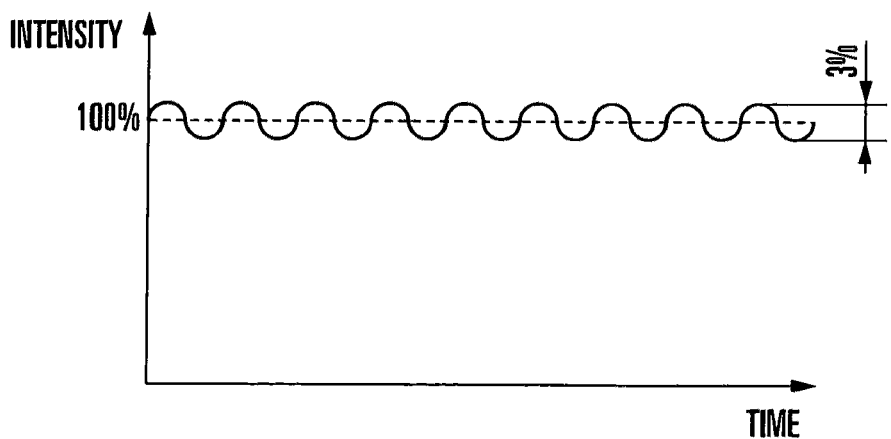
FIG. 27 is a timing chart for explaining a variation tolerance.

The output light measuring device 4 of this embodiment uses a light-receiving element 4a having a frequency response characteristic representing that the gain in the signal frequency band of an optical signal is lower than those in other frequency bands. Generally, when the light-receiving element 4a responds to the signal frequency band of input light, an intensity variation caused by the signal affects the measurement value of the output light measuring device 4. When the light-receiving element 4a having the above-described frequency response characteristic is used, the influence of the signal component of the optical signal can be eliminated or reduced. As the light-receiving element 4a, a light-receiving element whose gain characteristic decreases the variation caused by the signal component of an optical signal with respect to the variation tolerance of an optical switch is used. The "variation tolerance" is the allowance ratio with respect to the maximum value of the output light intensity. For example, as shown in FIG. 27, when the variation tolerance is 0.1 dB (about 3%), a light-receiving element whose gain in the signal frequency band is 3% or less, i.e., −16 dB (corresponding to 3%) or less with respect to the DC component is used. This enables to almost eliminate the influence of the intensity variation in the signal frequency band of an optical signal.

In this optical switch, input light which has outgone from an input port 1a is reflected by the mirrors of an input-side micromirror device 3a and an output-side micromirror device 3b and enters an output port 1b. At this time, a driving voltage determination unit 13 performs the following operation to obtain optimum driving voltages capable of obtaining the pivot angles of mirrors 230 at which the output light intensity is maximized.

The driving voltage determination unit 13 causes a control device 5 to supply periodically changing driving voltages to the micromirror devices 3a and 3b to give a perturbation (vibration) to the mirrors 230. The output light measuring device 4 detects the intensity of output light which has entered the output port 1b at this time and converts it into an electrical signal. The light-receiving element of the output light measuring device 4 eliminates or reduces the influence of the signal component of the optical signal in the electrical signal. The driving voltage determination unit 13 determines driving voltages to control the mirrors of the micromirror devices 3a and 3b to proper angles at which the output light intensity has an optimum value based on the signal obtained by removing the signal frequency component measured by the output light measuring device 4. This process is performed for each of the micromirror devices 3a and 3b, and the control device 5 supplies the obtained driving voltages to the micromirror devices 3a and 3b.

As described above, according to this embodiment, when causing the control device 5 to give a perturbation to the mirrors of the micromirror devices 3a and 3b and obtaining driving voltages capable of obtaining the pivot angles of the mirrors 230 at which the output light intensity is maximized based on the relationship between the driving voltages and the output light intensity, the intensity variation component of the input optical signal is removed or attenuated using a light-receiving element having a frequency response characteristic representing that the gain in the signal frequency band of the optical signal is lower than those in other frequency bands. This allows proper driving control of the mirror device. This makes it possible to prevent a decrease in the output light intensity and a degradation in the communication quality.

Note that the functions and effects of this embodiment and the first to fourth embodiments can be obtained even by combining the fifth embodiment with the above-described first to third embodiments.

Sixth Embodiment

The sixth embodiment of the present invention will be described next. FIG. 28 is a block diagram schematically showing the arrangement of a wavelength selective switch according to the sixth embodiment of the present invention. In this embodiment, the present invention is applied to a wavelength selective switch (WSS) as a kind of optical switch. Referring to FIG. 28, reference numeral 210 denotes an input port; 211a and 211b, output ports; 212, a micromirror array; 214, a main lens; 215, a reflection grating; 216, a collimator lens; 217a and 217b, output light measuring devices provided at the output ports 211a and 211b, respectively; 218, a filter; 219, a driving voltage determination unit; and 220, a control device. The micromirror array 212 includes a plurality of micromirror devices 213a, 213b, and 213c arrayed one-dimensionally.

The input port 210 outputs, to the main lens 214, a wavelength multiplexed signal 221 formed by multiplexing a plurality of optical signals having different wavelengths. The wavelength multiplexed signal 221 which has passed through the main lens 214 enters the reflection grating 215. The wavelength multiplexed signal 221 which has entered the reflection grating 215 is reflected by the reflection grating 215 and demultiplexed into a plurality of optical signals 222a, 222b, and 222c having different wavelengths. The demultiplexed optical signals 222a, 222b, and 222c pass through the main lens 214 again and enter the predetermined micromirror devices 213a, 213b, and 213c, respectively.

The optical signals 222a, 222b, and 222c are reflected by the mirrors of the corresponding micromirror devices 213a, 213b, and 213c, respectively. Then, the optical signals 222a, 222b, and 222c are collimated by the collimator lens 216 to optical signals 223a, 223b, and 223c and enter the reflection grating 215 via the main lens 214. Each of the optical signals 223a, 223b, and 223c is reflected by the reflection grating 215, passes through the main lens 214 again, and enters one of the plurality of output ports 211a and 211b. In the example shown in FIG. 28, the optical signals 223a and 223c reflected by the micromirror devices 213a and 213c enter the output port 211a, and the optical signal 223b reflected by the micromirror device 213b enters the output port 211b.

In this way, the wavelength multiplexed signal 221 from the input port 210 is input to the reflection grating 215 and demultiplexed into a plurality of optical signals. Each of the demultiplexed optical signals is input to a corresponding one of the micromirror devices 213a, 213b, and 213c. At this time, the control device 220 appropriately controls the direction of each mirror. An optical signal having a wavelength, or one or a plurality of sets of a plurality of optical signals having different wavelengths are extracted. The optical signals of each set can be combined and input to a desired one of the output ports 211a and 211b.

Each of the micromirror devices 213a, 213b, and 213c has the same arrangement as that of the micromirror devices 3a and 3b of the first embodiment.

As in the fourth embodiment, each of the output light measuring devices 217a and 217b detects the intensity of output light that has entered the corresponding to one of the output ports 211a and 211b and converts it into an electrical signal.

As in the fourth embodiment, the filter 218 removes a predetermined frequency component from the electrical signal generated by the output light measuring device 217a, 217b.

As in the fourth embodiment, the driving voltage determination unit 219 determines driving voltages to control the mirrors of the micromirror devices 213a, 213b, and 213c to proper angles based on the output light intensity measured by each of the output light measuring devices 217a and 217b when the mirrors of the micromirror devices 213a, 213b, and 213c are perturbed in accordance with an instruction output to the control device 220.

As in the fourth embodiment, the control device 220 supplies the driving voltages to the micromirror devices 213a, 213b, and 213c to perturb the mirrors or tilt the mirrors to predetermined tilt angles based on an instruction from the driving voltage determination unit 219.

As described above, in the example shown in FIG. 28, the optical signals reflected by the micromirror devices 213a and 213c enter the output port 211a, and the optical signal reflected by the micromirror device 213b enters the output port 211b. Hence, the driving voltage determination unit 219 determines the driving voltages to be supplied to the micromirror devices 213a and 213c such that the output light intensity detected by the output light measuring device 217a is optimum, and the driving voltages of the micromirror device 213b such that the output light intensity detected by the output light measuring device 217b is optimum.

The driving voltage determination unit 219 causes the control device 220 to supply periodically changing driving voltages to the micromirror devices 213a, 213b, and 213c to give a perturbation (vibration) to the mirrors. Each of the output light measuring devices 217a and 217b detects the intensity of output light which has entered the corresponding one of the output ports 211a and 211b at this time and converts it into an electrical signal. The filter 218 removes the signal frequency component of the optical signal from the electrical signal of the output light intensity measured by each of the output light measuring devices 217a and 217b. The driving voltage determination unit 219 determines driving voltages to control the mirrors of the micromirror devices 213a, 213b, and 213c to proper angles at which the output light intensity has an optimum value based on the signal obtained by causing the filter 218 to remove the signal frequency component from the electrical signal of the output light measured by each of the output light measuring devices 217a and 217b. The control device 220 supplies the driving voltages determined by the driving voltage determination unit 219 to the micromirror devices 213a, 213b, and 213c so that the mirrors of the micromirror devices 213a, 213b, and 213c pivot to the pivot angles at which the output light intensity is optimum. In this way, according to this embodiment, the same effects as in the fourth embodiment can be obtained in the wavelength selective switch.

Note that the functions and effects of this embodiment and the first to third embodiments can be obtained even by combining the sixth embodiment with the above-described first to fourth embodiments.

Seventh Embodiment

The seventh embodiment of the present invention will be described next. In this embodiment, instead of providing the filter 218 in a wavelength selective switch of the seventh embodiment, the gain characteristic of each of output light measuring devices 217a and 217b is appropriately selected, as in the second embodiment, thereby removing the signal frequency component of input light, as shown in FIG. 29. The same names and reference numerals as in the fourth to sixth embodiments denote the same constituent elements in the seventh embodiment, and a description will be omitted as needed.

As in the fifth embodiment, each of the output light measuring devices 217a and 217b of this embodiment uses a light-receiving element having a frequency response characteristic representing that the gain in the signal frequency band of an optical signal is lower than those in other frequency bands.

In the example shown in FIG. 29, optical signals reflected by micromirror devices 213a and 213c enter an output port 211a, and an optical signal reflected by a micromirror device 213b enters an output port 211b, as in the above-described sixth embodiment. Hence, a driving voltage determination unit 219 determines the driving voltages to be supplied to the micromirror devices 213a and 213c such that the output light intensity detected by the output light measuring device 217a is optimum, and the driving voltages of the micromirror device 213b such that the output light intensity detected by the output light measuring device 217b is optimum.

The driving voltage determination unit 219 causes a control device 220 to supply periodically changing driving voltages to the micromirror devices 213a, 213b, and 213c to give a perturbation (vibration) to the mirrors. Each of the output light measuring devices 217a and 217b detects the intensity of output light which has entered the corresponding one of the output ports 211a and 211b at this time and converts it into an electrical signal. The light-receiving element of each of the output light measuring devices 217a and 217b eliminates or reduces the influence of the signal component of the optical signal in the electrical signal. The driving voltage determination unit 219 determines driving voltages to control the mirrors of the micromirror devices 213a, 213b, and 213c to proper angles at which the output light intensity has an optimum value based on the signal obtained by removing the signal frequency component measured by each of the output light measuring devices 217a and 217b. The control device 220 supplies the driving voltages determined by the driving voltage determination unit 219 to the micromirror devices 213a, 213b, and 213c so that the mirrors of the micromirror devices 213a, 213b, and 213c pivot to the pivot angles at which the output light intensity is optimum.

In this way, according to this embodiment, the same effects as in the fifth embodiment can be obtained in the wavelength selective switch.

In FIGS. 28 and 29, two output ports and three micromirror devices are used. However, the number of output ports and the number of micromirror devices are not limited to those and can freely be set as needed. As a preferable example, micromirror devices equal in number to the wavelengths of optical signals input from the input port are provided, and the number of output ports is set to be equal to or smaller than the number of wavelengths.

Note that the functions and effects of this embodiment and the first to third embodiments can be obtained even by combining the seventh embodiment with the above-described first to third embodiments.

Eighth Embodiment

The eighth embodiment of the present invention will be described next.

As shown in FIGS. 37 to 39, in the above-described optical switch, generally, a control device (not shown) for controlling the tilt angles of mirrors 230 supplies periodically changing driving voltages to micromirror devices 3a and 3b, thereby giving a perturbation (vibration) to the mirrors 230. While doing so, an output light measuring device (not shown) provided on the output terminal side of an output ports 1b measures the output light intensity. The relationship between the driving voltages and the output light intensity is obtained, thereby obtaining optimum driving voltages which ensure the optimum tilt angles of the mirrors 230 (e.g., driving voltages which optimize the output light intensity).

When a perturbation is given, the output light power varies. This variation is very small in one optical switch. However, when a plurality of optical switches as described above are connected in series, like a ring-shaped network, and the perturbations of the switches synchronize, the variation in the output light power is amplified. When the power variation is amplified, the output light power becomes unstable. This makes it difficult to obtain optimum driving voltages and also degrades the communication quality.

This embodiment has been made to overcome the above-described problems, and has as its object to prevent a degradation in communication quality in a communication system formed by connecting a plurality of optical switches in series.

According to this embodiment, the control device can perturb the mirror of a mirror device without any synchronization with other optical switches, thereby preventing amplification of the variation in the output light power. This makes it possible to detect optimum driving voltages and prevent a degradation in communication quality.

The eighth embodiment of the present invention will be described below in detail with reference to the accompanying drawings. The same names and reference numerals as in the first to seventh embodiments and "Background Art" described with reference to FIGS. 37 to 39 denote the same constituent elements in the eighth embodiment, and a description will be omitted as needed.

Figure 30:
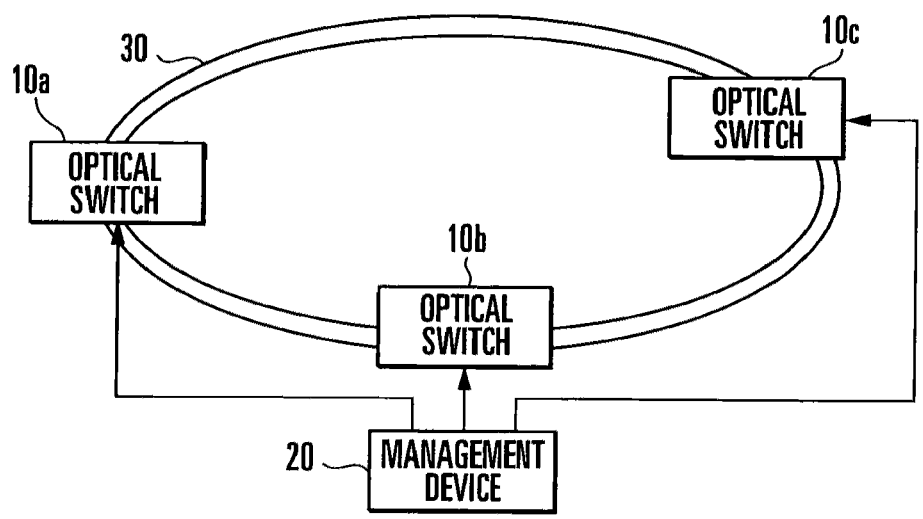
FIG. 30 is a block diagram schematically showing the arrangement of a communication system according to the present invention.

As shown in FIG. 30, the communication system having optical switches according to this embodiment includes optical switches 10a to 10c which are connected in series into a ring shape via a ring-shaped network 30, and a management device 20 connected to the optical switches. The optical switches 10a to 10c have the same arrangement.

<Arrangement of Optical Switch>

Figure 31:
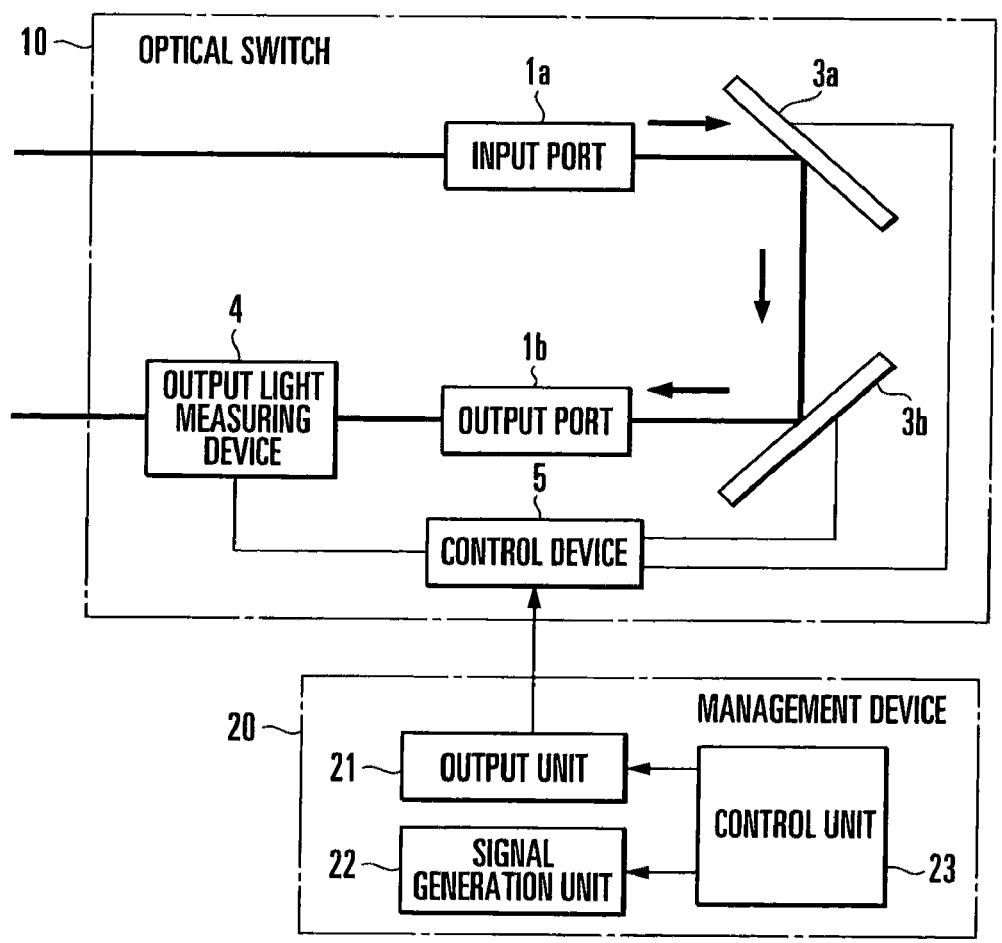
FIG. 31 is a block diagram schematically showing the arrangement of an optical switch according to the eighth embodiment of the present invention.

As shown in FIG. 31, an optical switch 10 which forms each of the optical switches 10a to 10c includes an input port 1a, the output port 1b, the input-side micromirror device 3a, the output-side micromirror device 3b, an output light measuring device 4, and a control device 5.

The output light measuring device 4 detects the power, i.e., intensity of output light which has outgone from the output port 1b and converts it into an electrical signal. The output light measuring device 4 can have an arrangement for extracting part of output light and measuring the output light power using a light-receiving element such as a photodiode.

The control device 5 supplies voltages (to be referred to as "driving voltages" hereinafter) to the micromirror devices 3a and 3b to tilt the mirrors 230 to predetermined angles. The control device 5 also gives a small variation to the driving voltages to perturb the mirrors 230 based on a control signal from the management device to be described later. At this time, the optimum driving voltages of the mirror devices 3a and 3b are obtained based on the electrical signal from the output light measuring device 4.

<Arrangement of Management Device>

As shown in FIG. 31, the management device 20 includes an output unit 21, signal generation unit 22, and control unit 23.

The output unit 21 sends control signals generated by the signal generation unit 22 to the optical switches 10a to 10c based on an instruction from the control unit 23.

The signal generation unit 22 generates a control signal to be sent to each optical switch 10 to control the perturbation of the mirror 230. Each control signal is generated such that the mirrors 230 of the optical switches 10a to 10c are perturbed without synchronization with the mirrors 230 of other optical switches 10. Synchronization means that the perturbations of the mirrors 230 of two or more optical switches 10 match in terms of, e.g., the points of time of generation, generation period, frequency, and phase. If the perturbations of the mirrors 230 of two or more optical switches synchronize, the variation in the output light power caused by the perturbation of one optical switch is amplified by the perturbations of the other optical switches. For example, if the optical switches 10 are connected in series into a ring shape via the network 30 as shown in FIG. 30, and the perturbations of the mirrors 230 of the optical switches 10 synchronize, the variation in the output light power of each optical switch 10 is amplified, and the output light power becomes unstable. In this embodiment, the signal generation unit 22 generates control signals, and each optical switch 10 performs a perturbation based on the control signal, thereby preventing synchronization of the perturbations of the optical switches 10.

In this embodiment, the management device 20 specifies the perturbation timing of each mirror 230 based on a control signal. More specifically, the signal generation unit 22 generates control signals to perturb the mirrors 230 of the optical switches 10 in different periods and not simultaneously with the mirrors 230 of other optical switches 10.

The control unit 23 sends the control signals generated by the signal generation unit 22 to the optical switches 10a to 10c via the output unit 21.

<Operation of Communication System>

The operation of the communication system according to this embodiment will be described next.

First, the management device 20 causes the signal generation unit 22 to generate control signals to specify the perturbation timings of the optical switches 10a to 10c and sends the control signals to the optical switches 10a to 10c via the output unit 21. The sending is done continuously or at a predetermined interval.

The optical switches 10a to 10c perform a perturbation operation based on the control signals received from the management device 20. More specifically, the control device 5 supplies driving voltages to each of the input-side micromirror device 3a and output-side micromirror device 3b to tilt the mirrors of the arbitrary micromirror devices 3a and 3b to predetermined angles and causes the input light which has outgone from the input port 1a to outgo from the specific output port 1b. At this time, the control device 5 gives a small periodical voltage change to the driving voltages to slightly perturb (vibrate) the mirrors 230 to obtain optimum driving voltages at which the pivot angles of the mirrors 230 optimize the output light intensity. The perturbation is done at a timing specified by each control signal received from the management device 20.

The output light measuring device 4 measures the power of output light which has entered the output port 1b in a perturbed state and outputs the measurement value to the control device 5. Based on the measurement value, the control device 5 detects driving voltages at which the output light power has an optimum value and supplies the driving voltages to the micromirror devices 3a and 3b. The mirrors of the micromirror devices 3a and 3b are controlled to the angles at which the power of output light which has outgone from the output port 1b has an optimum value.

In this way, the control device 5 perturbs the mirrors 230 of the micromirror devices 3a and 3b based on the control signals from the management device 20 and obtains optimum driving voltages capable of obtaining an optimum output light power based on the relationship between the driving voltages and the output light power. The control signal of each optical switch 10 is generated such that the perturbation period does not overlap with those of the remaining optical switches 10. Hence, the mirror 230 of each of the optical switches 10a to 10c is perturbed without synchronization with the mirrors 230 of other optical switches 10. Hence, only one optical switch 10 performs a perturbation at a time. This prevents synchronization of the perturbations of the mirrors 230 of the optical switches 10a to 10c. Since the variation in the output light power stabilizes, optimum driving voltages can be detected, and the degradation in the communication quality can be prevented.

The optimum output light power means an output light power at which the optical loss with respect to the input light is minimum or a desired output light power based on a requirement of the system. A driving voltage for implementing the pivot angle of a mirror at which such an output light power is obtained will be referred to as an optimum driving voltage.

In this embodiment, the signal generation unit 22 generates a control signal associated with the timing of a perturbation. However, the signal generation unit 22 may generate a signal to specify not the timing but the frequency or phase of a perturbation.

For example, when control signals to specify frequencies are generated, the control device 5 of each of the optical switches 10a to 10c perturbs the mirror 230 at the frequency specified by the control signal. Each control signal is generated such that the frequency at which the mirror 230 is perturbed is different from those of the remaining control signals and is not an integer multiple of each of the perturbation frequencies specified by the remaining control signals. Hence, the mirror 230 of each of the optical switches 10a to 10c is perturbed at different frequencies. This prevents synchronization of the perturbations of the mirrors 230 of the optical switches 10a to 10c. It is consequently possible to prevent the degradation in the communication quality.

For example, when control signals to specify phases are generated, the control device 5 of each of the optical switches 10a to 10c perturbs the mirror 230 at the phase specified by the control signal. Each control signal is generated by, e.g., adding time lags to signals of the same frequency such that the phase of the perturbation of the mirror 230 shifts from those of the remaining control signals. Hence, the mirrors 230 of the optical switches 10a to 10c are perturbed with phase shifts, respectively. This prevents synchronization of the perturbations of the mirrors 230 of the optical switches 10a to 10c with zero phase difference. It is consequently possible to prevent the degradation in the communication quality.

As described above, according to this embodiment, the management device 20 generates control signals to perturb the mirrors 230 of the optical switches 10a to 10c asynchronously with the mirrors 230 of other optical switches 10. This prevents synchronization of the perturbations in the optical switches 10a to 10c and consequently prevents the degradation in the communication quality.

Note that the functions and effects of this embodiment and the first to third embodiments can be obtained even by combining the eighth embodiment with the above-described first to third embodiments.

Ninth Embodiment

Figure 32:
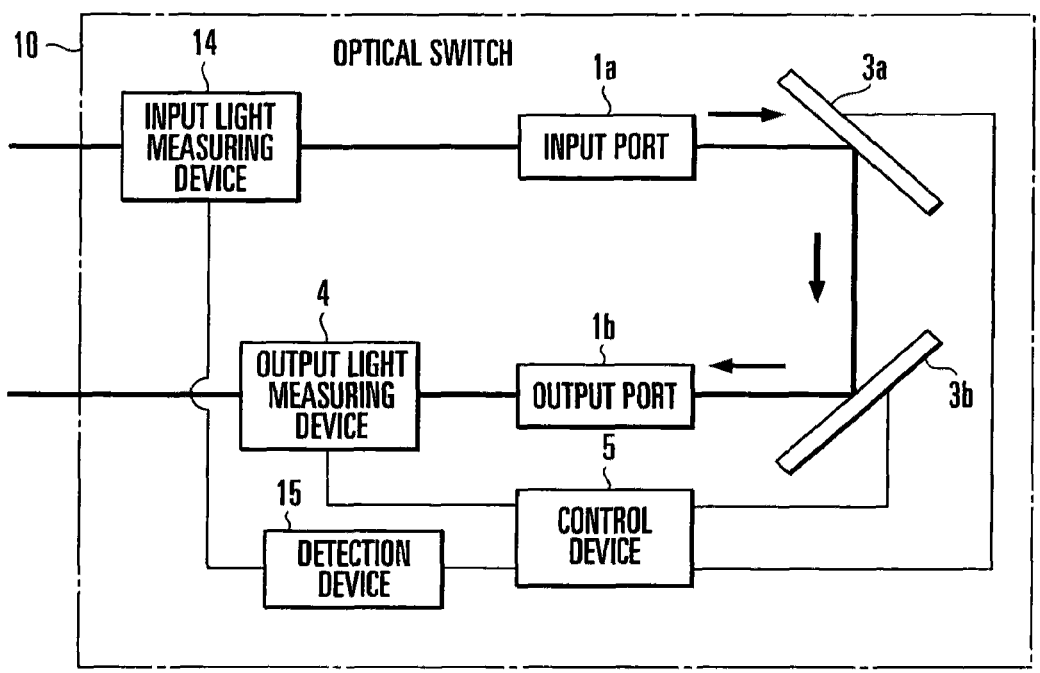
FIG. 32 is a block diagram schematically showing the arrangement of an optical switch according to the ninth embodiment of the present invention.

The ninth embodiment of the present invention will be described next. In this embodiment, instead of providing the management device 20 as in the eighth embodiment, an input light measuring device 14 and a detection device 15 are arranged in each optical switch 10, as shown in FIG. 32. Each optical switch 10 performs a perturbation based on the measurement result of the detection device 15. The remaining components are the same as in the eighth embodiment. The same names and reference numerals as in the eighth embodiment denote the same constituent elements in the ninth embodiment, and a description will be omitted as needed.

The input light measuring device 14 measures the power of input light to be input to an input port 1a. The input light measuring device 14 can have an arrangement for extracting part of input light and measuring the input light power using a light-receiving element such as a photodiode.

The detection device 15 detects, based on the measurement result of the input light measuring device 14, the presence/absence of the perturbation of a mirror in another optical switch 10, the perturbation frequency, and the perturbation phase.

<Operation of Optical Switch>

The operation of the optical switch 10 according to this embodiment will be described next.

To perform the switching operation of the optical switch 10, a control device 5 supplies driving voltages to an input-side micromirror device 3a and an output-side micromirror device 3b to tilt the mirrors of the arbitrary micromirror devices 3a and 3b to predetermined angles and causes the input light which has outgone from the input port 1a to outgo from a specific output port 1b. At this time, the control device 5 gives a small periodical voltage change to the driving voltages to slightly perturb (vibrate) mirrors 230 based on the detection result of the perturbation of each mirror 230 detected by the detection device 15, to obtain driving voltages at which the pivot angles of the mirrors 230 optimize the output light intensity. In the following explanation, the optical switch 10 sequentially sets the following three states to perform a perturbation at a timing different from those of other optical switches 10 without synchronization with the perturbations of the mirrors 230 of the other optical switches 10. The three states are "perturbation" in which a perturbation is performed, "measurement" in which the state of the optical switch 10 of the preceding state is measured, and "standby" in which neither perturbation nor measurement is done. The transition of the three states will be described with reference to FIG. 33.

Figure 33:
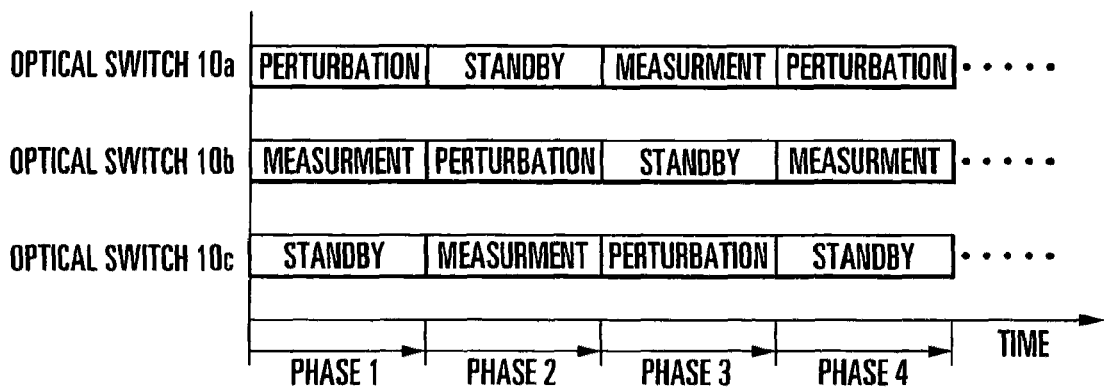
FIG. 33 is a timing chart for explaining the operation of an optical switch according to the 10th embodiment of the present invention.

When optical switches 10a to 10c are connected in series as shown in FIG. 30, each of the optical switches 10a to 10c performs a perturbation, standby, and measurement in this order without overlap with the remaining optical switches 10, as shown in FIG. 33, thereby preventing synchronization with the perturbations of the remaining optical switches 10.

Assume that the optical switch 10a is performing a perturbation in Phase 1. At this time, the optical switch 10b of the succeeding stage of the optical switch 10a measures the variation in the output light power of the optical switch 10a and detects the presence/absence of the perturbation of the optical switch 10a. The optical switch 10c of the succeeding stage of the optical switch 10b stands by for a predetermined time.

When the perturbation of the optical switch 10a ends, the state shifts to Phase 2. In Phase 2, the optical switch 10a stands by for a predetermined time. The predetermined standby time can freely be set to, e.g., the perturbation time of the optical switch 10a. Upon detecting based on the variation in the output light power of the optical switch 10a that the perturbation of the optical switch 10a has ended, the optical switch 10b starts a perturbation. The perturbation is done for a predetermined time. After standing by for a predetermined time, the optical switch 10c measures the variation in the output light power of the optical switch 10b of the preceding stage and detects the presence/absence of the perturbation of the optical switch 10b of the preceding stage.

When the perturbation of the optical switch 10b ends, the state shifts to Phase 3. In Phase 3, after standing by for a predetermined time, the optical switch 10a measures the variation in the output light power of the optical switch 10c of the preceding stage and detects the presence/absence of the perturbation of the optical switch 10c of the preceding stage. When the perturbation has ended, the optical switch 10b stands by for a predetermined time. Upon detecting based on the variation in the output light power of the optical switch 10b that the perturbation of the optical switch 10b has ended, the optical switch 10c starts a perturbation.

In this way, the optical switches 10a to 10c sequentially selectively perform "perturbation", "standby", and "measurement" in Phases. Each of the optical switches 10a to 10c can perform the perturbation without overlap with the remaining optical switches 10 This prevents synchronization of the perturbations of the mirrors 230 of other optical switches 10. It is consequently possible to prevent the degradation in the communication quality.

When the detection device 15 detects the frequency of the perturbation of the optical switch 10 of the preceding stage, the control device 5 perturbs the mirror 230 at a frequency which is different from the detected frequency and is not an integer multiple of it. The optical switches 10 perturb the mirrors 230 at different frequencies. This prevents synchronization of the perturbations of the plurality of optical switches 10 even when they are connected in series. It is consequently possible to prevent the degradation in the communication quality.

When the detection device 15 detects the phase of the perturbation of the optical switch 10c of the preceding stage, the control device 5 perturbs the mirror 230 at a phase shifted from the detected phase. The optical switches 10 perturb the mirrors 230 at different phases. This prevents synchronization of the perturbations of the plurality of optical switches 10 even when they are connected in series. It is consequently possible to prevent the loss of the output light power.

As described above, according to this embodiment, the input light measuring device 14 detects perturbation information about the perturbation of the optical switch 10 of the preceding stage. This makes it possible to perturb the mirror 230 without synchronization with the remaining optical switches 10. Since the variation in the output light power stabilizes, optimum driving voltages can be detected, and the degradation in the communication quality can be prevented.

Note that the functions and effects of this embodiment and the first to third embodiments can be obtained even by combining the ninth embodiment with the above-described first to third embodiments.

10th Embodiment

The 10th embodiment of the present invention will be described next.

In the optical switch shown in FIGS. 37 to 39, a change in the environment including the ambient temperature and humidity generates a positional error between the input/output ports and the mirrors or changes the mirror tilt angle. This gradually increases the shift from the optimum mirror tilt angle and results in drift so that the power loss of output light varies over time.

However, if the drift per unit time is large, the relationship between voltages applied to electrodes 340a to 340d and the output light intensity largely changes even during a perturbation. This may lead to find a wrong maximum value of output light intensity.

Figure 40A:
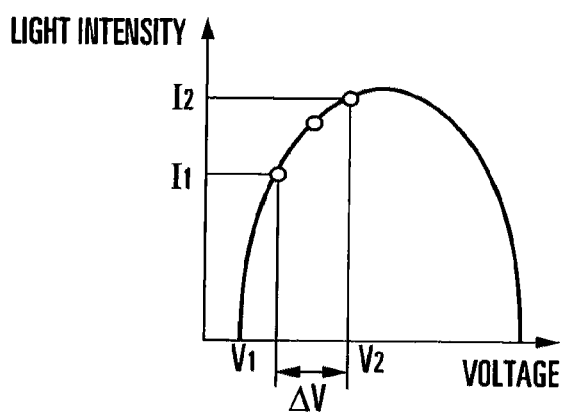
FIG. 40A is a graph schematically showing the relationship between an output light intensity and a manipulated variable.
Figure 40B:
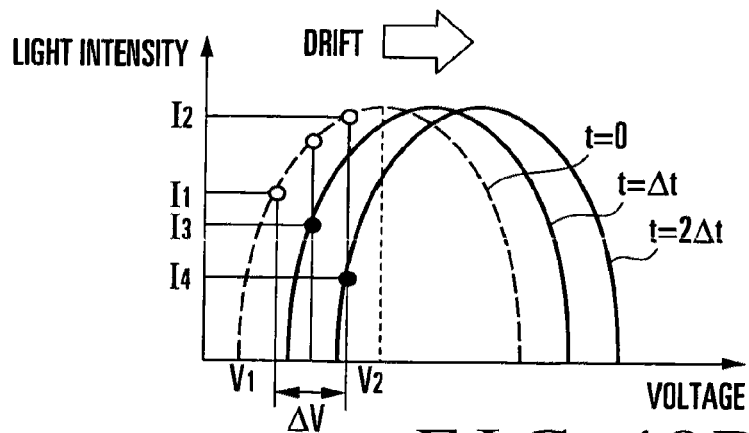
FIG. 40B is a graph schematically showing the relationship between an output light intensity and a manipulated variable when drift has occurred.

For example, if the voltages applied to the electrodes 340a to 340d and the output light intensity have the relationship shown in FIG. 40A, the maximum value of the light intensity within a range $\Delta V$ from a voltage $V_1$ [V] to a voltage $V_2$ [V] is a light intensity $I_2$ at the voltage $V_2$. However, if the shift amount from the optimum mirror tilt angle per unit time largely drifts, for example, a light intensity $I_1$ at time t=0 is erroneously determined as the maximum value, although the actual maximum value is a light intensity $I_4$ at time t=2Δt after the sampling time, as shown in FIG. 40B. In this case, it is also impossible to search for driving voltages at which the light intensity is maximum because the range $\Delta V$ is narrow.

It is an object of this embodiment to provide an optical switch capable of accurately searching for the optimum posture of a deflecting element.

According to this embodiment, a predetermined range is set based on the change amount of the mirror tilt angle per unit time. This makes it possible to search for the maximum value of output light power without any influence of drift and consequently accurately search for the optimum deflection angle of a mirror.

This embodiment will be described below in detail with reference to the accompanying drawings. The same names and reference numerals as in the first to ninth embodiments and "Background Art" described with reference to FIGS. 37 to 39 denote the same constituent elements in this embodiment, and a description will be omitted as needed.

<Arrangement of Optical Switch>

Figure 34A:
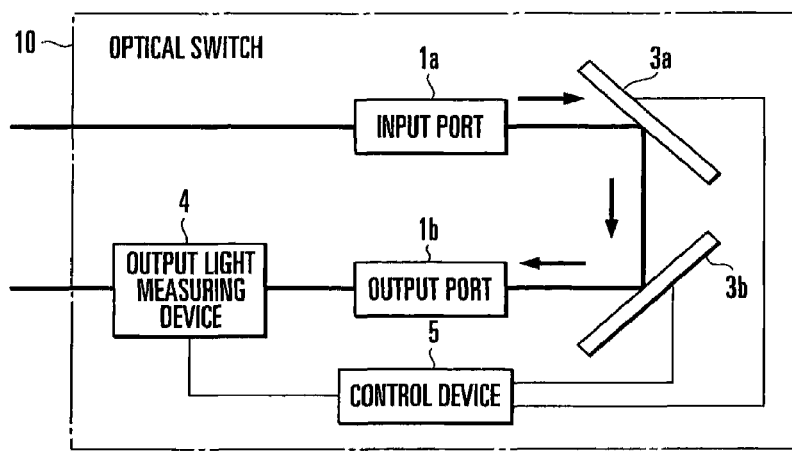
FIG. 34A is a block diagram showing the arrangement of an optical switch according to the present invention.
Figure 34B:
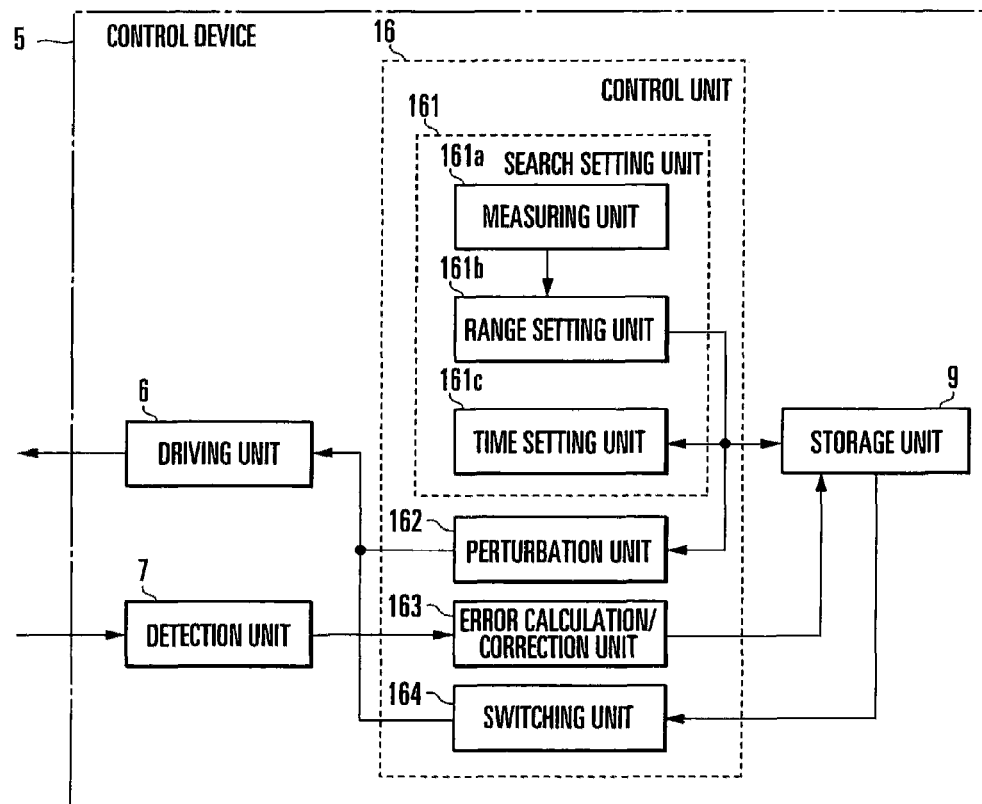
FIG. 34B is a block diagram showing the arrangement of a control device.

As shown in FIG. 34A, an optical switch 10 according to this embodiment includes an input port 1a, output port 1b, input-side micromirror device 3a, output-side micromirror device 3b, output light measuring device 4, and control device 5.

The output light measuring device 4 detects the intensity of output light which has outgone from the output port 1b and converts it into an electrical signal. The output light measuring device 4 can have an arrangement for extracting part of output light and measuring the output light intensity using a light-receiving element such as a photodiode.

The control device 5 includes a driving unit 6, detection unit 7, control unit 16, and storage unit 9.

The driving unit 6 supplies driving voltages to the micromirror devices 3a and 3b to tilt mirrors 230 to predetermined angles or give a very small variation to the driving voltages and perturb the mirrors 230 based on an instruction from the control unit 16.

The detection unit 7 detects the output light measurement result of the output light measuring device 4 when the driving unit 6 has driven the micromirror devices 3a and 3b. The detected measurement result is output to the control unit 16.

The control unit 16 is a functional unit for controlling the operation of the entire optical switch 10 and includes at least a search setting unit 161, perturbation unit 162, error calculation/correction unit 163, and switching unit 164.

The search setting unit 161 is a functional unit which sets the perturbation range and time of the mirror 230 to be perturbed by the perturbation unit 162 in accordance with the drift amount of the power loss of output light. The search setting unit 161 includes a measuring unit 161a which measures the drift amount of the power loss of output light at a predetermined unit time (to be referred to as a "sampling time" hereinafter) interval, a range setting unit 161b which sets a predetermined range (to be referred to as a "search range" hereinafter) in which the mirror 230 is to be perturbed based on the measurement result of the measuring unit 161a, and a time setting unit 161c which sets a predetermined time (to be referred to as a "search time" hereinafter) in which the mirror 230 is to be perturbed based on the measurement result of the measuring unit 161a. The search range means the range of a periodically changing manipulated variable (to be referred to as a "perturbation manipulated variable" hereinafter) to be supplied to each of the micromirror devices 3a and 3b to perturb the mirrors 230. The search time means the time required to perturb the mirrors 230 based on all perturbation manipulated variables set within the search range. Perturbation means supplying driving voltages converted from manipulated variables to the electrodes of the micromirror devices 3a and 3b so as to perturb the mirrors 230. For example, when a micromirror device has the four electrodes 340a to 340d, as shown in FIGS. 5 and 6, perturbation manipulated variables are supplied to them, thereby perturbing the mirror 230. The search range and search time set by the search setting unit 161 are stored in the storage unit 9.

When connecting the optical paths of the arbitrary input port 1a and the arbitrary output port 1b, the perturbation unit 162 sets perturbation manipulated variables to perturb the mirrors 230 based on the search range set by the range setting unit 161b, and supplies the perturbation manipulated variables to the micromirror devices 3a and 3b via the driving unit 6. The perturbation manipulated variable supply is done to perturb the mirrors 230 based on the perturbation manipulated variables within the search time set by the time setting unit 161c.

The error calculation/correction unit 163 detects, from the output light intensity detection result of detection unit 7 when the perturbation unit 162 has perturbed the mirrors 230, driving voltages (to be referred to as "operation manipulated variables" hereinafter) for implementing the optimum deflection angles, i.e., tilt angles of the mirrors 230 to connect the optical paths of the arbitrary input port 1a and the arbitrary output port 1b.

When connecting the optical paths of the arbitrary input port 1a and the arbitrary output port 1b, the switching unit 164 supplies the operation manipulated variables to the corresponding micromirror devices 3a and 3b via the driving unit 6 based on the operation manipulated variables stored in the storage unit 9.

The storage unit 9 stores the search range and search time set by the search setting unit 161, the perturbation manipulated variables set by the perturbation unit 162, and a program for implementing the operation of the optical switch 10.

The control device 5 is formed from a computer including an arithmetic device such as a CPU, a storage device such as a memory or an HDD (Hard Disk Drive), an input device such as a keyboard, mouse, pointing device, buttons, or touch panel to detect external information input, an I/F device which transmits/receives various kinds of information via a communication line such as the Internet, a LAN (Local Are Network), or a WAN (Wide Area Network), and a display device such as a CRT (Cathode Ray Tube), LCD (Liquid Crystal Display), or FED (Field Emission Display), and a program installed in the computer. That is, hardware devices and software resources cooperate so that the program controls the hardware resources, and the above-described driving unit 6, detection unit 7, control unit 16, and storage unit 9 are implemented. The program may be recorded on a recording medium such as a flexible disk, CD-ROM, DVD-ROM, or memory card and provided.

<Search Setting Operation>

The search range and search time setting operation of the search setting unit 161 will be described next.

First, the measuring unit 161*a* of the search setting unit 161 measures the drift amount of the power loss of output light at the sampling time interval. This measurement is done based on the measurement result of the output light measuring device 4, which is obtained by supplying predetermined operation manipulated variables to the arbitrary micromirror devices 3*a* and 3*b* as the drift amount measurement target to tilt the mirrors 230 to predetermined angles and connect the optical paths between the micromirror devices and inputting an external optical signal having a predetermined light intensity distribution from the input port 1*a* to the micromirror device 3*a*. That is, the output light intensity is detected at the sampling time interval, and the values at the respective sampling times are compared, thereby measuring the drift amount.

When the drift amount is measured, the range setting unit 161*b* of the search setting unit 161 sets a search range which is wider than the range of voltages applied to the electrodes 340*a* to 340*d* to tilt the mirrors more than the drift amount, i.e., in an angular shift amount corresponding to the drift. The search range is set for each sampling time. The perturbation unit 162 sets perturbation manipulated variables based on the search range. The time setting unit 161*c* of the search setting unit 161 sets the search time to not more than a value obtained by dividing the tilt angle range of the mirror 230 corresponding to a preset output light power loss amount by the drift amount per sampling time.

Even when drift has occurred, the above-described search range setting enables to search for the peak of the output light intensity in a range wider than the drift. It is therefore possible to search for the optimum posture of the mirror 230. The above-described search time setting enables a search at an interval shorter than that for an output light intensity loss of a predetermined value or more. Since a search can be performed near the peak of the output light intensity, it is consequently possible to search for the optimum posture of the mirror 230.

Figure 35:
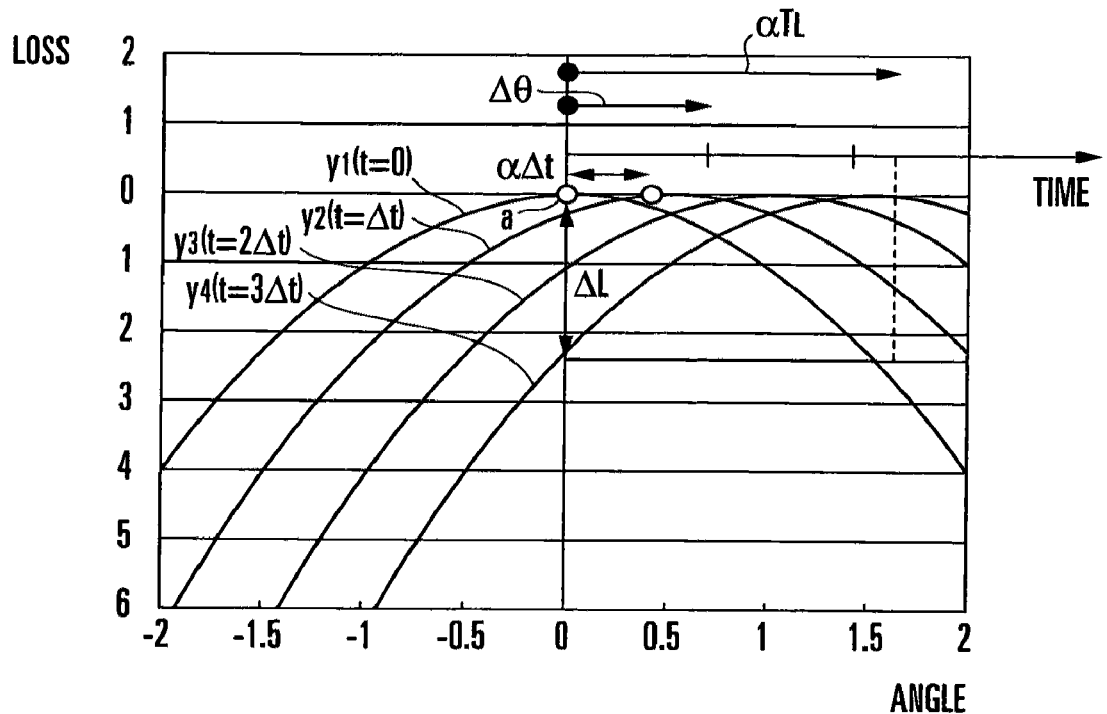
FIG. 35 is a graph for explaining a search setting operation.

An example of the search range and search time setting operation will be described next with reference to FIG. 35. FIG. 35 is a graph which shows the drift of the output light loss as a function of time and illustrates the relationship between the output light loss and the tilt angle of the mirror 230 in a one-dimensional model which increases the pivot angle error in one direction along, e.g., the mirror pivot axis or the gimbal pivot axis. An example will be described with reference to FIG. 35, in which the maximum value of the output light intensity is determined by comparing three points. Hence, curves y1 to y3 in FIG. 35 represent the first search, and y4 represents the second search. The symbols in FIG. 35 have the following meanings.

$\Delta\theta$: search range
$\Delta t$: sampling time
$\Delta L$: angle corresponding to target loss variation range
$T_L$: search time of one cycle
$\alpha$: drift time conversion factor per unit time (angle/unit time): a factor obtained by converting the loss drift per unit time into a drift angle $\alpha\Delta t$: drift angle amount in one perturbation time
$\Delta T_L$: drift angle amount in one search cycle The angle-loss distribution in each sampling time represented by each of the curves $y_1$ to $y_4$ is a quadratic function model. Since a drift angle amount $\alpha_1$ is generated in time t, the loss distribution function is as follows.

When t=0, and $\theta$=0: $y_1(\theta,t)$=0 (at position a in FIG. 35)
When t=$\Delta t$, and $\theta$=$\Delta\theta$:

$$y_2(\theta,t)=-\Delta\theta^2+2\alpha\Delta\theta\Delta t-\alpha^2\Delta t^2$$

When t=2$\Delta t$, and $\theta$=$\Delta\theta$:

$$y_3(\theta,t)=-\Delta\theta^2+4\alpha\Delta\theta\Delta t-4\alpha^2\Delta t^2$$

In this one-dimensional model, the search range and search time are set to satisfy conditions [1] and [2].

[1] A condition to find the peak value by comparing three points in the presence of drift Since $y_3>y_2$, a value found 2$\Delta$t after is larger. Hence, the search range is set to not less than the drift angle amount per sampling time, as represented by $$\Delta\theta>\alpha\Delta t \qquad (28)$$

[2] A condition to do a search within the range of the preset loss variation value even in the presence of drift.

The angle corresponding to the preset loss variation value is set to be smaller than the drift angle amount in a time required for one search cycle, as represented by $$\Delta L>\alpha T_L \qquad (29)$$

where $\Delta L$ is set based on the operation manipulated variables stored in the storage unit 9. For example when the loss variation range is set at 0.5 dB, the value of an angular width corresponding to an angle smaller than the angle at the peak position by 0.5 dB is obtained. The time required for one search cycle is equal to or less than a value obtained by dividing the angular width determined based on the preset loss variation value by the drift factor.

The range setting unit 161*b* and time setting unit 161*c* of the search setting unit 161 set the search range and search time to satisfy the above-described conditions. Hence, even when drift has occurred, it is possible to search for the peak of the output light intensity. This allows to more accurately search for the optimum posture of the mirror 230.

The system environment where the optical switch is used may require to prevent the loss variation caused by the perturbation in the search from exceeding a certain preset value. In this case, if the preset value is a "preset perturbation range value", the search range $\Delta\theta$ is set such that the difference between the maximum value and the minimum value of the loss within the search range $\Delta\theta$ is equal to or smaller than the preset loss range value.

<Perturbation Operation>

The perturbation operation of the perturbation unit 162 will be described next.

When the search range is set by the above-described method, the perturbation unit 162 sets perturbation manipulated variables based on the search range. The perturbation manipulated variables are set for each sampling time. The first perturbation manipulated variables are set based on the search range around the operation manipulated variables stored in the storage unit 9 in advance. The next perturbation manipulated variables are applied after the elapse of sampling time from the first perturbation manipulated variable application, and set based on the search range set in accordance with the drift amount at that time. For this reason, the search range at this time shifts from the first search range in a predetermined direction or becomes wider than the first search range. The perturbation manipulated variables are values obtained by dividing the set search range at a predetermined interval. A detailed example will be described below.

Figure 36:
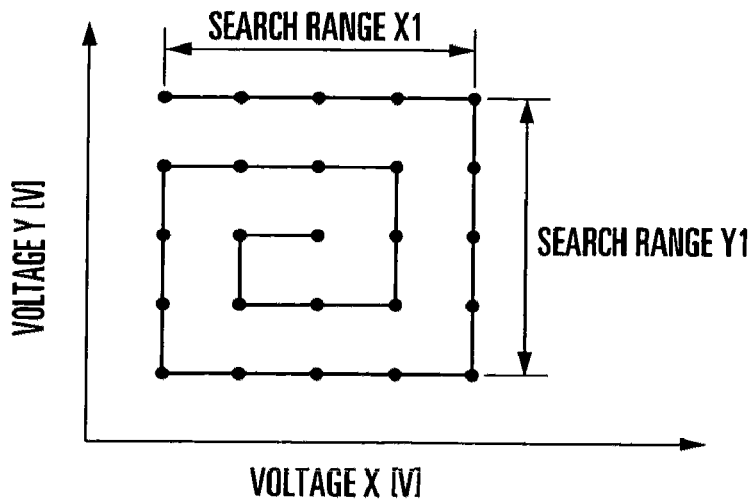
FIG. 36 is a graph showing an example of a perturbation manipulated variable.

Assume that the x-direction search range of the micromirror device 3a is set to X1, and the y-direction search range is set to Y1. If a perturbation manipulated variable is set in a spiral pattern, the range defined by X1 and Y1 is divided at a predetermined interval in consideration of the number of turns of the spiral, thereby setting perturbation manipulated variables, as shown in FIG. 36. For the micromirror device 3b as well, the perturbation manipulated variables are set in the same way. The spiral pattern indicates the trajectory of a movement which converges into a coil shape while sequentially changing the direction in the x and y directions. More specifically, in the example shown in FIG. 36, the trajectory is drawn by repeatedly moving from an arbitrary point in the positive x direction by an arbitrary distance, moving from that position in the negative y direction by an arbitrary distance, moving from that position in the negative x direction by an arbitrary distance, and moving from that position to an arbitrary position in the y direction while decreasing or increasing the arbitrary moving distance. In FIG. 36, perturbation manipulated variables are set at 25 points. The number of perturbation manipulated variables can freely be set. The pattern of perturbation manipulated variables to be set is not limited to the spiral pattern, and any other pattern such as an almost N-shaped pattern or a lattice pattern can freely be set.

Perturbation manipulated variables are set when connecting the optical paths of the micromirror devices 3a and 3b by inputting an external optical signal having a predetermined light intensity distribution from the input port 1a. The perturbation unit 162 inputs the external optical signal having a predetermined light intensity distribution from the input port 1a to the micromirror device 3a to search for optimum operation manipulated variables which minimize the connection loss of the propagating optical signal. The perturbation unit 162 then perturbs the mirrors 230 while fixing the perturbation manipulated variables of the micromirror device 3b at the outermost peripheral points and sequentially moving through the points where the perturbation manipulated variables of the micromirror device 3a are set. The perturbation is performed within the search time while moving through the points. That is, the search of one cycle is done within the search time while performing the perturbation based on all the set perturbation manipulated variables. The light intensity of the optical signal measured by the output light measuring device 4 via the detection unit 7 at this time is stored in the storage unit 9.

After the perturbation manipulated variables of the micromirror device 3a are sequentially moved through the respective set points, the perturbation manipulated variables of the micromirror device 3b are moved to the next point. The mirrors 230 are perturbed while sequentially moving through the points where the perturbation manipulated variables of the micromirror device 3a are set. After moving to the final values of the perturbation manipulated variables of the micromirror device 3b, the light intensity at each point is stored in the storage unit 9. The optimum value detection unit 84 sets the perturbation manipulated variables corresponding to the maximum value of the light intensities at the respective points, which are stored in the storage unit 9, as the optimum operation manipulated variables to connect the optical paths of the arbitrary input port 1a and the arbitrary output port 1b. The operation manipulated variable search is performed within the search time.

As described above, according to this embodiment, a search range not less than the drift amount in the sampling time is set. This makes it possible to search for the peak of output light without any influence of drift and consequently more accurately search for the optimum posture of the mirror 230.

Note that the functions and effects of this embodiment and the first to third embodiments can be obtained even by combining the 10th embodiment with the above-described first to third embodiments.

The invention claimed is:

1. An optical switch comprising:
   at least one input port which inputs input light;
   at least one output port which outputs output light;
   at least one minor device which includes a mirror pivotally supported with respect to an x-axis and a y-axis perpendicular to the x-axis, and electrodes facing the mirror, said mirror device applying driving voltages corresponding to manipulated variables to the electrodes to tilt the mirror, thereby deflecting the input light input to said input port and making the input light selectively enter an arbitrary one of said at least one output port;
   a setting unit which sets, on a plane having coordinate axes represented by a manipulated variable $V_x$ and a manipulated variable $V_y$ to tilt the mirror about the x-axis and the y-axis, respectively, a perturbation pattern to change the manipulated variable VX and the manipulated variable $V_y$ so as to draw a circular trajectory based on a trigonometric function;
   a perturbation unit which perturbs the mirror by applying voltages to the electrodes based on the perturbation pattern;
   a detection unit which detects an intensity of output light which is input light input to one input port and output from one output port upon the perturbation of the mirror; and
   an error calculation/correction unit which calculates manipulated variables to obtain a tilt angle of the mirror corresponding to connection of said one input port and said one output port using a radius of the circular trajectory and a phase difference angle calculated based on an output light intensity waveform upon the perturbation of the mirror and perturbation waveforms used to draw the circular trajectory.

2. An optical switch according to claim 1, further comprising a storage unit which stores a tolerance of a loss change amount of the output light, wherein said error calculation/correction unit further comprises a variation range calculation unit which calculates a variation range of the output light intensity, and said setting unit reduces the radius of the circular trajectory of the perturbation pattern to be used for a next perturbation if the variation range is larger than the tolerance, and increases the radius of the circular trajectory of the perturbation pattern to be used for the next perturbation if the variation range is smaller than the tolerance.

3. An optical switch according to claim 1, wherein said error calculation/correction unit determines the operating voltages based on a change in a strength of a signal obtained by removing a signal frequency component of the input light from a change in a strength of an optical signal measured by said detection unit.

4. An optical switch according to claim 3, wherein said error calculation/correction unit comprises a filter which removes the signal frequency component of the input light from the change in the strength of the optical signal measured by said detection unit.

5. An optical switch according to claim 4, wherein said filter is a low-pass filter having a cutoff frequency lower than the signal frequency component of the input light.

6. An optical switch according to claim 3, wherein said detection unit includes a light-receiving element having a frequency response characteristic representing that a gain in a signal frequency band of the input light is lower than gains in other frequency bands.

7. An optical switch according to claim 6, wherein said light-receiving element has a gain characteristic representing that a variation caused by the signal frequency component of the input light is smaller than a variation tolerance of the output light output from said output port.

8. An optical switch according to claim 7, wherein said light-receiving element has a gain characteristic representing that the gain in the signal frequency component of the input light is not more than −16 dB with respect to a gain for a DC component.

9. An optical switch according to claim 3, herein said error calculation/correction unit outputs manipulated variables which optimize the strength of the signal obtained by removing the signal frequency component of the input light from the change in the intensity of the input light measured by said detection unit upon the perturbation of the mirror.

10. An optical switch according to claim 3, wherein said perturbation unit makes a frequency of the perturbation of the mirror of said first mirror device different from a frequency of the perturbation of the mirror of said second mirror device.

11. An optical switch according to claim 10, wherein said perturbation unit sets the frequency of the perturbation of the mirror of said first mirror device not to be n (n in an integer) times or a fraction of n of the frequency of the perturbation of the mirror of said second mirror device.

12. An optical switch according to claim 11, wherein said perturbation unit sets the frequency of the perturbation of the mirror of said first mirror device and the frequency of the perturbation of the mirror of said second mirror device such that a ratio of the frequencies becomes m:k (m and k are integers).

13. An optical switch according to claim 12, wherein said error calculation unit calculates the error of the control voltage based on an output light intensity during a time period corresponding to a least common multiple of a first perturbation period specified by the frequency of the perturbation of the mirror of said first mirror device and a second perturbation period specified by the frequency of the perturbation of the mirror of said second mirror device.

14. An optical switch according to claim 13, wherein said error calculation unit calculates the error based on an average value of sums of products of the output light intensity in a section during the time period and a voltage value generated by said perturbation unit.

15. An optical switch according to claim 13, wherein said error calculation unit analyzes a frequency of the output light intensity during the time period and calculates the error based on perturbation information at the perturbation frequency of the mirror of said first mirror device, phase information with respect to the voltage applied to said first mirror device, amplitude information at the perturbation frequency of the mirror of said second mirror device, and phase information with respect to the voltage applied to said second mirror device.

16. An optical switch according to claim 15, wherein said error calculation unit calculates a controlled variable error by subtracting a phase delay component at the perturbation frequency specified by a dynamic characteristic of the mirror based on the phase.

17. An optical switch according to claim 1, wherein said perturbation unit perturbs the mirror of the optical switch without synchronization with perturbations in other optical switches connected in series.

18. An optical switch according to claim 17, wherein said perturbation unit perturbs the mirror based on an externally input control signal.

19. An optical switch according to claim 18, wherein the control signal specifics one of a timing, a frequency, and a phase of the perturbation of the mirror.

20. An optical switch according to claim 17, further comprising:
an input light measuring device which measures power of the input light; and
a detection unit which detects the perturbations of mirrors in the other optical switches based on a change in the power of the input light measured by said input light measuring device, wherein said perturbation unit perturbs the mirror of the optical switch based on a detection result of said detection unit.

21. An optical switch according to claim 20, wherein said detection unit detects one of a timing, a frequency, and a phase of the perturbation of each mirror in the other optical switches.

22. An optical switch according to claim 20, where said perturbation unit sequentially performs one of the perturbation of the mirror of the optical switch, detection of the perturbation of the mirror of one of the other optical switches by said detection unit, and standby in which neither the perturbation nor the detection is done.

23. An optical switch according to claim 1, further comprising:
a measuring unit which measures, in advance, a change amount of the tilt angle of the mirror corresponding to a change in the manipulated variable; and
a range setting unit which sets the predetermined pattern based on the change amount.

24. An optical switch according to claim 23, wherein said range setting unit sets the predetermined range to exceed a range of the manipulated variable to tilt the change amount.

25. An optical switch according to claim 23, further comprising a time setting unit which sets a time to cause said perturbation unit to supply the manipulated variables which change within the predetermined range, the time setting unit setting the time to not more than a value obtained by dividing a range of the tilt angle of the mirror corresponding to a preset range of a power loss of the output light by the change amount per unit time.

26. An optical switch control method comprising:
the setting step of setting, for an optical switch including at least one input port which inputs input light, at least one output port which outputs output light, and at least one mirror device which includes a mirror pivotally supported with respect to an x-axis and a y-axis perpendicular to the x-axis, and electrodes facing the mirror, the mirror device applying driving voltages corresponding to manipulated variables to the electrodes to tilt the mirror, thereby deflecting the input light input to the input port and making the input light selectively enter an arbitrary one of the at least one output port, on a plane having coordinate axes represented by a manipulated variable $V_x$ and a manipulated variable $V_y$ to tilt the mirror about the x-axis and the y-axis, respectively, a perturbation pattern to change the manipulated variable $V_x$ and the manipulated variable $V_y$ so as to draw a circular trajectory based on a trigonometric function;

the perturbation step of perturbing the mirror by applying voltages to the electrodes based on the perturbation pattern;

the detection step of detecting an intensity of output light which is input light input to one input port and output from one output port upon the perturbation of the mirror; and the error calculation/correction step of calculating manipulated variables to obtain a tilt angle of the mirror corresponding to connection of said one input port and said one output port using a radius of the circular trajectory and a phase difference angle calculated based on an output light intensity waveform upon the perturbation of the mirror and perturbation waveforms used to draw the circular trajectory.

27. An optical switch control method according to claim 26, further comprising the advancing step of advancing to a process of the resetting step when the error calculation/correction step is performed.

28. A communication system comprising:
a plurality of optical switches connected in series, each optical switch including at least one input port which inputs input light, at least one output port which outputs output light, at least one mirror device which includes a mirror pivotally supported with respect to an x-axis and a y-axis perpendicular to the x-axis, and electrodes facing the mirror, said mirror device applying driving voltages corresponding to manipulated variables to the electrodes to tilt the mirror, thereby deflecting the input light input to the input port and making the input light selectively enter an arbitrary one of the at least one output port, a setting unit which sets, on a plane having coordinate axes represented by a manipulated variable $V_x$ and a manipulated variable $V_y$ to tilt the mirror about the x-axis and the y-axis, respectively, a perturbation pattern to change the manipulated variable $V_x$ and the manipulated variable $V_y$ so as to draw a circular trajectory based on a trigonometric function, a perturbation unit which perturbs the mirror by applying voltages to the electrodes based on the perturbation pattern, a detection unit which detects an intensity of output light which is input light input to one input port and output from one output port upon the perturbation of the mirror, and an error calculation/correction unit which calculates manipulated variables to obtain a tilt angle of the mirror corresponding to connection of said one input port and said one output port using a radius of the circular trajectory and a phase difference angle calculated based on an output light intensity waveform upon the perturbation of the mirror and perturbation waveforms used to draw the circular trajectory; and a management device which sends a control signal to control the perturbation of the mirror in each of said optical switches without synchronization of the perturbation of the mirror between said optical switches.

29. An optical switch comprising:
at least one input port which inputs input light;
at least one output port which outputs output light;
a first mirror device which includes a mirror pivotally supported with respect to an x-axis and a y-axis perpendicular to the x-axis, and electrodes facing the mirror, the first mirror device applying driving voltages corresponding to manipulated variables to the electrodes to tilt the mirror, thereby deflecting the input light;
a second mirror device which includes a mirror pivotally supported with respect to an x-axis and a y-axis perpendicular to the x-axis, and electrodes facing the mirror, the second mirror device applying driving voltages corresponding to manipulated variables to the electrodes to tilt the mirror, thereby deflecting the light reflected by said first mirror device and outputting the light to the output port;

a perturbation unit which perturbs the mirrors of said first mirror device and said second mirror device by applying voltages which periodically change around initial values of the driving voltages;

an initial value generation unit which generates the initial values for said first mirror device and said second mirror device;

a detection unit which detects an intensity of output light which is input light input to one input port and output from one output port upon the perturbation of the mirror;

an error calculation unit which calculates an error of the manipulated variables based on the light intensity detected by said detection unit; and a correction unit which corrects the error based on the initial values using a predetermined time response waveform and updates the initial values, wherein the perturbation of the mirror of said first mirror device, the perturbation of the mirror of said second mirror device, and the detection of the light intensity are performed in synchronism, wherein said perturbation unit is configured to perturb the mirrors following a perturbation pattern which changes a manipulated variable $V_x$ and a manipulated variable $V_y$, so as to draw circular trajectory based a trigonometric function, said perturbation pattern being set on a plane having coordinate axes represented by the manipulated variable $V_x$ and the manipulated variable $V_x$ to tilt the mirrors about the x-axis and the y-axis, respectively.

30. An optical switch according to claim 29, wherein said perturbation unit perturbs the first mirror device to cause the first reflected light beam to draw a substantially conical trajectory having a vertex on the mirror of said first mirror device, and perturbs the second mirror device to cause the second reflected light beam to draw a substantially conical trajectory having a vertex on the mirror of said second mirror device.

31. An optical switch according to claim 30, wherein said perturbation unit sets an amplitude of the perturbation of the first mirror so that a variation in the output light intensity has a predetermined value, and an amplitude of the perturbation of the second mirror so that a variation in the output light intensity has a predetermined value.

32. An optical switch according to claim 30, wherein said perturbation unit sets frequencies of the perturbations of the mirrors of said first mirror device and said second mirror device to be higher than resonance frequencies in tilt directions of the mirrors about the x-axis and the y-axis.

33. An optical switch according to claim 32, wherein said perturbation unit changes an amplitude of the voltage to be applied to each of the electrodes in accordance with the frequency of the perturbation of the mirror.

34. An optical switch according to claim 33, wherein said perturbation unit increases the amplitude of the voltage as the frequency of the perturbation becomes higher.

35. An optical switch according to claim 32, wherein said perturbation unit changes the amplitude of the voltage to be applied to each of the electrodes in accordance with the resonance frequencies along the x-axis and the y-axis of the mirror.

36. An optical switch according to claim 32, wherein said perturbation unit reduces the amplitude of the voltage as the resonance frequency becomes closer to the frequency of the perturbation.

37. An optical switch according to claim 29, wherein said correction unit updates the initial value using a correction value obtained by multiplying the error calculated by said error calculation unit by a predetermined constant.

38. An optical switch according to claim 37, wherein the predetermined constant changes depending on the tilt angle of the mirror.

39. An optical switch according to claim 38, wherein the predetermined constant changes between said first mirror device and said second mirror device.

40. An optical switch according to claim 37, further comprising a waveform storage unit (115) which stores a coefficient sequence corresponding to the time response waveform, wherein said correction unit calculates a correction value sequence by further multiplying the correction value by the coefficient sequence.

41. An optical switch according to claim 40, wherein the time response waveform is a step response waveform obtained by attenuating a resonance frequency component in the tilt direction of the mirror.

42. An optical switch according to claim 29, wherein said error calculation/correction unit determines the operating voltages based on a change in a strength of a signal obtained by removing a signal frequency component of the input light from a change in a strength of an optical signal measured by said detection unit.

43. An optical switch according to claim 42, wherein said error calculation/correction unit comprises a filter which removes the signal frequency component of the input light from the change in the strength of the optical signal measured by said detection unit.

44. An optical switch according to claim 43, wherein said filter is a low-pass filter having a cutoff frequency lower than the signal frequency component of the input light.

45. An optical switch according to claim 42, wherein said detection unit includes a light-receiving element having a frequency response characteristic representing that a gain in a signal frequency band of the input light is lower than gains in other frequency bands.

46. An optical switch according to claim 45, wherein said light-receiving element has a gain characteristic representing that a variation caused by the signal frequency component of the input light is smaller than a variation tolerance of the output light output from said output port.

47. An optical switch according to claim 46, wherein said light-receiving element has a gain characteristic representing that the gain in the signal frequency component of the input light is not more than −16 dB with respect to a gain for a DC component.

48. An optical switch according to claim 42, wherein said error calculation/correction unit outputs manipulated variables which optimize the strength of the signal obtained by removing the signal frequency component of the input light from the change in the intensity of the input light measured by said detection unit upon the perturbation of the mirror.

49. An optical switch according to claim 29, wherein said perturbation unit perturbs the mirror of the optical switch without synchronization with perturbations in other optical switches connected in series.

50. An optical switch according to claim 49, wherein said perturbation unit perturbs the mirror based on an externally input control signal.

51. An optical switch according to claim 50, wherein the control signal specifics one of a timing, a frequency, and a phase of the perturbation of the mirror.

52. An optical switch according to claim 49, further comprising:
an input light measuring device which measures power of the input light; and
a detection unit which detects the perturbations of mirrors in the other optical switches based on a change in the power of the input light measured by said input light measuring device, wherein said perturbation unit perturbs the mirror of the optical switch based on a detection result of said detection unit.

53. An optical switch according to claim 52, wherein said detection unit detects one of a timing, a frequency, and a phase of the perturbation of each mirror in the other optical switches.

54. An optical switch according to claim 52, wherein said perturbation unit sequentially performs one of the perturbation of the mirror of the optical switch, detection of the perturbation of the mirror of one of the other optical switches by said detection unit, and standby in which neither the perturbation nor the detection is done.

55. An optical switch control method of controlling an optical switch including at least one input port which inputs input light, at least one output port which outputs output light, a first mirror device which includes a mirror pivotally supported with respect to an x-axis and a y-axis perpendicular to the x-axis, and electrodes facing the mirror, the first mirror device applying driving voltages corresponding to manipulated variables to the electrodes to tilt the mirror, thereby deflecting the input light, and a second mirror device which includes a mirror pivotally supported with respect to an x-axis and a y-axis perpendicular to the x-axis, and electrodes facing the mirror, the second mirror device applying driving voltages corresponding to manipulated variables to the electrodes to tilt the mirror, thereby deflecting the light reflected by the first mirror device and outputting the light to the output port, comprising:
generating initial values of the driving voltages for the first mirror device and the second mirror device;
perturbing the mirrors of the first mirror device and the second mirror device by applying voltages which periodically change around the initial values;
calculating an error of the driving voltages based on an intensity of output light which is input light input to one input port and output from one output port upon the perturbation of the mirror; and
correcting the error based on the initial values using a predetermined time response waveform and updates the initial values, wherein the second to fourth steps are repeated,
said perturbing following a perturbation pattern which changes a manipulated variable $V_x$ and a manipulated variable $V_y$ so as to draw a circular trajectory based on a trigonometric function, said perturbation pattern being set on a plane having coordinate axes represented by the manipulated variable $V_x$ and the manipulated variable $V_y$ to tilt the mirrors about the x-axis and the y-axis, respectively.

56. An optical switch control method according to claim 55, wherein in the first, third, and fourth steps, a periodical perturbation is continuously given to the mirrors of the first mirror device and the second mirror device.

57. An optical switch control method according to claim 56, wherein a sum of times of the second step, the third step, and the fourth step is an integer multiple of a time period corresponding to a least common multiple of a first perturbation period specified by the frequency of the perturbation of the mirror of the first mirror device and a second perturbation period specified by the frequency of the perturbation of the mirror of the second mirror device.

58. An optical switch control method according to claim 55, wherein when a variation in the output light intensity is not more than a predetermined value in the first step, the second step starts.

59. An optical switch control method according to claim 55, wherein when a variation in the output light intensity is not more than a predetermined value in the second step, the fifth step of stopping repeating the second to fourth steps starts.

60. An optical switch control method according to claim 59, wherein in the fifth step, the value of the voltage is gradually decreased over time until an amplitude of the perturbation becomes zero.

61. An optical switch comprising:
   at least one input port which inputs input light;
   at least one output port which outputs output light;
   at least one mirror device which includes a mirror pivotally supported with respect to an x-axis and a y-axis perpendicular to the x-axis, and electrodes facing the mirror, said mirror device applying driving voltages corresponding to manipulated variables to the electrodes to tilt the mirror, thereby deflecting the input light input to said input port and making the input light selectively enter an arbitrary one of said at least one output port;
   a perturbation unit which perturbs the mirror by applying, to the electrodes, driving voltages corresponding to manipulated variables which change within a predetermined range;
   a detection unit which detects an intensity of output light which is input light input to one input port and output from one output port upon the perturbation of the mirror;
   a setting unit which sets a perturbation pattern which changes the manipulated variables within the predetermined range;
   an error calculation/correction unit which determines a coefficient of each degree of a surface mathematical model assumed for a light intensity distribution in three-dimensional space by identifying a light intensity distribution function surface, and calculates optimum manipulated variables for said one input port and said one output port based on a maximum value of the surface, the three-dimensional space having coordinate axes represented by a manipulated variable $V_x$ and a manipulated variable $V_y$ to tilt the mirror about the x-axis and the y-axis, respectively, and the output light intensity detected by said detection unit; and
   a switching unit which applies driving voltages corresponding to the manipulated variables to the electrodes.
   wherein said setting unit changes the manipulated variable voltages in a helical pattern on a plane having coordinate axes represented by the manipulated variable $V_x$ and the manipulated variable $V_y$.

62. An optical switch according to claim 61, wherein said setting unit sets an initial value of a first helical pattern having a trajectory from outside to a center and a final value of a second helical pattern having a trajectory from the center to the outside to the same manipulated variable, and a final value of the first helical pattern and an initial value of the second helical pattern to the same manipulated variable on a plane having coordinate axes represented by the manipulated variable $V_x$ and the manipulated variable $V_y$, thereby sequentially changing the manipulated variables from the first helical pattern to the second helical pattern.

63. An optical switch according to claim 61, wherein said error calculation/correction unit sets the light intensity distribution function model to an ellipsoidal quadric paraboloid.

64. An optical switch according to claim 61, wherein said error calculation/correction unit calculates the coefficient of each degree of the assumed surface mathematical model by least square approximation.

65. An optical switch according to claim 61, wherein said error calculation/correction unit determines the operating voltages based on a change in a strength of a signal obtained by removing a signal frequency component of the input light from a change in a strength of an optical signal measured by said detection unit.

66. An optical switch according to claim 65, wherein said error calculation/correction unit comprises a filter which removes the signal frequency component of the input light from the change in the strength of the optical signal measured by said detection unit.

67. An optical switch according to claim 66, wherein said filter is a low-pass filter having a cutoff frequency lower than the signal frequency component of the input light.

68. An optical switch according to claim 65, wherein said detection unit includes a light-receiving element having a frequency response characteristic representing that a gain in a signal frequency band of the input light is lower than gains in other frequency bands.

69. An optical switch according to claim 68, wherein said light-receiving element has a gain characteristic representing that a variation caused by the signal frequency component of the input light is smaller than a variation tolerance of the optical signal output from said output port.

70. An optical switch according to claim 69, wherein said light-receiving element has a gain characteristic representing that the gain in the signal frequency component of the input light is not more than −16 dB with respect to a gain for a DC component.

71. An optical switch according to claim 65, wherein said switching unit outputs driving voltages which optimize the strength of the signal obtained by removing the signal frequency component of the optical signal from the change in the strength of the optical signal measured by said detection unit upon the perturbation of the mirror.

72. An optical switch according to claim 61, wherein said perturbation unit perturbs the mirror of the optical switch without synchronization with perturbations in other optical switches connected in series.

73. An optical switch according to claim 72, wherein said perturbation unit perturbs the mirror based on an externally input control signal.

74. An optical switch according to claim 73, wherein the control signal specifics one of a timing, a frequency, and a phase of the perturbation of the mirror.

75. An optical switch according to claim 72, further comprising:
   an input light measuring device which measures power of the input light; and
   a detection unit which detects the perturbations of mirrors in the other optical switches based on a change in the power of the input light measured by said input light measuring device, wherein said perturbation unit perturbs the mirror of the optical switch based on a detection result of said detection unit.

76. An optical switch according to claim 72, wherein said detection unit detects one of a timing, a frequency, and a phase of the perturbation of each mirror in the other optical switches.

77. An optical switch according to claim 72, wherein said perturbation unit sequentially performs one of the perturbation of the mirror of the optical switch, detection of the perturbation of the mirror of one of the other optical switches by said detection unit, and standby in which neither the perturbation nor the detection is done.

78. An optical switch according to claim 61, further comprising:
a measuring unit which measures, in advance, a change amount of the tilt angle of the mirror corresponding to a change in the manipulated variable; and
a range setting unit which sets the predetermined pattern based on the change amount.

79. An optical switch according to claim 78, wherein said range setting unit sets the predetermined range to exceed a range of the manipulated variable to tilt the change amount.

80. An optical switch according to claim 79, further comprising a time setting unit which sets a time to cause said perturbation unit to supply the manipulated variables which change within the predetermined range, the time setting unit setting the time to not more than a value obtained by dividing a range of the tilt angle of the mirror corresponding to a preset range of a power loss of the output light by the change amount per unit time.

81. An optical switch control method comprising:
a perturbation step of, for an optical switch including at least one input port which inputs input light, at least one output port which outputs output light, and at least one mirror device which includes a mirror pivotally supported with respect to an x-axis and a y-axis perpendicular to the x-axis, and electrodes facing the mirror, the mirror device applying driving voltages corresponding to manipulated variables to the electrodes to tilt the mirror, thereby deflecting the input light input to the input port and making the input light selectively enter an arbitrary one of the at least one output port, perturbing the mirror by applying, to the electrodes, driving voltages corresponding to manipulated variables which change within a predetermined range;
a detection step of detecting an intensity of output light which is input light input to one input port and output from one output port upon the perturbation of the mirror;
a setting step of setting a perturbation pattern which changes the manipulated variables within the predetermined range;
a perturbation step of perturbing the mirror based on the perturbation pattern set in the setting step;
a error calculation/correction step of determining a coefficient of each degree of a surface mathematical model assumed for a light intensity distribution in three-dimensional space by identifying a light intensity distribution function surface, and calculates optimum manipulated variables for said one input port and said one output port based on a maximum value of the surface, the three-dimensional space having coordinate axes represented by a manipulated variable $V_x$ and a manipulated variable $V_y$ to tilt the mirror about the x-axis and the y-axis, respectively, and the output light intensity detected by the detection step; and
applying driving voltages corresponding to the manipulated variables to the electrodes,
wherein said applying changes the manipulated variable voltages in a helical pattern on a plane having coordinate axes represented by the manipulated variable $V_x$ and the manipulated variable $V_y$.

82. A communication system comprising:
a plurality of optical switches connected in series, each optical switch including at least one input port which inputs input light, at least one output port which outputs output light, at least one mirror device which includes a mirror pivotally supported with respect to an x-axis and a y-axis perpendicular to the x-axis, and electrodes facing the mirror, said mirror device applying driving voltages corresponding to manipulated variables to the electrodes to tilt the mirror, thereby deflecting the input light input to said input port and making the input light selectively enter an arbitrary one of said at least one output port,
a perturbation unit which perturbs the mirror by applying, to the electrodes, driving voltages corresponding to manipulated variables which change within a predetermined range,
a detection unit which detects an intensity of output light which is input light input to one input port and output from one output port upon the perturbation of the mirror,
a setting unit which sets a perturbation pattern which changes the manipulated variables within the predetermined range,
an error calculation/correction unit which determines a coefficient of each degree of a surface mathematical model assumed for a light intensity distribution in three-dimensional space by identifying a light intensity distribution function surface, and calculates optimum manipulated variables for said one input port and said one output port based on a maximum value of the surface, the three-dimensional space having coordinate axes represented by a manipulated variable $V_x$ and a manipulated variable $V_y$ to tilt the mirror about the x-axis and the y-axis, respectively, and the output light intensity detected by said detection unit, and a switching unit which applies driving voltages corresponding to the manipulated variables to the electrodes; and
a management device which sends a control signal to control the perturbation of the mirror in each of said optical switches without synchronization of the perturbation of the mirror between said optical switches,
the perturbation unit perturbing the mirror following a perturbation pattern which changes a manipulated variable $V_x$ and a manipulated variable $V_y$ so as to draw a circular trajectory based on a trigonometric function, said perturbation pattern being set on a plane having coordinate axes represented by the manipulated variable $V_x$ and the manipulated variable $V_y$ to tilt the mirror about the x-axis and the y-axis, respectively.

* * * * *